United States Patent
Yi et al.

(10) Patent No.: US 11,191,071 B2
(45) Date of Patent: Nov. 30, 2021

(54) MONITORING DOWNLINK CONTROL INFORMATION SUPPORTING MULTIPLE SERVICES

(71) Applicant: Ofinno, LLC, Reston, VA (US)

(72) Inventors: Yunjung Yi, Vienna, VA (US); Esmael Hejazi Dinan, McLean, VA (US); Hua Zhou, Herndon, VA (US)

(73) Assignee: Ofinno, LLC, Reston, VA (US)

( * ) Notice: Subject to any disclaimer, the term of this patent is extended or adjusted under 35 U.S.C. 154(b) by 0 days.

(21) Appl. No.: 16/849,319

(22) Filed: Apr. 15, 2020

(65) Prior Publication Data

US 2020/0337029 A1    Oct. 22, 2020

Related U.S. Application Data

(60) Provisional application No. 62/834,653, filed on Apr. 16, 2019.

(51) Int. Cl.
*H04W 72/04* (2009.01)

(52) U.S. Cl.
CPC .................. *H04W 72/042* (2013.01)

(58) Field of Classification Search
CPC .................................................. H04W 72/042
See application file for complete search history.

(56) References Cited

U.S. PATENT DOCUMENTS

2021/0051759 A1*  2/2021  Zhou ..................... H04W 76/28

OTHER PUBLICATIONS

3GPP TS 38.211 V15.4.0 (Dec. 2018); Technical Specification; 3rd Generation Partnership Project; Technical Specification Group Radio Access Network; NR; Physical channels and modulation; (Release 15).
3GPP TS 38.213 V15.4.0 (Dec. 2018); Technical Specification; 3rd Generation Partnership Project; Technical Specification Group Radio Access Network; NR;Physical layer procedures for control (Release 15).
3GPP TS 38.331 V15.4.0 (Dec. 2018); Technical Specification; 3rd Generation Partnership Project; Technical Specification Group Radio Access Network; NR; Radio Resource Control (RRC) protocol specification; (Release 15).
R1-1903954; 3GPP TSG RAN WG1 Meeting #96bis; Xi'an, China, Apr. 8-12, 2019; ; Agenda Item:7.2.6.1; Source:Huawei, HiSilicon; Title:PDCCH enhancements for URLLC.

(Continued)

*Primary Examiner* — Ronald B Abelson
(74) *Attorney, Agent, or Firm* — Kavon Nasabzadeh; Philip Smith; Willis Chang

(57) ABSTRACT

A wireless device may receive one or more messages comprise parameters of a first downlink control information (DCI) format and a second DCI format for monitoring on a first search space. The parameters may comprise the second DCI format configured for monitoring on a second search space. The wireless device may determine, based on the first DCI format, a first DCI size of the second DCI format for the first search space. The wireless device may determine, based on the second DCI format, a second DCI size of the second DCI format in the second search space. The wireless device may monitor for a first DCI on the first search space based on the first DCI size. The wireless device may monitor for a second DCI on the second search space based on the second DCI size.

20 Claims, 30 Drawing Sheets

(56) References Cited

OTHER PUBLICATIONS

R1-1904042; 3GPP TSG RAN WG1 #96bis ; Xi'an, China, Apr. 8-12, 2019; Source:OPPO; Title:PDCCH enhancement for URLLC; Agenda Item:7.2.6.1.

R1-1904081 PDCCH enhancements for URLLC; 3GPP TSG RAN WG1 #96bis; Xi'an, China, Apr. 8-12, 2019; Source:vivo; Title:PDCCH enhancements for URLLC; Agenda Item:7.2.6.1.

R1-1904122 PDCCH Enhancements for NR URLLC; 3GPP TSG-RAN WG1 Meeting #96bisTdoc ; Xi'an, China, Apr. 8-12, 2019; Agenda Item:7.2.6.1; Source:Ericsson; Title:PDCCH Enhancements for NR URLLC.

R1-1904143 on PDCCH enhancements for NR URLLC; 3GPP TSG RAN WG1 #96bis; Xi'an, China, Apr. 8-12, 2019; Source:ZTE; Title: On PDCCH enhancements for NR URLLC; Agenda item:7.2.6.1; Document for:Discussion and Decision.

R1-1904305 Intel—eURLLC PDCCH enhancements_Final.DOCX3GPP TSG RAN WG1 #96bis ; Xi'an, China, Apr. 8-12, 2019; ; Source:Intel Corporation; Title:On PDCCH enhancements for eURLLC; Agenda item:7.2.6.1.

R1-1904440 eURLLC DL control; 3GPP TSG RAN WG1 #96bis ; Xian, China, Apr. 8-12, 2019; Agenda item:7.2.6.1; Source: Samsung ; Title: DL Control for URLLC; Document for:Discussion and Decision.

R1-1904503 PDCCH enhancements for NR URLLC; 3GPP TSG RAN WG1 Meeting #96b ; Xi'an, China, April 8-Apr. 12, 2019; Agenda Item: 7.2.6.1 Source: MediaTek Inc.; Title: PDCCH enhancements for NR URLLC.

R1-1904627 URLLC PDCCH; 3GPP TSG RAN WG1 #96bis ; Xi'an, China, Apr. 8-12, 2019; Agenda Item:7.2.6.1; Source: LG Electronics; Title: PDCCH enhancements for NR URLLC; Document for:Discussion and decision.

R1-1904775 Discussion on PDCCH enhancements for URLLC_v5; 3GPP TSG RAN WG1 #96bis; Xi'an, China, Apr. 8-12, 2019; Agenda item:7.2.6.1; Source: Spreadtrum Communications; Title: Discussion on PDCCH enhancements for URLLC.

R1-1904827 on PDCCH enhancements for NR URLLC_final; 3GPP TSG RAN WG1 Meeting #96bis; Xi'an, China, Apr. 8-12, 2019; Agenda item:7.2.6.1; Source:Nokia, Nokia Shanghai Bell; Title:On PDCCH Enhancements for NR URLLC.

R1-1904882 on DCI Enhancements for URLLC; 3GPP TSG RAN WG1 #96bis, Xi'an, China, Apr. 8-12, 2019; Agenda Item:7.2.6.1; Source:InterDigital Inc.; Title:On DCI Enhancements for URLLC.

R1-1904929_PDCCH_Enhancement_v0; 3GPP TSG RAN WG1 #96bis R1-1904929 Xi'an, China, Apr. 8-12, 2019; Agenda Item:7.2.6.1; Source:Motorola Mobility, Lenovo; Title:PDCCH Enhancements for URLLC.

R1-1904957 PDCCH enhancements for URLLC; 3GPP TSG RAN WG1 #96bis ; Xi'an, China, Apr. 8-12, 2019; ; Source:NTT Docomo, Inc.; Title:PDCCH enhancements for URLLC; Agenda Item:7.2.6.1.

R1-1905019 PDCCH Enhancements for eURLLC; 3GPP TSG-RAN WG1 Meeting #96b; Apr. 8-12, 2019; Xi'an, China ; Agenda item:7.2.6.1; Source: Qualcomm Incorporated; Title: PDCCH Enhancements for eURLLC.

R1-1905121—DCI enhancements; 3GPP TSG RAN WG1 #96bis; Xi'an, China, Apr. 8-12, 2019; Agenda Item:7.2.6.1; Source:Sequans; Title:PDCCH enhancements for URLLC.

R1-1905359; 3GPP TSG RAN WG1 Meeting #96bis ; Xi'an, China, Apr. 8-12, 2019; Source:CATT; Title:PDCCH enhancements for URLLC; Agenda Item:7.2.6.1.

R1-1905430_DCI_final; 3GPP TSG RAN WG1 #96bisR1-1905430 Xi'an, China, Apr. 8-12, 2019; Source:WILUS Inc.; Title:On DCI enhancement for NR URLLC; Agenda item:7.2.6.1.

\* cited by examiner

User Plane Protocol Stack

Control Plane Protocol Stack

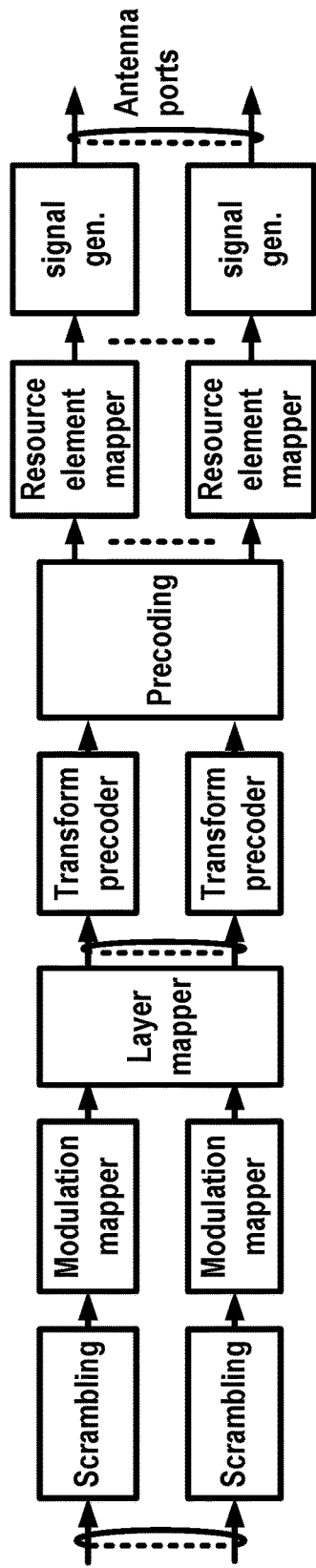
FIG. 4A
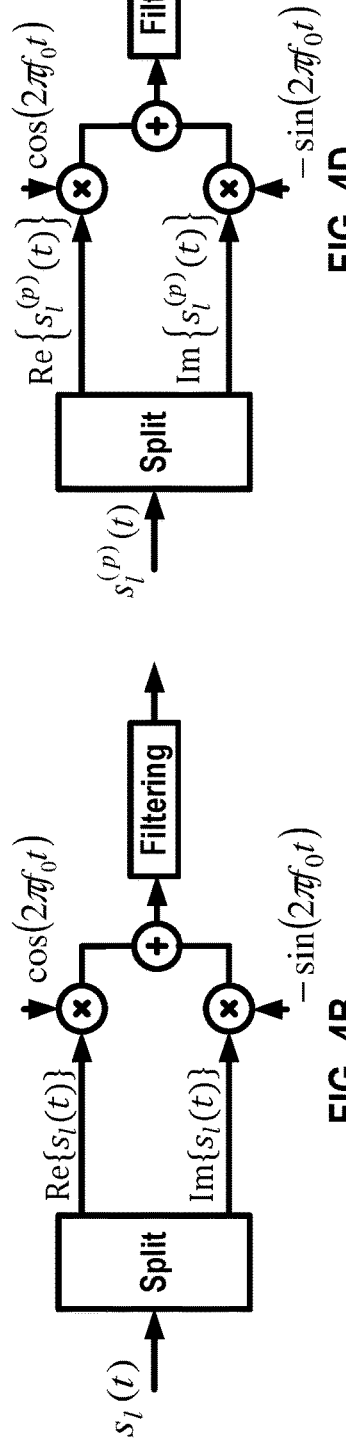
FIG. 4B
FIG. 4D
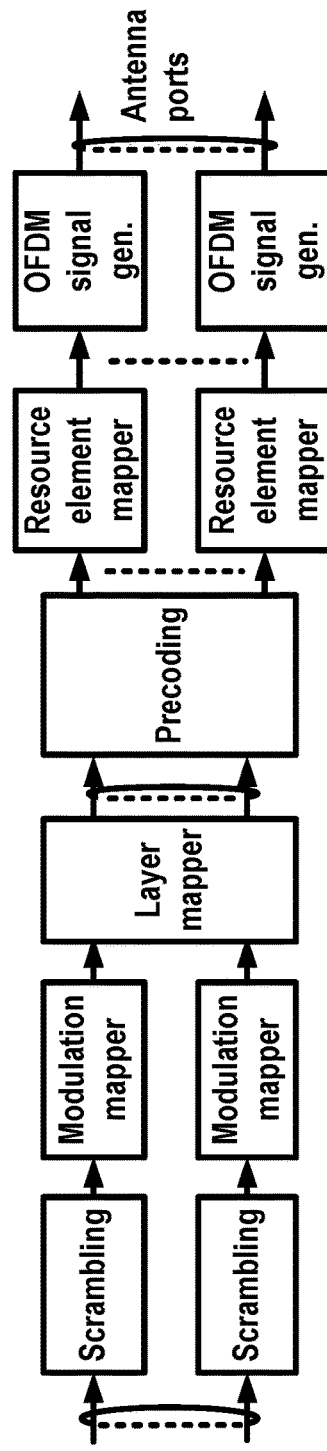
FIG. 4C
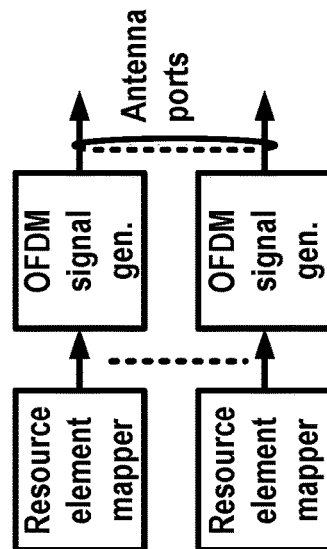

MONITORING DOWNLINK CONTROL INFORMATION SUPPORTING MULTIPLE SERVICES

CROSS-REFERENCE TO RELATED APPLICATIONS

This application claims the benefit of U.S. Provisional Application No. 62/834,653, filed Apr. 16, 2019, which is hereby incorporated by reference in its entirety.

BRIEF DESCRIPTION OF THE DRAWINGS

Examples of several of the various embodiments of the present disclosure are described herein with reference to the drawings.

FIG. 4A, FIG. 4B, FIG. 4C and FIG. 4D are example diagrams for uplink and downlink signal transmission as per an aspect of an embodiment of the present disclosure.

DETAILED DESCRIPTION OF EMBODIMENTS

Figure 1:
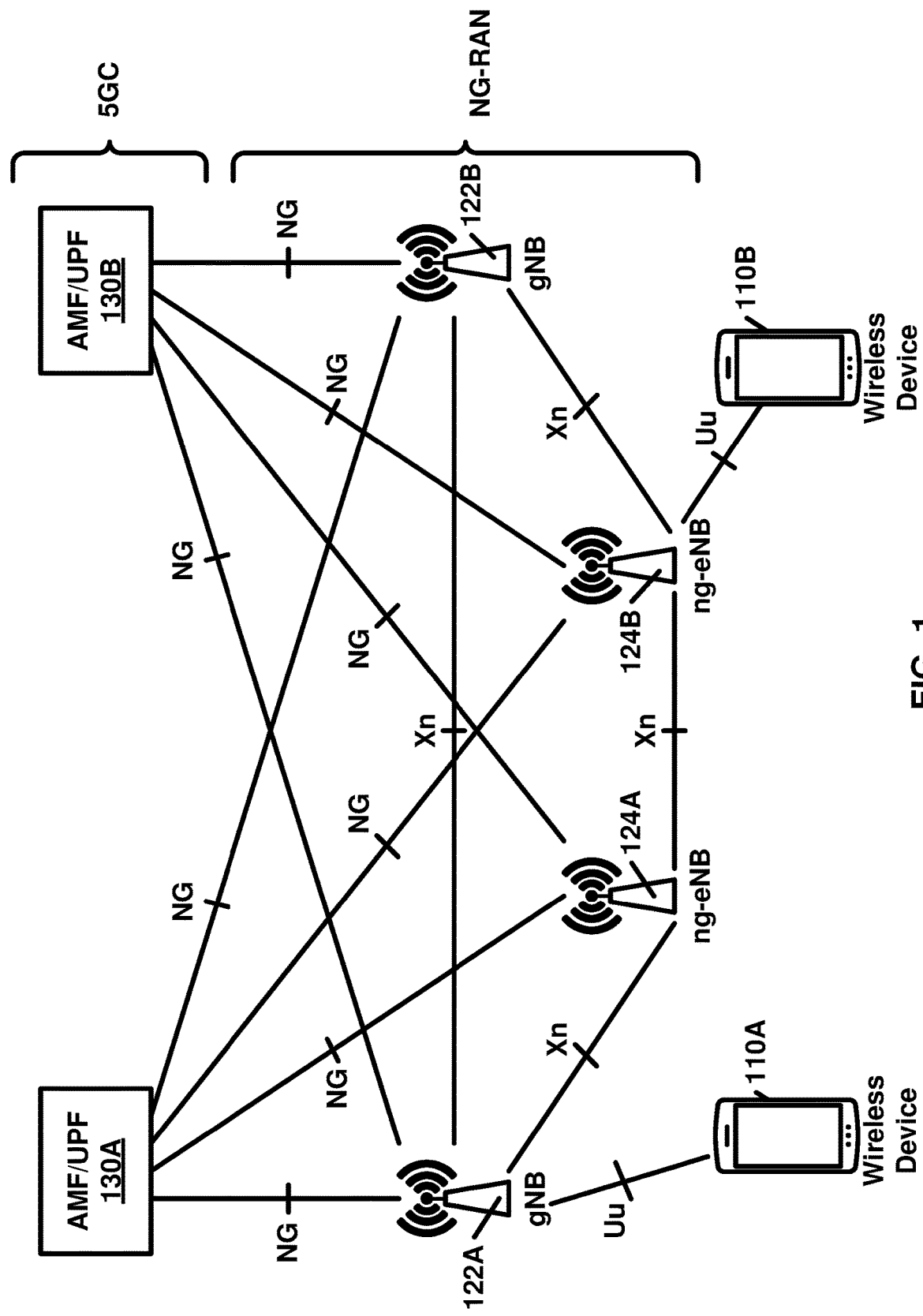
FIG. 1 is a diagram of an example RAN architecture as per an aspect of an embodiment of the present disclosure.

Example embodiments of the present disclosure enable operation of wireless communication systems. Embodiments of the technology disclosed herein may be employed in the technical field of multicarrier communication systems. More particularly, the embodiments of the technology disclosed herein may relate to radio access networks in multicarrier communication systems.

The following Acronyms are used throughout the present disclosure:
  3GPP 3rd Generation Partnership Project
  5GC 5G Core Network
  ACK Acknowledgement
  AMF Access and Mobility Management Function
  ARQ Automatic Repeat Request
  AS Access Stratum
  ASIC Application-Specific Integrated Circuit
  BA Bandwidth Adaptation
  BCCH Broadcast Control Channel
  BCH Broadcast Channel
  BPSK Binary Phase Shift Keying
  BWP Bandwidth Part
  CA Carrier Aggregation
  CC Component Carrier
  CCCH Common Control CHannel
  CDMA Code Division Multiple Access
  CN Core Network
  CP Cyclic Prefix
  CP-OFDM Cyclic Prefix-Orthogonal Frequency Division Multiplex
  C-RNTI Cell-Radio Network Temporary Identifier CS Configured Scheduling
CSI Channel State Information
CSI-RS Channel State Information-Reference Signal
CQI Channel Quality Indicator
CSS Common Search Space
CU Central Unit
DC Dual Connectivity
DCCH Dedicated Control CHannel
DCI Downlink Control Information
DL Downlink
DL-SCH Downlink Shared CHannel
DM-RS DeModulation Reference Signal
DRB Data Radio Bearer
DRX Discontinuous Reception
DTCH Dedicated Traffic CHannel
DU Distributed Unit
EPC Evolved Packet Core
E-UTRA Evolved UMTS Terrestrial Radio Access
E-UTRAN Evolved-Universal Terrestrial Radio Access Network
FDD Frequency Division Duplex
FPGA Field Programmable Gate Arrays
F1-C F1-Control plane
F1-U F1-User plane
gNB next generation Node B
HARQ Hybrid Automatic Repeat reQuest
HDL Hardware Description Languages
IE Information Element
IP Internet Protocol
LCID Logical Channel IDentifier
LTE Long Term Evolution
MAC Media Access Control
MCG Master Cell Group
MCS Modulation and Coding Scheme
MeNB Master evolved Node B
MIB Master Information Block
MME Mobility Management Entity
MN Master Node
NACK Negative Acknowledgement
NAS Non-Access Stratum
NG CP Next Generation Control Plane
NGC Next Generation Core
NG-C NG-Control plane
ng-eNB next generation evolved Node B
NG-U NG-User plane
NR New Radio
NR MAC New Radio MAC
NR PDCP New Radio PDCP
NR PHY New Radio PHYsical
NR RLC New Radio RLC
NR RRC New Radio RRC
NSSAI Network Slice Selection Assistance Information
O&M Operation and Maintenance
OFDM Orthogonal Frequency Division Multiplexing
PBCH Physical Broadcast CHannel
PCC Primary Component Carrier
PCCH Paging Control CHannel
PCell Primary Cell
PCH Paging CHannel
PDCCH Physical Downlink Control CHannel
PDCP Packet Data Convergence Protocol
PDSCH Physical Downlink Shared CHannel
PDU Protocol Data Unit
PHICH Physical HARQ Indicator CHannel
PHY PHYsical
PLMN Public Land Mobile Network
PMI Precoding Matrix Indicator
PRACH Physical Random Access CHannel
PRB Physical Resource Block
PSCell Primary Secondary Cell
PSS Primary Synchronization Signal
pTAG primary Timing Advance Group
PT-RS Phase Tracking Reference Signal
PUCCH Physical Uplink Control CHannel
PUSCH Physical Uplink Shared CHannel
QAM Quadrature Amplitude Modulation
QFI Quality of Service Indicator
QoS Quality of Service
QPSK Quadrature Phase Shift Keying
RA Random Access
RACH Random Access CHannel
RAN Radio Access Network
RAT Radio Access Technology
RA-RNTI Random Access-Radio Network Temporary Identifier
RB Resource Blocks
RBG Resource Block Groups
RI Rank Indicator
RLC Radio Link Control
RRC Radio Resource Control
RS Reference Signal
RSRP Reference Signal Received Power
SCC Secondary Component Carrier
SCell Secondary Cell
SCG Secondary Cell Group
SC-FDMA Single Carrier-Frequency Division Multiple Access
SDAP Service Data Adaptation Protocol
SDU Service Data Unit
SeNB Secondary evolved Node B
SFN System Frame Number
S-GW Serving GateWay
SI System Information
SIB System Information Block
SMF Session Management Function
SN Secondary Node
SpCell Special Cell
SRB Signaling Radio Bearer
SRS Sounding Reference Signal
SS Synchronization Signal
SSS Secondary Synchronization Signal
sTAG secondary Timing Advance Group
TA Timing Advance
TAG Timing Advance Group
TAI Tracking Area Identifier
TAT Time Alignment Timer
TB Transport Block
TC-RNTI Temporary Cell-Radio Network Temporary Identifier
TDD Time Division Duplex
TDMA Time Division Multiple Access
TTI Transmission Time Interval
UCI Uplink Control Information
UE User Equipment
UL Uplink
UL-SCH Uplink Shared CHannel
UPF User Plane Function
UPGW User Plane Gateway
VHDL VHSIC Hardware Description Language
Xn-C Xn-Control plane
Xn-U Xn-User plane Example embodiments of the disclosure may be implemented using various physical layer modulation and transmission mechanisms. Example transmission mechanisms may include, but are not limited to: Code Division Multiple Access (CDMA), Orthogonal Frequency Division Multiple Access (OFDMA), Time Division Multiple Access (TDMA), Wavelet technologies, and/or the like. Hybrid transmission mechanisms such as TDMA/CDMA, and OFDM/CDMA may also be employed. Various modulation schemes may be applied for signal transmission in the physical layer. Examples of modulation schemes include, but are not limited to: phase, amplitude, code, a combination of these, and/or the like. An example radio transmission method may implement Quadrature Amplitude Modulation (QAM) using Binary Phase Shift Keying (BPSK), Quadrature Phase Shift Keying (QPSK), 16-QAM, 64-QAM, 256-QAM, and/or the like. Physical radio transmission may be enhanced by dynamically or semi-dynamically changing the modulation and coding scheme depending on transmission requirements and radio conditions.

FIG. 1 is an example Radio Access Network (RAN) architecture as per an aspect of an embodiment of the present disclosure. As illustrated in this example, a RAN node may be a next generation Node B (gNB) (e.g. 120A, 120B) providing New Radio (NR) user plane and control plane protocol terminations towards a first wireless device (e.g. 110A). In an example, a RAN node may be a next generation evolved Node B (ng-eNB) (e.g. 124A, 124B), providing Evolved UMTS Terrestrial Radio Access (E-UTRA) user plane and control plane protocol terminations towards a second wireless device (e.g. 110B). The first wireless device may communicate with a gNB over a Uu interface. The second wireless device may communicate with a ng-eNB over a Uu interface. In this disclosure, wireless device 110A and 110B are structurally similar to wireless device 110. Base stations 120A and/or 120B may be structurally similarly to base station 120. Base station 120 may comprise at least one of a gNB (e.g. 122A and/or 122B), ng-eNB (e.g. 124A and/or 124B), and or the like.

A gNB or an ng-eNB may host functions such as: radio resource management and scheduling, IP header compression, encryption and integrity protection of data, selection of Access and Mobility Management Function (AMF) at User Equipment (UE) attachment, routing of user plane and control plane data, connection setup and release, scheduling and transmission of paging messages (originated from the AMF), scheduling and transmission of system broadcast information (originated from the AMF or Operation and Maintenance (O&M)), measurement and measurement reporting configuration, transport level packet marking in the uplink, session management, support of network slicing, Quality of Service (QoS) flow management and mapping to data radio bearers, support of UEs in RRC_INACTIVE state, distribution function for Non-Access Stratum (NAS) messages, RAN sharing, and dual connectivity or tight interworking between NR and E-UTRA.

In an example, one or more gNBs and/or one or more ng-eNBs may be interconnected with each other by means of Xn interface. A gNB or an ng-eNB may be connected by means of NG interfaces to 5G Core Network (5GC). In an example, 5GC may comprise one or more AMF/User Plan Function (UPF) functions (e.g. 130A or 130B). A gNB or an ng-eNB may be connected to a UPF by means of an NG-User plane (NG-U) interface. The NG-U interface may provide delivery (e.g. non-guaranteed delivery) of user plane Protocol Data Units (PDUs) between a RAN node and the UPF. A gNB or an ng-eNB may be connected to an AMF by means of an NG-Control plane (NG-C) interface. The NG-C interface may provide, for example, NG interface management, UE context management, UE mobility management, transport of NAS messages, paging, PDU session management, configuration transfer and/or warning message transmission, combinations thereof, and/or the like.

In an example, a UPF may host functions such as anchor point for intra-/inter-Radio Access Technology (RAT) mobility (when applicable), external PDU session point of interconnect to data network, packet routing and forwarding, packet inspection and user plane part of policy rule enforcement, traffic usage reporting, uplink classifier to support routing traffic flows to a data network, branching point to support multi-homed PDU session, QoS handling for user plane, e.g. packet filtering, gating, Uplink (UL)/Downlink (DL) rate enforcement, uplink traffic verification (e.g. Service Data Flow (SDF) to QoS flow mapping), downlink packet buffering and/or downlink data notification triggering.

In an example, an AMF may host functions such as NAS signaling termination, NAS signaling security, Access Stratum (AS) security control, inter Core Network (CN) node signaling for mobility between $3^{rd}$ Generation Partnership Project (3GPP) access networks, idle mode UE reachability (e.g., control and execution of paging retransmission), registration area management, support of intra-system and inter-system mobility, access authentication, access authorization including check of roaming rights, mobility management control (subscription and policies), support of network slicing and/or Session Management Function (SMF) selection.

Figure 2A:
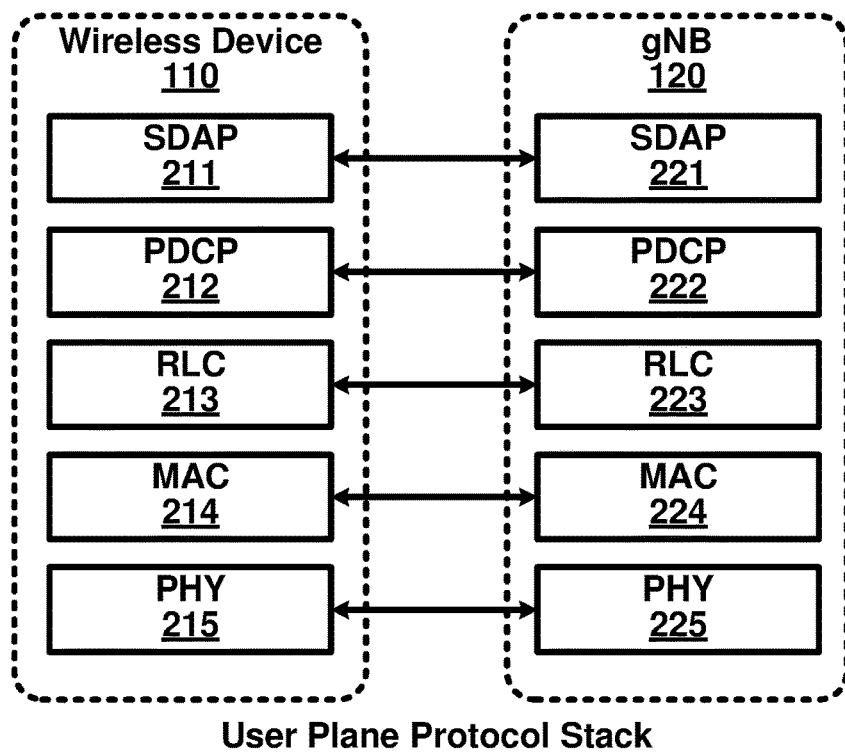
FIG. 2A is a diagram of an example user plane protocol stack as per an aspect of an embodiment of the present disclosure.

FIG. 2A is an example user plane protocol stack, where Service Data Adaptation Protocol (SDAP) (e.g. 211 and 221), Packet Data Convergence Protocol (PDCP) (e.g. 212 and 222), Radio Link Control (RLC) (e.g. 213 and 223) and Media Access Control (MAC) (e.g. 214 and 224) sublayers and Physical (PHY) (e.g. 215 and 225) layer may be terminated in wireless device (e.g. 110) and gNB (e.g. 120) on the network side. In an example, a PHY layer provides transport services to higher layers (e.g. MAC, RRC, etc.). In an example, services and functions of a MAC sublayer may comprise mapping between logical channels and transport channels, multiplexing/demultiplexing of MAC Service Data Units (SDUs) belonging to one or different logical channels into/from Transport Blocks (TBs) delivered to/from the PHY layer, scheduling information reporting, error correction through Hybrid Automatic Repeat request (HARQ) (e.g. one HARQ entity per carrier in case of Carrier Aggregation (CA)), priority handling between UEs by means of dynamic scheduling, priority handling between logical channels of one UE by means of logical channel prioritization, and/or padding. A MAC entity may support one or multiple numerologies and/or transmission timings. In an example, mapping restrictions in a logical channel prioritization may control which numerology and/or transmission timing a logical channel may use. In an example, an RLC sublayer may supports transparent mode (TM), unacknowledged mode (UM) and acknowledged mode (AM) transmission modes. The RLC configuration may be per logical channel with no dependency on numerologies and/or Transmission Time Interval (TTI) durations. In an example, Automatic Repeat Request (ARQ) may operate on any of the numerologies and/or TTI durations the logical channel is configured with. In an example, services and functions of the PDCP layer for the user plane may comprise sequence numbering, header compression and decompression, transfer of user data, reordering and duplicate detection, PDCP PDU routing (e.g. in case of split bearers), retransmission of PDCP SDUs, ciphering, deciphering and integrity protection, PDCP SDU discard, PDCP re-establishment and data recovery for RLC AM, and/or duplication of PDCP PDUs. In an example, services and functions of SDAP may comprise mapping between a QoS flow and a data radio bearer. In an example, services and functions of SDAP may comprise mapping Quality of Service Indicator (QFI) in DL and UL packets. In an example, a protocol entity of SDAP may be configured for an individual PDU session.

Figure 2B:
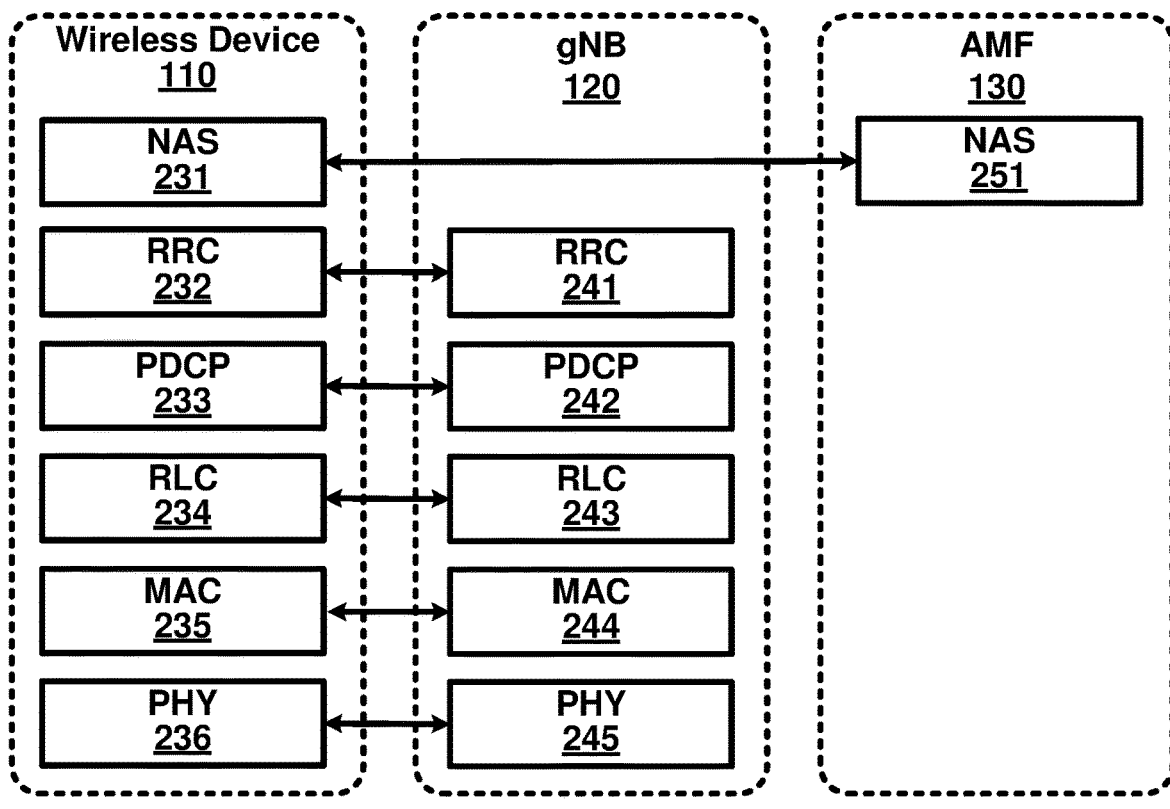
FIG. 2B is a diagram of an example control plane protocol stack as per an aspect of an embodiment of the present disclosure.

FIG. 2B is an example control plane protocol stack where PDCP (e.g. 233 and 242), RLC (e.g. 234 and 243) and MAC (e.g. 235 and 244) sublayers and PHY (e.g. 236 and 245) layer may be terminated in wireless device (e.g. 110) and gNB (e.g. 120) on a network side and perform service and functions described above. In an example, RRC (e.g. 232 and 241) may be terminated in a wireless device and a gNB on a network side. In an example, services and functions of RRC may comprise broadcast of system information related to AS and NAS, paging initiated by 5GC or RAN, establishment, maintenance and release of an RRC connection between the UE and RAN, security functions including key management, establishment, configuration, maintenance and release of Signaling Radio Bearers (SRBs) and Data Radio Bearers (DRBs), mobility functions, QoS management functions, UE measurement reporting and control of the reporting, detection of and recovery from radio link failure, and/or NAS message transfer to/from NAS from/to a UE. In an example, NAS control protocol (e.g. 231 and 251) may be terminated in the wireless device and AMF (e.g. 130) on a network side and may perform functions such as authentication, mobility management between a UE and a AMF for 3GPP access and non-3GPP access, and session management between a UE and a SMF for 3GPP access and non-3GPP access.

In an example, a base station may configure a plurality of logical channels for a wireless device. A logical channel in the plurality of logical channels may correspond to a radio bearer and the radio bearer may be associated with a QoS requirement. In an example, a base station may configure a logical channel to be mapped to one or more TTIs/numerologies in a plurality of TTIs/numerologies. The wireless device may receive a Downlink Control Information (DCI) via Physical Downlink Control CHannel (PDCCH) indicating an uplink grant. In an example, the uplink grant may be for a first TTI/numerology and may indicate uplink resources for transmission of a transport block. The base station may configure each logical channel in the plurality of logical channels with one or more parameters to be used by a logical channel prioritization procedure at the MAC layer of the wireless device. The one or more parameters may comprise priority, prioritized bit rate, etc. A logical channel in the plurality of logical channels may correspond to one or more buffers comprising data associated with the logical channel. The logical channel prioritization procedure may allocate the uplink resources to one or more first logical channels in the plurality of logical channels and/or one or more MAC Control Elements (CEs). The one or more first logical channels may be mapped to the first TTI/numerology. The MAC layer at the wireless device may multiplex one or more MAC CEs and/or one or more MAC SDUs (e.g., logical channel) in a MAC PDU (e.g., transport block). In an example, the MAC PDU may comprise a MAC header comprising a plurality of MAC sub-headers. A MAC sub-header in the plurality of MAC sub-headers may correspond to a MAC CE or a MAC SUD (logical channel) in the one or more MAC CEs and/or one or more MAC SDUs. In an example, a MAC CE or a logical channel may be configured with a Logical Channel IDentifier (LCID). In an example, LCID for a logical channel or a MAC CE may be fixed/pre-configured. In an example, LCID for a logical channel or MAC CE may be configured for the wireless device by the base station. The MAC sub-header corresponding to a MAC CE or a MAC SDU may comprise LCID associated with the MAC CE or the MAC SDU.

In an example, a base station may activate and/or deactivate and/or impact one or more processes (e.g., set values of one or more parameters of the one or more processes or start and/or stop one or more timers of the one or more processes) at the wireless device by employing one or more MAC commands. The one or more MAC commands may comprise one or more MAC control elements. In an example, the one or more processes may comprise activation and/or deactivation of PDCP packet duplication for one or more radio bearers. The base station may transmit a MAC CE comprising one or more fields, the values of the fields indicating activation and/or deactivation of PDCP duplication for the one or more radio bearers. In an example, the one or more processes may comprise Channel State Information (CSI) transmission of on one or more cells. The base station may transmit one or more MAC CEs indicating activation and/or deactivation of the CSI transmission on the one or more cells. In an example, the one or more processes may comprise activation or deactivation of one or more secondary cells. In an example, the base station may transmit a MA CE indicating activation or deactivation of one or more secondary cells. In an example, the base station may transmit one or more MAC CEs indicating starting and/or stopping one or more Discontinuous Reception (DRX) timers at the wireless device. In an example, the base station may transmit one or more MAC CEs indicating one or more timing advance values for one or more Timing Advance Groups (TAGs).

Figure 3:
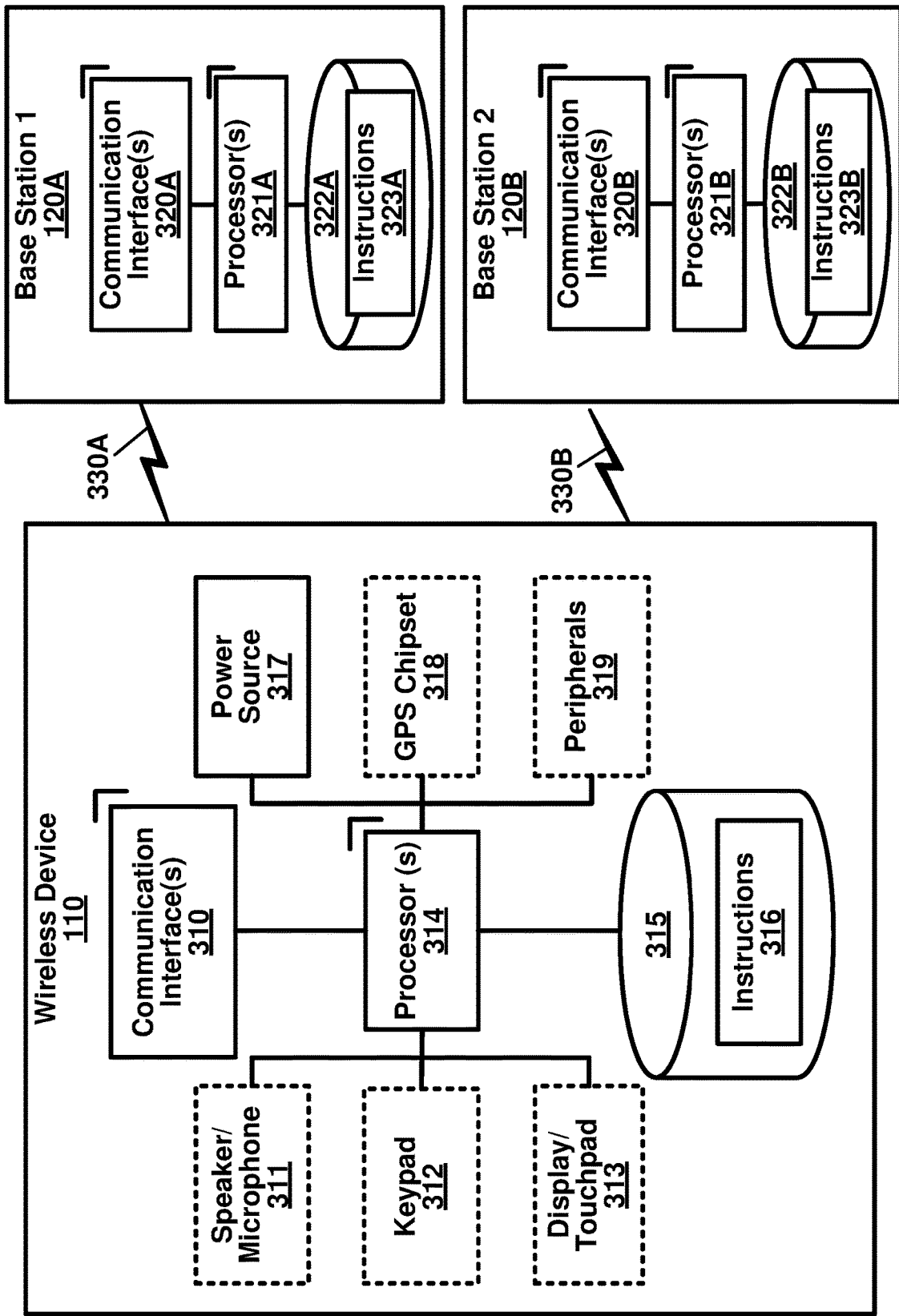
FIG. 3 is a diagram of an example wireless device and two base stations as per an aspect of an embodiment of the present disclosure.

FIG. 3 is a block diagram of base stations (base station 1, 120A, and base station 2, 120B) and a wireless device 110. A wireless device may be called an UE. A base station may be called a NB, eNB, gNB, and/or ng-eNB. In an example, a wireless device and/or a base station may act as a relay node. The base station 1, 120A, may comprise at least one communication interface 320A (e.g. a wireless modem, an antenna, a wired modem, and/or the like), at least one processor 321A, and at least one set of program code instructions 323A stored in non-transitory memory 322A and executable by the at least one processor 321A. The base station 2, 120B, may comprise at least one communication interface 320B, at least one processor 321B, and at least one set of program code instructions 323B stored in non-transitory memory 322B and executable by the at least one processor 321B.

A base station may comprise many sectors for example: 1, 2, 3, 4, or 6 sectors. A base station may comprise many cells, for example, ranging from 1 to 50 cells or more. A cell may be categorized, for example, as a primary cell or secondary cell. At Radio Resource Control (RRC) connection establishment/re-establishment/handover, one serving cell may provide the NAS (non-access stratum) mobility information (e.g. Tracking Area Identifier (TAI)). At RRC connection re-establishment/handover, one serving cell may provide the security input. This cell may be referred to as the Primary Cell (PCell). In the downlink, a carrier corresponding to the PCell may be a DL Primary Component Carrier (PCC), while in the uplink, a carrier may be an UL PCC. Depending on wireless device capabilities, Secondary Cells (SCells) may be configured to form together with a PCell a set of serving cells. In a downlink, a carrier corresponding to an SCell may be a downlink secondary component carrier (DL SCC), while in an uplink, a carrier may be an uplink secondary component carrier (UL SCC). An SCell may or may not have an uplink carrier.

A cell, comprising a downlink carrier and optionally an uplink carrier, may be assigned a physical cell ID and a cell index. A carrier (downlink or uplink) may belong to one cell. The cell ID or cell index may also identify the downlink carrier or uplink carrier of the cell (depending on the context it is used). In the disclosure, a cell ID may be equally referred to a carrier ID, and a cell index may be referred to a carrier index. In an implementation, a physical cell ID or a cell index may be assigned to a cell. A cell ID may be determined using a synchronization signal transmitted on a downlink carrier. A cell index may be determined using RRC messages. For example, when the disclosure refers to a first physical cell ID for a first downlink carrier, the disclosure may mean the first physical cell ID is for a cell comprising the first downlink carrier. The same concept may apply to, for example, carrier activation. When the disclosure indicates that a first carrier is activated, the specification may equally mean that a cell comprising the first carrier is activated.

A base station may transmit to a wireless device one or more messages (e.g. RRC messages) comprising a plurality of configuration parameters for one or more cells. One or more cells may comprise at least one primary cell and at least one secondary cell. In an example, an RRC message may be broadcasted or unicasted to the wireless device. In an example, configuration parameters may comprise common parameters and dedicated parameters.

Services and/or functions of an RRC sublayer may comprise at least one of: broadcast of system information related to AS and NAS; paging initiated by 5GC and/or NG-RAN; establishment, maintenance, and/or release of an RRC connection between a wireless device and NG-RAN, which may comprise at least one of addition, modification and release of carrier aggregation; or addition, modification, and/or release of dual connectivity in NR or between E-UTRA and NR. Services and/or functions of an RRC sublayer may further comprise at least one of security functions comprising key management; establishment, configuration, maintenance, and/or release of Signaling Radio Bearers (SRBs) and/or Data Radio Bearers (DRBs); mobility functions which may comprise at least one of a handover (e.g. intra NR mobility or inter-RAT mobility) and a context transfer; or a wireless device cell selection and reselection and control of cell selection and reselection. Services and/or functions of an RRC sublayer may further comprise at least one of QoS management functions; a wireless device measurement configuration/reporting; detection of and/or recovery from radio link failure; or NAS message transfer to/from a core network entity (e.g. AMF, Mobility Management Entity (MME)) from/to the wireless device.

An RRC sublayer may support an RRC_Idle state, an RRC_Inactive state and/or an RRC_Connected state for a wireless device. In an RRC_Idle state, a wireless device may perform at least one of: Public Land Mobile Network (PLMN) selection; receiving broadcasted system information; cell selection/re-selection; monitoring/receiving a paging for mobile terminated data initiated by 5GC; paging for mobile terminated data area managed by 5GC; or DRX for CN paging configured via NAS. In an RRC_Inactive state, a wireless device may perform at least one of: receiving broadcasted system information; cell selection/re-selection; monitoring/receiving a RAN/CN paging initiated by NG-RAN/5GC; RAN-based notification area (RNA) managed by NG-RAN; or DRX for RAN/CN paging configured by NG-RAN/NAS. In an RRC_Idle state of a wireless device, a base station (e.g. NG-RAN) may keep a 5GC-NG-RAN connection (both C/U-planes) for the wireless device; and/or store a UE AS context for the wireless device. In an RRC_Connected state of a wireless device, a base station (e.g. NG-RAN) may perform at least one of: establishment of 5GC-NG-RAN connection (both C/U-planes) for the wireless device; storing a UE AS context for the wireless device; transmit/receive of unicast data to/from the wireless device; or network-controlled mobility based on measurement results received from the wireless device. In an RRC_Connected state of a wireless device, an NG-RAN may know a cell that the wireless device belongs to.

System information (SI) may be divided into minimum SI and other SI. The minimum SI may be periodically broadcast. The minimum SI may comprise basic information required for initial access and information for acquiring any other SI broadcast periodically or provisioned on-demand, i.e. scheduling information. The other SI may either be broadcast, or be provisioned in a dedicated manner, either triggered by a network or upon request from a wireless device. A minimum SI may be transmitted via two different downlink channels using different messages (e.g. MasterInformationBlock and SystemInformationBlockType1). Another SI may be transmitted via SystemInformationBlockType2. For a wireless device in an RRC_Connected state, dedicated RRC signaling may be employed for the request and delivery of the other SI. For the wireless device in the RRC_Idle state and/or the RRC_Inactive state, the request may trigger a random-access procedure.

A wireless device may report its radio access capability information which may be static. A base station may request what capabilities for a wireless device to report based on band information. When allowed by a network, a temporary capability restriction request may be sent by the wireless device to signal the limited availability of some capabilities (e.g. due to hardware sharing, interference, or overheating) to the base station. The base station may confirm or reject the request. The temporary capability restriction may be transparent to 5GC (e.g., static capabilities may be stored in 5GC).

When CA is configured, a wireless device may have an RRC connection with a network. At RRC connection establishment/re-establishment/handover procedure, one serving cell may provide NAS mobility information, and at RRC connection re-establishment/handover, one serving cell may provide a security input. This cell may be referred to as the PCell. Depending on the capabilities of the wireless device, SCells may be configured to form together with the PCell a set of serving cells. The configured set of serving cells for the wireless device may comprise one PCell and one or more SCells.

The reconfiguration, addition, and removal of SCells may be performed by RRC. At intra-NR handover, RRC may also add, remove, or reconfigure SCells for usage with the target PCell. When adding a new SCell, dedicated RRC signaling may be employed to send all required system information of the SCell i.e. while in connected mode, wireless devices may not need to acquire broadcasted system information directly from the SCells.

The purpose of an RRC connection reconfiguration procedure may be to modify an RRC connection, (e.g. to establish, modify and/or release RBs, to perform handover, to setup, modify, and/or release measurements, to add, modify, and/or release SCells and cell groups). As part of the RRC connection reconfiguration procedure, NAS dedicated information may be transferred from the network to the wireless device. The RRCConnectionReconfiguration message may be a command to modify an RRC connection. It may convey information for measurement configuration, mobility control, radio resource configuration (e.g. RBs, MAC main configuration and physical channel configuration) comprising any associated dedicated NAS information and security configuration. If the received RRC Connection Reconfiguration message includes the sCellToReleaseList, the wireless device may perform an SCell release. If the received RRC Connection Reconfiguration message includes the sCellToAddModList, the wireless device may perform SCell additions or modification.

An RRC connection establishment (or reestablishment, resume) procedure may be to establish (or reestablish, resume) an RRC connection. an RRC connection establishment procedure may comprise SRB1 establishment. The RRC connection establishment procedure may be used to transfer the initial NAS dedicated information/message from a wireless device to E-UTRAN. The RRCConnectionReestablishment message may be used to re-establish SRB1.

A measurement report procedure may be to transfer measurement results from a wireless device to NG-RAN. The wireless device may initiate a measurement report procedure after successful security activation. A measurement report message may be employed to transmit measurement results.

The wireless device 110 may comprise at least one communication interface 310 (e.g. a wireless modem, an antenna, and/or the like), at least one processor 314, and at least one set of program code instructions 316 stored in non-transitory memory 315 and executable by the at least one processor 314. The wireless device 110 may further comprise at least one of at least one speaker/microphone 311, at least one keypad 312, at least one display/touchpad 313, at least one power source 317, at least one global positioning system (GPS) chipset 318, and other peripherals 319.

The processor 314 of the wireless device 110, the processor 321A of the base station 1 120A, and/or the processor 321B of the base station 2 120B may comprise at least one of a general-purpose processor, a digital signal processor (DSP), a controller, a microcontroller, an application specific integrated circuit (ASIC), a field programmable gate array (FPGA) and/or other programmable logic device, discrete gate and/or transistor logic, discrete hardware components, and the like. The processor 314 of the wireless device 110, the processor 321A in base station 1 120A, and/or the processor 321B in base station 2 120B may perform at least one of signal coding/processing, data processing, power control, input/output processing, and/or any other functionality that may enable the wireless device 110, the base station 1 120A and/or the base station 2 120B to operate in a wireless environment.

The processor 314 of the wireless device 110 may be connected to the speaker/microphone 311, the keypad 312, and/or the display/touchpad 313. The processor 314 may receive user input data from and/or provide user output data to the speaker/microphone 311, the keypad 312, and/or the display/touchpad 313. The processor 314 in the wireless device 110 may receive power from the power source 317 and/or may be configured to distribute the power to the other components in the wireless device 110. The power source 317 may comprise at least one of one or more dry cell batteries, solar cells, fuel cells, and the like. The processor 314 may be connected to the GPS chipset 318. The GPS chipset 318 may be configured to provide geographic location information of the wireless device 110.

The processor 314 of the wireless device 110 may further be connected to other peripherals 319, which may comprise one or more software and/or hardware modules that provide additional features and/or functionalities. For example, the peripherals 319 may comprise at least one of an accelerometer, a satellite transceiver, a digital camera, a universal serial bus (USB) port, a hands-free headset, a frequency modulated (FM) radio unit, a media player, an Internet browser, and the like.

The communication interface 320A of the base station 1, 120A, and/or the communication interface 320B of the base station 2, 120B, may be configured to communicate with the communication interface 310 of the wireless device 110 via a wireless link 330A and/or a wireless link 330B respectively. In an example, the communication interface 320A of the base station 1, 120A, may communicate with the communication interface 320B of the base station 2 and other RAN and core network nodes.

The wireless link 330A and/or the wireless link 330B may comprise at least one of a bi-directional link and/or a directional link. The communication interface 310 of the wireless device 110 may be configured to communicate with the communication interface 320A of the base station 1 120A and/or with the communication interface 320B of the base station 2 120B. The base station 1 120A and the wireless device 110 and/or the base station 2 120B and the wireless device 110 may be configured to send and receive transport blocks via the wireless link 330A and/or via the wireless link 330B, respectively. The wireless link 330A and/or the wireless link 330B may employ at least one frequency carrier. According to some of various aspects of embodiments, transceiver(s) may be employed. A transceiver may be a device that comprises both a transmitter and a receiver. Transceivers may be employed in devices such as wireless devices, base stations, relay nodes, and/or the like. Example embodiments for radio technology implemented in the communication interface 310, 320A, 320B and the wireless link 330A, 330B are illustrated in FIG. 4A, FIG. 4B, FIG. 4C, FIG. 4D, FIG. 6, FIG. 7A, FIG. 7B, FIG. 8, and associated text.

In an example, other nodes in a wireless network (e.g. AMF, UPF, SMF, etc.) may comprise one or more communication interfaces, one or more processors, and memory storing instructions.

A node (e.g. wireless device, base station, AMF, SMF, UPF, servers, switches, antennas, and/or the like) may comprise one or more processors, and memory storing instructions that when executed by the one or more processors causes the node to perform certain processes and/or functions. Example embodiments may enable operation of single-carrier and/or multi-carrier communications. Other example embodiments may comprise a non-transitory tangible computer readable media comprising instructions executable by one or more processors to cause operation of single-carrier and/or multi-carrier communications. Yet other example embodiments may comprise an article of manufacture that comprises a non-transitory tangible computer readable machine-accessible medium having instructions encoded thereon for enabling programmable hardware to cause a node to enable operation of single-carrier and/or multi-carrier communications. The node may include processors, memory, interfaces, and/or the like.

An interface may comprise at least one of a hardware interface, a firmware interface, a software interface, and/or a combination thereof. The hardware interface may comprise connectors, wires, electronic devices such as drivers, amplifiers, and/or the like. The software interface may comprise code stored in a memory device to implement protocol(s), protocol layers, communication drivers, device drivers, combinations thereof, and/or the like. The firmware interface may comprise a combination of embedded hardware and code stored in and/or in communication with a memory device to implement connections, electronic device operations, protocol(s), protocol layers, communication drivers, device drivers, hardware operations, combinations thereof, and/or the like.

FIG. 4A, FIG. 4B, FIG. 4C and FIG. 4D are example diagrams for uplink and downlink signal transmission as per an aspect of an embodiment of the present disclosure. FIG. 4A shows an example uplink transmitter for at least one physical channel A baseband signal representing a physical uplink shared channel may perform one or more functions. The one or more functions may comprise at least one of: scrambling; modulation of scrambled bits to generate complex-valued symbols; mapping of the complex-valued modulation symbols onto one or several transmission layers; transform precoding to generate complex-valued symbols; precoding of the complex-valued symbols; mapping of precoded complex-valued symbols to resource elements; generation of complex-valued time-domain Single Carrier-Frequency Division Multiple Access (SC-FDMA) or CP-OFDM signal for an antenna port; and/or the like. In an example, when transform precoding is enabled, a SC-FDMA signal for uplink transmission may be generated. In an example, when transform precoding is not enabled, an CP-OFDM signal for uplink transmission may be generated by FIG. 4A. These functions are illustrated as examples and it is anticipated that other mechanisms may be implemented in various embodiments.

An example structure for modulation and up-conversion to the carrier frequency of the complex-valued SC-FDMA or CP-OFDM baseband signal for an antenna port and/or the complex-valued Physical Random Access CHannel (PRACH) baseband signal is shown in FIG. 4B. Filtering may be employed prior to transmission.

An example structure for downlink transmissions is shown in FIG. 4C. The baseband signal representing a downlink physical channel may perform one or more functions. The one or more functions may comprise: scrambling of coded bits in a codeword to be transmitted on a physical channel; modulation of scrambled bits to generate complex-valued modulation symbols; mapping of the complex-valued modulation symbols onto one or several transmission layers; precoding of the complex-valued modulation symbols on a layer for transmission on the antenna ports; mapping of complex-valued modulation symbols for an antenna port to resource elements; generation of complex-valued time-domain OFDM signal for an antenna port; and/or the like. These functions are illustrated as examples and it is anticipated that other mechanisms may be implemented in various embodiments.

In an example, a gNB may transmit a first symbol and a second symbol on an antenna port, to a wireless device. The wireless device may infer the channel (e.g., fading gain, multipath delay, etc.) for conveying the second symbol on the antenna port, from the channel for conveying the first symbol on the antenna port. In an example, a first antenna port and a second antenna port may be quasi co-located if one or more large-scale properties of the channel over which a first symbol on the first antenna port is conveyed may be inferred from the channel over which a second symbol on a second antenna port is conveyed. The one or more large-scale properties may comprise at least one of: delay spread; doppler spread; doppler shift; average gain; average delay; and/or spatial Receiving (Rx) parameters.

An example modulation and up-conversion to the carrier frequency of the complex-valued OFDM baseband signal for an antenna port is shown in FIG. 4D. Filtering may be employed prior to transmission.

Figure 5A:
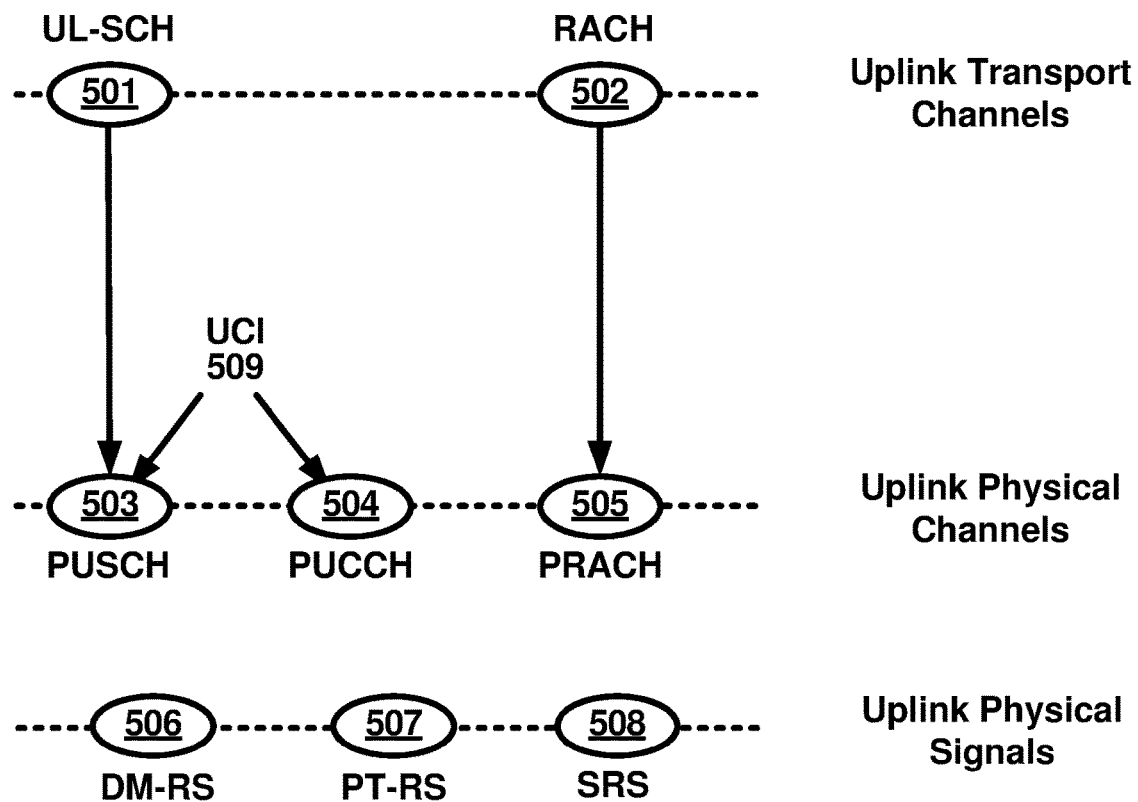
FIG. 5A is a diagram of an example uplink channel mapping and example uplink physical signals as per an aspect of an embodiment of the present disclosure.
Figure 5B:
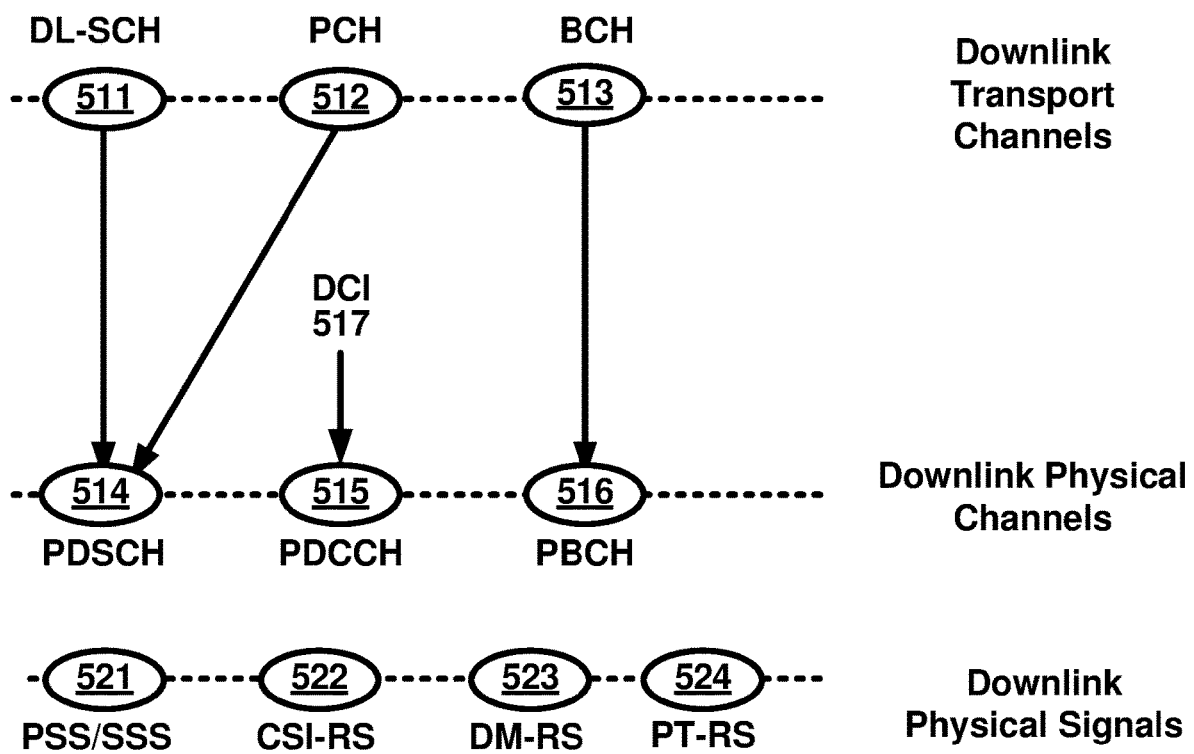
FIG. 5B is a diagram of an example downlink channel mapping and example downlink physical signals as per an aspect of an embodiment of the present disclosure.

FIG. 5A is a diagram of an example uplink channel mapping and example uplink physical signals. FIG. 5B is a diagram of an example downlink channel mapping and a downlink physical signals. In an example, a physical layer may provide one or more information transfer services to a MAC and/or one or more higher layers. For example, the physical layer may provide the one or more information transfer services to the MAC via one or more transport channels. An information transfer service may indicate how and with what characteristics data are transferred over the radio interface.

In an example embodiment, a radio network may comprise one or more downlink and/or uplink transport channels. For example, a diagram in FIG. 5A shows example uplink transport channels comprising Uplink-Shared CHannel (UL-SCH) 501 and Random Access CHannel (RACH) 502. A diagram in FIG. 5B shows example downlink transport channels comprising Downlink-Shared CHannel (DL-SCH) 511, Paging CHannel (PCH) 512, and Broadcast CHannel (BCH) 513. A transport channel may be mapped to one or more corresponding physical channels. For example, UL-SCH 501 may be mapped to Physical Uplink Shared CHannel (PUSCH) 503. RACH 502 may be mapped to PRACH 505. DL-SCH 511 and PCH 512 may be mapped to Physical Downlink Shared CHannel (PDSCH) 514. BCH 513 may be mapped to Physical Broadcast CHannel (PBCH) 516.

There may be one or more physical channels without a corresponding transport channel. The one or more physical channels may be employed for Uplink Control Information (UCI) 509 and/or Downlink Control Information (DCI) 517. For example, Physical Uplink Control CHannel (PUCCH) 504 may carry UCI 509 from a UE to a base station. For example, Physical Downlink Control CHannel (PDCCH) 515 may carry DCI 517 from a base station to a UE. NR may support UCI 509 multiplexing in PUSCH 503 when UCI 509 and PUSCH 503 transmissions may coincide in a slot at least in part. The UCI 509 may comprise at least one of CSI, Acknowledgement (ACK)/Negative Acknowledgement (NACK), and/or scheduling request. The DCI 517 on PDCCH 515 may indicate at least one of following: one or more downlink assignments and/or one or more uplink scheduling grants In uplink, a UE may transmit one or more Reference Signals (RSs) to a base station. For example, the one or more RSs may be at least one of Demodulation-RS (DM-RS) 506, Phase Tracking-RS (PT-RS) 507, and/or Sounding RS (SRS) 508. In downlink, a base station may transmit (e.g., unicast, multicast, and/or broadcast) one or more RSs to a UE. For example, the one or more RSs may be at least one of Primary Synchronization Signal (PSS)/Secondary Synchronization Signal (SSS) 521, CSI-RS 522, DM-RS 523, and/or PT-RS 524.

In an example, a UE may transmit one or more uplink DM-RSs 506 to a base station for channel estimation, for example, for coherent demodulation of one or more uplink physical channels (e.g., PUSCH 503 and/or PUCCH 504). For example, a UE may transmit a base station at least one uplink DM-RS 506 with PUSCH 503 and/or PUCCH 504, wherein the at least one uplink DM-RS 506 may be spanning a same frequency range as a corresponding physical channel.

In an example, a base station may configure a UE with one or more uplink DM-RS configurations. At least one DM-RS configuration may support a front-loaded DM-RS pattern. A front-loaded DM-RS may be mapped over one or more OFDM symbols (e.g., 1 or 2 adjacent OFDM symbols). One or more additional uplink DM-RS may be configured to transmit at one or more symbols of a PUSCH and/or PUCCH. A base station may semi-statistically configure a UE with a maximum number of front-loaded DM-RS symbols for PUSCH and/or PUCCH. For example, a UE may schedule a single-symbol DM-RS and/or double symbol DM-RS based on a maximum number of front-loaded DM-RS symbols, wherein a base station may configure the UE with one or more additional uplink DM-RS for PUSCH and/or PUCCH. A new radio network may support, e.g., at least for CP-OFDM, a common DM-RS structure for DL and UL, wherein a DM-RS location, DM-RS pattern, and/or scrambling sequence may be same or different.

In an example, whether uplink PT-RS 507 is present or not may depend on a RRC configuration. For example, a presence of uplink PT-RS may be UE-specifically configured. For example, a presence and/or a pattern of uplink PT-RS 507 in a scheduled resource may be UE-specifically configured by a combination of RRC signaling and/or association with one or more parameters employed for other purposes (e.g., Modulation and Coding Scheme (MCS)) which may be indicated by DCI. When configured, a dynamic presence of uplink PT-RS 507 may be associated with one or more DCI parameters comprising at least MCS. A radio network may support plurality of uplink PT-RS densities defined in time/frequency domain. When present, a frequency domain density may be associated with at least one configuration of a scheduled bandwidth. A UE may assume a same precoding for a DMRS port and a PT-RS port. A number of PT-RS ports may be fewer than a number of DM-RS ports in a scheduled resource. For example, uplink PT-RS 507 may be confined in the scheduled time/frequency duration for a UE.

In an example, a UE may transmit SRS 508 to a base station for channel state estimation to support uplink channel dependent scheduling and/or link adaptation. For example, SRS 508 transmitted by a UE may allow for a base station to estimate an uplink channel state at one or more different frequencies. A base station scheduler may employ an uplink channel state to assign one or more resource blocks of good quality for an uplink PUSCH transmission from a UE. A base station may semi-statistically configure a UE with one or more SRS resource sets. For an SRS resource set, a base station may configure a UE with one or more SRS resources. An SRS resource set applicability may be configured by a higher layer (e.g., RRC) parameter. For example, when a higher layer parameter indicates beam management, a SRS resource in each of one or more SRS resource sets may be transmitted at a time instant. A UE may transmit one or more SRS resources in different SRS resource sets simultaneously. A new radio network may support aperiodic, periodic and/or semi-persistent SRS transmissions. A UE may transmit SRS resources based on one or more trigger types, wherein the one or more trigger types may comprise higher layer signaling (e.g., RRC) and/or one or more DCI formats (e.g., at least one DCI format may be employed for a UE to select at least one of one or more configured SRS resource sets. An SRS trigger type 0 may refer to an SRS triggered based on a higher layer signaling. An SRS trigger type 1 may refer to an SRS triggered based on one or more DCI formats. In an example, when PUSCH 503 and SRS 508 are transmitted in a same slot, a UE may be configured to transmit SRS 508 after a transmission of PUSCH 503 and corresponding uplink DM-RS 506.

In an example, a base station may semi-statistically configure a UE with one or more SRS configuration parameters indicating at least one of following: a SRS resource configuration identifier, a number of SRS ports, time domain behavior of SRS resource configuration (e.g., an indication of periodic, semi-persistent, or aperiodic SRS), slot (minislot, and/or subframe) level periodicity and/or offset for a periodic and/or aperiodic SRS resource, a number of OFDM symbols in a SRS resource, starting OFDM symbol of a SRS resource, a SRS bandwidth, a frequency hopping bandwidth, a cyclic shift, and/or a SRS sequence ID.

In an example, in a time domain, an SS/PBCH block may comprise one or more OFDM symbols (e.g., 4 OFDM symbols numbered in increasing order from 0 to 3) within the SS/PBCH block. An SS/PBCH block may comprise PSS/SSS 521 and PBCH 516. In an example, in the frequency domain, an SS/PBCH block may comprise one or more contiguous subcarriers (e.g., 240 contiguous subcarriers with the subcarriers numbered in increasing order from 0 to 239) within the SS/PBCH block. For example, a PSS/SSS 521 may occupy 1 OFDM symbol and 127 subcarriers. For example, PBCH 516 may span across 3 OFDM symbols and 240 subcarriers. A UE may assume that one or more SS/PBCH blocks transmitted with a same block index may be quasi co-located, e.g., with respect to Doppler spread, Doppler shift, average gain, average delay, and spatial Rx parameters. A UE may not assume quasi co-location for other SS/PBCH block transmissions. A periodicity of an SS/PBCH block may be configured by a radio network (e.g., by an RRC signaling) and one or more time locations where the SS/PBCH block may be sent may be determined by sub-carrier spacing. In an example, a UE may assume a band-specific sub-carrier spacing for an SS/PBCH block unless a radio network has configured a UE to assume a different sub-carrier spacing.

In an example, downlink CSI-RS 522 may be employed for a UE to acquire channel state information. A radio network may support periodic, aperiodic, and/or semi-persistent transmission of downlink CSI-RS 522. For example, a base station may semi-statistically configure and/or reconfigure a UE with periodic transmission of downlink CSI-RS 522. A configured CSI-RS resources may be activated ad/or deactivated. For semi-persistent transmission, an activation and/or deactivation of CSI-RS resource may be triggered dynamically. In an example, CSI-RS configuration may comprise one or more parameters indicating at least a number of antenna ports. For example, a base station may configure a UE with 32 ports. A base station may semi-statistically configure a UE with one or more CSI-RS resource sets. One or more CSI-RS resources may be allocated from one or more CSI-RS resource sets to one or more UEs. For example, a base station may semi-statistically configure one or more parameters indicating CSI RS resource mapping, for example, time-domain location of one or more CSI-RS resources, a bandwidth of a CSI-RS resource, and/or a periodicity. In an example, a UE may be configured to employ a same OFDM symbols for downlink CSI-RS 522 and control resource set (coreset) when the downlink CSI-RS 522 and coreset are spatially quasi co-located and resource elements associated with the downlink CSI-RS 522 are the outside of PRBs configured for coreset. In an example, a UE may be configured to employ a same OFDM symbols for downlink CSI-RS 522 and SSB/PBCH when the downlink CSI-RS 522 and SSB/PBCH are spatially quasi co-located and resource elements associated with the downlink CSI-RS 522 are the outside of PRBs configured for SSB/PBCH.

In an example, a UE may transmit one or more downlink DM-RSs 523 to a base station for channel estimation, for example, for coherent demodulation of one or more downlink physical channels (e.g., PDSCH 514). For example, a radio network may support one or more variable and/or configurable DM-RS patterns for data demodulation. At least one downlink DM-RS configuration may support a front-loaded DM-RS pattern. A front-loaded DM-RS may be mapped over one or more OFDM symbols (e.g., 1 or 2 adjacent OFDM symbols). A base station may semi-statistically configure a UE with a maximum number of front-loaded DM-RS symbols for PDSCH 514. For example, a DM-RS configuration may support one or more DM-RS ports. For example, for single user-MIMO, a DM-RS configuration may support at least 8 orthogonal downlink DM-RS ports. For example, for multiuser-MIMO, a DM-RS configuration may support 12 orthogonal downlink DM-RS ports. A radio network may support, e.g., at least for CP-OFDM, a common DM-RS structure for DL and UL, wherein a DM-RS location, DM-RS pattern, and/or scrambling sequence may be same or different.

In an example, whether downlink PT-RS 524 is present or not may depend on a RRC configuration. For example, a presence of downlink PT-RS 524 may be UE-specifically configured. For example, a presence and/or a pattern of downlink PT-RS 524 in a scheduled resource may be UE-specifically configured by a combination of RRC signaling and/or association with one or more parameters employed for other purposes (e.g., MCS) which may be indicated by DCI. When configured, a dynamic presence of downlink PT-RS 524 may be associated with one or more DCI parameters comprising at least MCS. A radio network may support plurality of PT-RS densities defined in time/frequency domain. When present, a frequency domain density may be associated with at least one configuration of a scheduled bandwidth. A UE may assume a same precoding for a DMRS port and a PT-RS port. A number of PT-RS ports may be fewer than a number of DM-RS ports in a scheduled resource. For example, downlink PT-RS 524 may be confined in the scheduled time/frequency duration for a UE.

Figure 6:
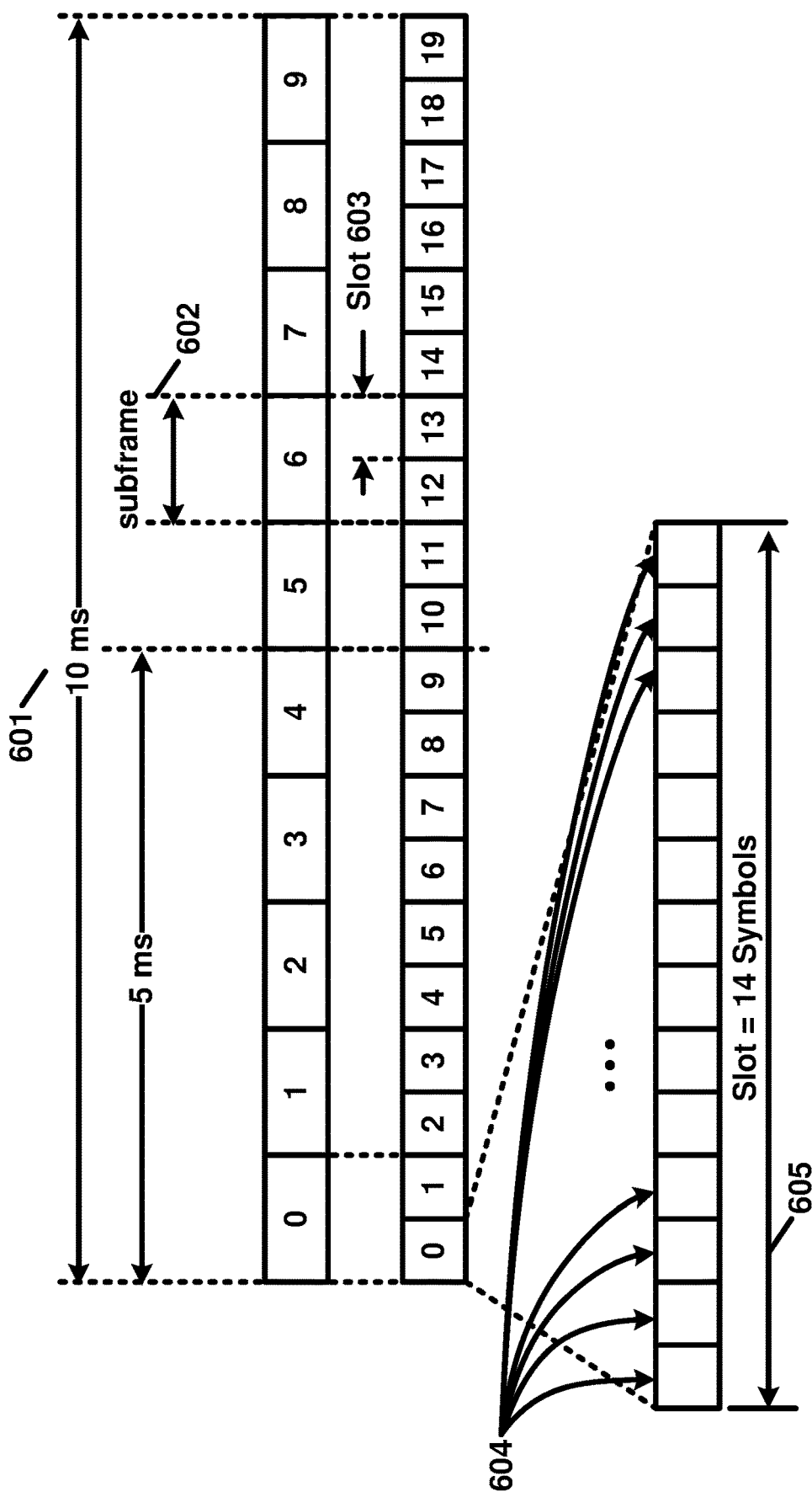
FIG. 6 is a diagram depicting an example frame structure as per an aspect of an embodiment of the present disclosure.

FIG. 6 is a diagram depicting an example frame structure for a carrier as per an aspect of an embodiment of the present disclosure. A multicarrier OFDM communication system may include one or more carriers, for example, ranging from 1 to 32 carriers, in case of carrier aggregation, or ranging from 1 to 64 carriers, in case of dual connectivity. Different radio frame structures may be supported (e.g., for FDD and for TDD duplex mechanisms). FIG. 6 shows an example frame structure. Downlink and uplink transmissions may be organized into radio frames 601. In this example, radio frame duration is 10 ms. In this example, a 10 ms radio frame 601 may be divided into ten equally sized subframes 602 with 1 ms duration. Subframe(s) may comprise one or more slots (e.g. slots 603 and 605) depending on subcarrier spacing and/or CP length. For example, a subframe with 15 kHz, 30 kHz, 60 kHz, 120 kHz, 240 kHz and 480 kHz subcarrier spacing may comprise one, two, four, eight, sixteen and thirty-two slots, respectively. In FIG. 6, a subframe may be divided into two equally sized slots 603 with 0.5 ms duration. For example, 10 subframes may be available for downlink transmission and 10 subframes may be available for uplink transmissions in a 10 ms interval. Uplink and downlink transmissions may be separated in the frequency domain. Slot(s) may include a plurality of OFDM symbols 604. The number of OFDM symbols 604 in a slot 605 may depend on the cyclic prefix length. For example, a slot may be 14 OFDM symbols for the same subcarrier spacing of up to 480 kHz with normal CP. A slot may be 12 OFDM symbols for the same subcarrier spacing of 60 kHz with extended CP. A slot may contain downlink, uplink, or a downlink part and an uplink part and/or alike.

Figure 7A:
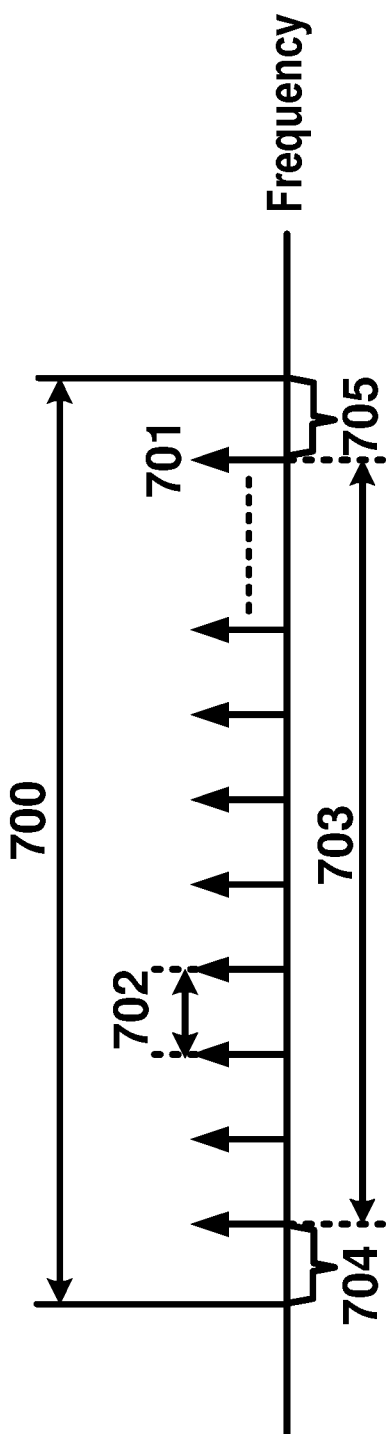
FIG. 7A and FIG. 7B are diagrams depicting example sets of OFDM subcarriers as per an aspect of an embodiment of the present disclosure.

FIG. 7A is a diagram depicting example sets of OFDM subcarriers as per an aspect of an embodiment of the present disclosure. In the example, a gNB may communicate with a wireless device with a carrier with an example channel bandwidth 700. Arrow(s) in the diagram may depict a subcarrier in a multicarrier OFDM system. The OFDM system may use technology such as OFDM technology, SC-FDMA technology, and/or the like. In an example, an arrow 701 shows a subcarrier transmitting information symbols. In an example, a subcarrier spacing 702, between two contiguous subcarriers in a carrier, may be any one of 15 KHz, 30 KHz, 60 KHz, 120 KHz, 240 KHz etc. In an example, different subcarrier spacing may correspond to different transmission numerologies. In an example, a transmission numerology may comprise at least: a numerology index; a value of subcarrier spacing; a type of cyclic prefix (CP). In an example, a gNB may transmit to/receive from a UE on a number of subcarriers 703 in a carrier. In an example, a bandwidth occupied by a number of subcarriers 703 (transmission bandwidth) may be smaller than the channel bandwidth 700 of a carrier, due to guard band 704 and 705. In an example, a guard band 704 and 705 may be used to reduce interference to and from one or more neighbor carriers. A number of subcarriers (transmission bandwidth) in a carrier may depend on the channel bandwidth of the carrier and the subcarrier spacing. For example, a transmission bandwidth, for a carrier with 20 MHz channel bandwidth and 15 KHz subcarrier spacing, may be in number of 1024 subcarriers.

Figure 7B:
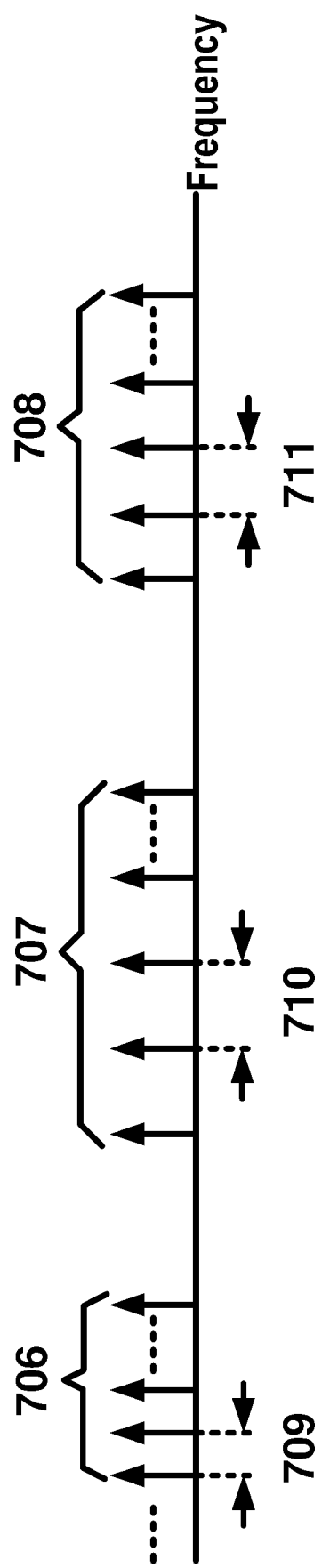

In an example, a gNB and a wireless device may communicate with multiple CCs when configured with CA. In an example, different component carriers may have different bandwidth and/or subcarrier spacing, if CA is supported. In an example, a gNB may transmit a first type of service to a UE on a first component carrier. The gNB may transmit a second type of service to the UE on a second component carrier. Different type of services may have different service requirement (e.g., data rate, latency, reliability), which may be suitable for transmission via different component carrier having different subcarrier spacing and/or bandwidth. FIG. 7B shows an example embodiment. A first component carrier may comprise a first number of subcarriers 706 with a first subcarrier spacing 709. A second component carrier may comprise a second number of subcarriers 707 with a second subcarrier spacing 710. A third component carrier may comprise a third number of subcarriers 708 with a third subcarrier spacing 711. Carriers in a multicarrier OFDM communication system may be contiguous carriers, non-contiguous carriers, or a combination of both contiguous and non-contiguous carriers.

Figure 8:
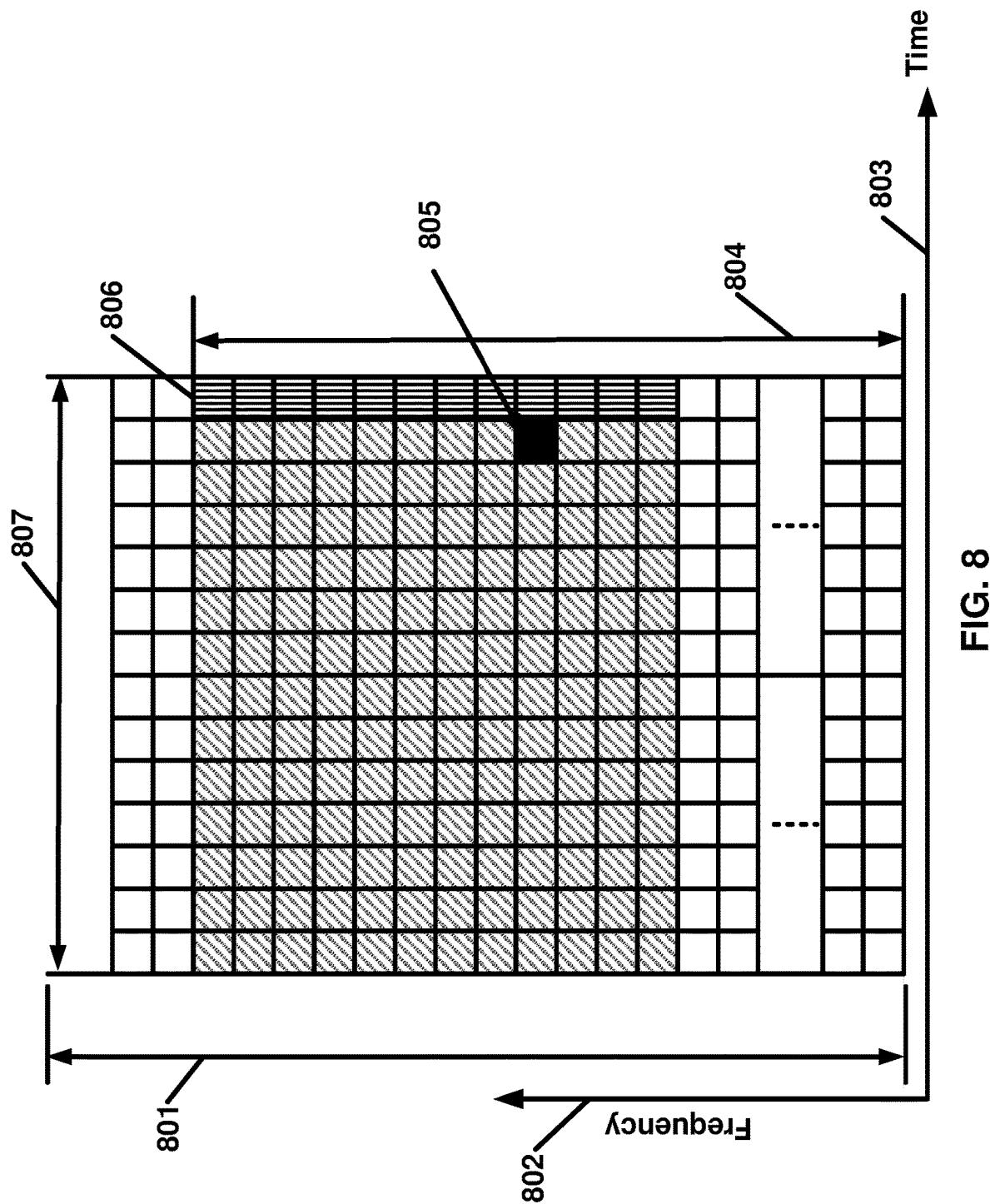
FIG. 8 is a diagram depicting example OFDM radio resources as per an aspect of an embodiment of the present disclosure.

FIG. 8 is a diagram depicting OFDM radio resources as per an aspect of an embodiment of the present disclosure. In an example, a carrier may have a transmission bandwidth 801. In an example, a resource grid may be in a structure of frequency domain 802 and time domain 803. In an example, a resource grid may comprise a first number of OFDM symbols in a subframe and a second number of resource blocks, starting from a common resource block indicated by higher-layer signaling (e.g. RRC signaling), for a transmission numerology and a carrier. In an example, in a resource grid, a resource unit identified by a subcarrier index and a symbol index may be a resource element 805. In an example, a subframe may comprise a first number of OFDM symbols 807 depending on a numerology associated with a carrier. For example, when a subcarrier spacing of a numerology of a carrier is 15 KHz, a subframe may have 14 OFDM symbols for a carrier. When a subcarrier spacing of a numerology is 30 KHz, a subframe may have 28 OFDM symbols. When a subcarrier spacing of a numerology is 60 Khz, a subframe may have 56 OFDM symbols, etc. In an example, a second number of resource blocks comprised in a resource grid of a carrier may depend on a bandwidth and a numerology of the carrier.

As shown in FIG. 8, a resource block 806 may comprise 12 subcarriers. In an example, multiple resource blocks may be grouped into a Resource Block Group (RBG) 804. In an example, a size of a RBG may depend on at least one of: a RRC message indicating a RBG size configuration; a size of a carrier bandwidth; or a size of a bandwidth part of a carrier. In an example, a carrier may comprise multiple bandwidth parts. A first bandwidth part of a carrier may have different frequency location and/or bandwidth from a second bandwidth part of the carrier.

In an example, a gNB may transmit a downlink control information comprising a downlink or uplink resource block assignment to a wireless device. A base station may transmit to or receive from, a wireless device, data packets (e.g. transport blocks) scheduled and transmitted via one or more resource blocks and one or more slots according to parameters in a downlink control information and/or RRC message(s). In an example, a starting symbol relative to a first slot of the one or more slots may be indicated to the wireless device. In an example, a gNB may transmit to or receive from, a wireless device, data packets scheduled on one or more RBGs and one or more slots.

In an example, a gNB may transmit a downlink control information comprising a downlink assignment to a wireless device via one or more PDCCHs. The downlink assignment may comprise parameters indicating at least modulation and coding format; resource allocation; and/or HARQ information related to DL-SCH. In an example, a resource allocation may comprise parameters of resource block allocation; and/or slot allocation. In an example, a gNB may dynamically allocate resources to a wireless device via a Cell-Radio Network Temporary Identifier (C-RNTI) on one or more PDCCHs. The wireless device may monitor the one or more PDCCHs in order to find possible allocation when its downlink reception is enabled. The wireless device may receive one or more downlink data package on one or more PDSCH scheduled by the one or more PDCCHs, when successfully detecting the one or more PDCCHs.

In an example, a gNB may allocate Configured Scheduling (CS) resources for down link transmission to a wireless device. The gNB may transmit one or more RRC messages indicating a periodicity of the CS grant. The gNB may transmit a DCI via a PDCCH addressed to a Configured Scheduling-RNTI (CS-RNTI) activating the CS resources. The DCI may comprise parameters indicating that the downlink grant is a CS grant. The CS grant may be implicitly reused according to the periodicity defined by the one or more RRC messages, until deactivated.

In an example, a gNB may transmit a downlink control information comprising an uplink grant to a wireless device via one or more PDCCHs. The uplink grant may comprise parameters indicating at least modulation and coding format; resource allocation; and/or HARQ information related to UL-SCH. In an example, a resource allocation may comprise parameters of resource block allocation; and/or slot allocation. In an example, a gNB may dynamically allocate resources to a wireless device via a C-RNTI on one or more PDCCHs. The wireless device may monitor the one or more PDCCHs in order to find possible resource allocation. The wireless device may transmit one or more uplink data package via one or more PUSCH scheduled by the one or more PDCCHs, when successfully detecting the one or more PDCCHs.

In an example, a gNB may allocate CS resources for uplink data transmission to a wireless device. The gNB may transmit one or more RRC messages indicating a periodicity of the CS grant. The gNB may transmit a DCI via a PDCCH addressed to a CS-RNTI activating the CS resources. The DCI may comprise parameters indicating that the uplink grant is a CS grant. The CS grant may be implicitly reused according to the periodicity defined by the one or more RRC message, until deactivated.

In an example, a base station may transmit DCI/control signaling via PDCCH. The DCI may take a format in a plurality of formats. A DCI may comprise downlink and/or uplink scheduling information (e.g., resource allocation information, HARQ related parameters, MCS), request for CSI (e.g., aperiodic CQI reports), request for SRS, uplink power control commands for one or more cells, one or more timing information (e.g., TB transmission/reception timing, HARQ feedback timing, etc.), etc. In an example, a DCI may indicate an uplink grant comprising transmission parameters for one or more transport blocks. In an example, a DCI may indicate downlink assignment indicating parameters for receiving one or more transport blocks. In an example, a DCI may be used by base station to initiate a contention-free random access at the wireless device. In an example, the base station may transmit a DCI comprising slot format indicator (SFI) notifying a slot format. In an example, the base station may transmit a DCI comprising pre-emption indication notifying the PRB(s) and/or OFDM symbol(s) where a UE may assume no transmission is intended for the UE. In an example, the base station may transmit a DCI for group power control of PUCCH or PUSCH or SRS. In an example, a DCI may correspond to an RNTI. In an example, the wireless device may obtain an RNTI in response to completing the initial access (e.g., C-RNTI). In an example, the base station may configure an RNTI for the wireless (e.g., CS-RNTI, TPC-CS-RNTI, TPC-PUCCH-RNTI, TPC-PUSCH-RNTI, TPC-SRS-RNTI). In an example, the wireless device may compute an RNTI (e.g., the wireless device may compute RA-RNTI based on resources used for transmission of a preamble). In an example, an RNTI may have a pre-configured value (e.g., P-RNTI or SI-RNTI). In an example, a wireless device may monitor a group common search space which may be used by base station for transmitting DCIs that are intended for a group of UEs. In an example, a group common DCI may correspond to an RNTI which is commonly configured for a group of UEs. In an example, a wireless device may monitor a UE-specific search space. In an example, a UE specific DCI may correspond to an RNTI configured for the wireless device.

A NR system may support a single beam operation and/or a multi-beam operation. In a multi-beam operation, a base station may perform a downlink beam sweeping to provide coverage for common control channels and/or downlink SS blocks, which may comprise at least a PSS, a SSS, and/or PBCH. A wireless device may measure quality of a beam pair link using one or more RSs. One or more SS blocks, or one or more CSI-RS resources, associated with a CSI-RS resource index (CRI), or one or more DM-RSs of PBCH, may be used as RS for measuring quality of a beam pair link. Quality of a beam pair link may be defined as a reference signal received power (RSRP) value, or a reference signal received quality (RSRQ) value, and/or a CSI value measured on RS resources. The base station may indicate whether an RS resource, used for measuring a beam pair link quality, is quasi-co-located (QCLed) with DM-RSs of a control channel. A RS resource and DM-RSs of a control channel may be called QCLed when a channel characteristics from a transmission on an RS to a wireless device, and that from a transmission on a control channel to a wireless device, are similar or same under a configured criterion. In a multi-beam operation, a wireless device may perform an uplink beam sweeping to access a cell.

In an example, a wireless device may be configured to monitor PDCCH on one or more beam pair links simultaneously depending on a capability of a wireless device. This may increase robustness against beam pair link blocking. A base station may transmit one or more messages to configure a wireless device to monitor PDCCH on one or more beam pair links in different PDCCH OFDM symbols. For example, a base station may transmit higher layer signaling (e.g. RRC signaling) or MAC CE comprising parameters related to the Rx beam setting of a wireless device for monitoring PDCCH on one or more beam pair links. A base station may transmit indication of spatial QCL assumption between an DL RS antenna port(s) (for example, cell-specific CSI-RS, or wireless device-specific CSI-RS, or SS block, or PBCH with or without DM-RSs of PBCH), and DL RS antenna port(s) for demodulation of DL control channel Signaling for beam indication for a PDCCH may be MAC CE signaling, or RRC signaling, or DCI signaling, or specification-transparent and/or implicit method, and combination of these signaling methods.

For reception of unicast DL data channel, a base station may indicate spatial QCL parameters between DL RS antenna port(s) and DM-RS antenna port(s) of DL data channel. The base station may transmit DCI (e.g. downlink grants) comprising information indicating the RS antenna port(s). The information may indicate RS antenna port(s) which may be QCL-ed with the DM-RS antenna port(s). Different set of DM-RS antenna port(s) for a DL data channel may be indicated as QCL with different set of the RS antenna port(s).

Figure 9A:
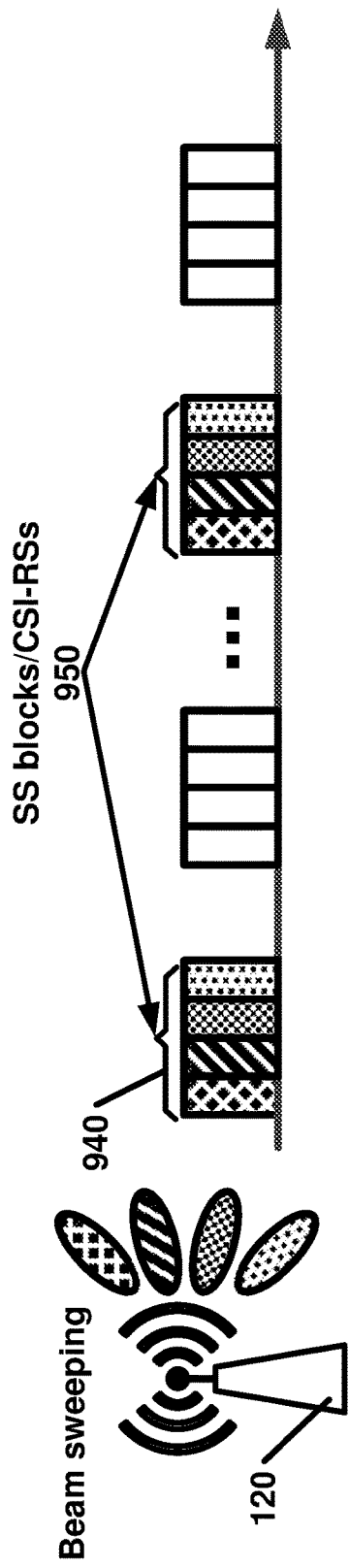
FIG. 9A is a diagram depicting an example CSI-RS and/or SS block transmission in a multi-beam system.

FIG. 9A is an example of beam sweeping in a DL channel. In an RRC_INACTIVE state or RRC_IDLE state, a wireless device may assume that SS blocks form an SS burst 940, and an SS burst set 950. The SS burst set 950 may have a given periodicity. For example, in a multi-beam operation, a base station 120 may transmit SS blocks in multiple beams, together forming a SS burst 940. One or more SS blocks may be transmitted on one beam. If multiple SS bursts 940 are transmitted with multiple beams, SS bursts together may form SS burst set 950.

A wireless device may further use CSI-RS in the multi-beam operation for estimating a beam quality of a links between a wireless device and a base station. A beam may be associated with a CSI-RS. For example, a wireless device may, based on a RSRP measurement on CSI-RS, report a beam index, as indicated in a CRI for downlink beam selection, and associated with a RSRP value of a beam. A CSI-RS may be transmitted on a CSI-RS resource including at least one of one or more antenna ports, one or more time or frequency radio resources. A CSI-RS resource may be configured in a cell-specific way by common RRC signaling, or in a wireless device-specific way by dedicated RRC signaling, and/or L1/L2 signaling. Multiple wireless devices covered by a cell may measure a cell-specific CSI-RS resource. A dedicated subset of wireless devices covered by a cell may measure a wireless device-specific CSI-RS resource.

A CSI-RS resource may be transmitted periodically, or using aperiodic transmission, or using a multi-shot or semi-persistent transmission. For example, in a periodic transmission in FIG. 9A, a base station 120 may transmit configured CSI-RS resources 940 periodically using a configured periodicity in a time domain. In an aperiodic transmission, a configured CSI-RS resource may be transmitted in a dedicated time slot. In a multi-shot or semi-persistent transmission, a configured CSI-RS resource may be transmitted within a configured period. Beams used for CSI-RS transmission may have different beam width than beams used for SS-blocks transmission.

Figure 9B:
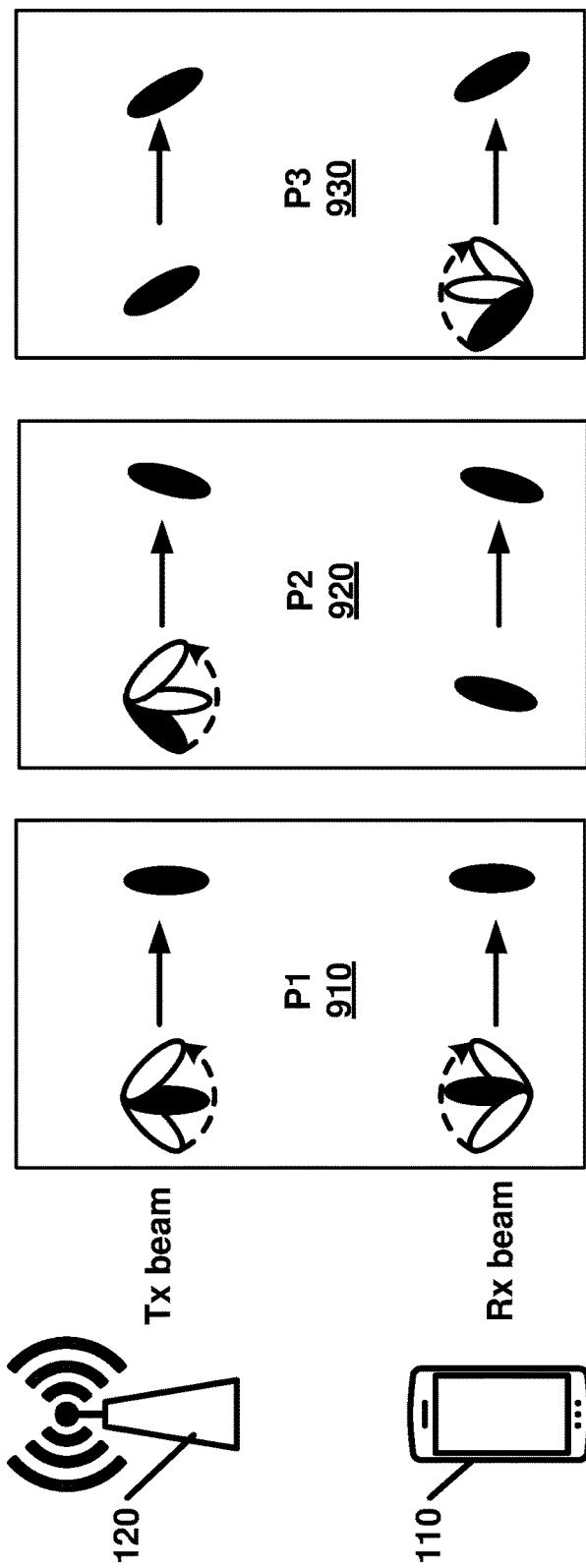
FIG. 9B is a diagram depicting an example downlink beam management procedure as per an aspect of an embodiment of the present disclosure.

FIG. 9B is an example of a beam management procedure in an example new radio network. A base station 120 and/or a wireless device 110 may perform a downlink L1/L2 beam management procedure. One or more of the following downlink L1/L2 beam management procedures may be performed within one or more wireless devices 110 and one or more base stations 120. In an example, a P-1 procedure 910 may be used to enable the wireless device 110 to measure one or more Transmission (Tx) beams associated with the base station 120 to support a selection of a first set of Tx beams associated with the base station 120 and a first set of Rx beam(s) associated with a wireless device 110. For beamforming at a base station 120, a base station 120 may sweep a set of different TX beams. For beamforming at a wireless device 110, a wireless device 110 may sweep a set of different Rx beams. In an example, a P-2 procedure 920 may be used to enable a wireless device 110 to measure one or more Tx beams associated with a base station 120 to possibly change a first set of Tx beams associated with a base station 120. A P-2 procedure 920 may be performed on a possibly smaller set of beams for beam refinement than in the P-1 procedure 910. A P-2 procedure 920 may be a special case of a P-1 procedure 910. In an example, a P-3 procedure 930 may be used to enable a wireless device 110 to measure at least one Tx beam associated with a base station 120 to change a first set of Rx beams associated with a wireless device 110.

A wireless device 110 may transmit one or more beam management reports to a base station 120. In one or more beam management reports, a wireless device 110 may indicate some beam pair quality parameters, comprising at least, one or more beam identifications; RSRP; Precoding Matrix Indicator (PMI)/Channel Quality Indicator (CQI)/Rank Indicator (RI) of a subset of configured beams. Based on one or more beam management reports, a base station 120 may transmit to a wireless device 110 a signal indicating that one or more beam pair links are one or more serving beams. A base station 120 may transmit PDCCH and PDSCH for a wireless device 110 using one or more serving beams.

In an example embodiment, new radio network may support a Bandwidth Adaptation (BA). In an example, receive and/or transmit bandwidths configured by an UE employing a BA may not be large. For example, a receive and/or transmit bandwidths may not be as large as a bandwidth of a cell. Receive and/or transmit bandwidths may be adjustable. For example, a UE may change receive and/or transmit bandwidths, e.g., to shrink during period of low activity to save power. For example, a UE may change a location of receive and/or transmit bandwidths in a frequency domain, e.g. to increase scheduling flexibility. For example, a UE may change a subcarrier spacing, e.g. to allow different services.

In an example embodiment, a subset of a total cell bandwidth of a cell may be referred to as a Bandwidth Part (BWP). A base station may configure a UE with one or more BWPs to achieve a BA. For example, a base station may indicate, to a UE, which of the one or more (configured) BWPs is an active BWP.

Figure 10:
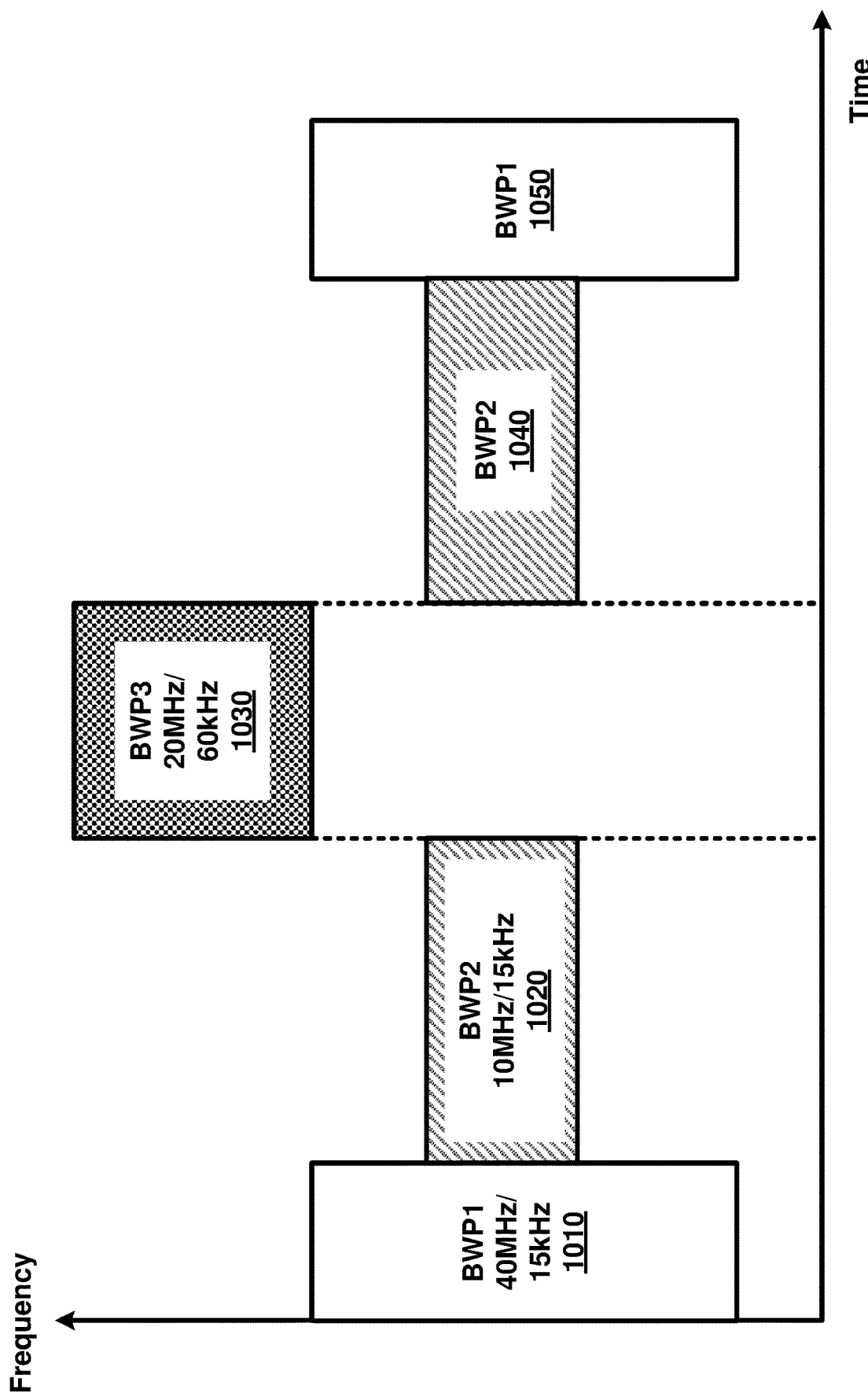
FIG. 10 is an example diagram of configured BWPs as per an aspect of an embodiment of the present disclosure.

FIG. 10 is an example diagram of 3 BWPs configured: BWP1 (1010 and 1050) with a width of 40 MHz and subcarrier spacing of 15 kHz; BWP2 (1020 and 1040) with a width of 10 MHz and subcarrier spacing of 15 kHz; BWP3 1030 with a width of 20 MHz and subcarrier spacing of 60 kHz.

In an example, a UE, configured for operation in one or more BWPs of a cell, may be configured by one or more higher layers (e.g. RRC layer) for a cell a set of one or more BWPs (e.g., at most four BWPs) for receptions by the UE (DL BWP set) in a DL bandwidth by at least one parameter DL-BWP and a set of one or more BWPs (e.g., at most four BWPs) for transmissions by a UE (UL BWP set) in an UL bandwidth by at least one parameter UL-BWP for a cell.

To enable BA on the PCell, a base station may configure a UE with one or more UL and DL BWP pairs. To enable BA on SCells (e.g., in case of CA), a base station may configure a UE at least with one or more DL BWPs (e.g., there may be none in an UL).

In an example, an initial active DL BWP may be defined by at least one of a location and number of contiguous PRBs, a subcarrier spacing, or a cyclic prefix, for a control resource set for at least one common search space. For operation on the PCell, one or more higher layer parameters may indicate at least one initial UL BWP for a random access procedure. If a UE is configured with a secondary carrier on a primary cell, the UE may be configured with an initial BWP for random access procedure on a secondary carrier.

In an example, for unpaired spectrum operation, a UE may expect that a center frequency for a DL BWP may be same as a center frequency for a UL BWP.

For example, for a DL BWP or an UL BWP in a set of one or more DL BWPs or one or more UL BWPs, respectively, a base statin may semi-statistically configure a UE for a cell with one or more parameters indicating at least one of following: a subcarrier spacing; a cyclic prefix; a number of contiguous PRBs; an index in the set of one or more DL BWPs and/or one or more UL BWPs; a link between a DL BWP and an UL BWP from a set of configured DL BWPs and UL BWPs; a DCI detection to a PDSCH reception timing; a PDSCH reception to a HARQ-ACK transmission timing value; a DCI detection to a PUSCH transmission timing value; an offset of a first PRB of a DL bandwidth or an UL bandwidth, respectively, relative to a first PRB of a bandwidth.

In an example, for a DL BWP in a set of one or more DL BWPs on a PCell, a base station may configure a UE with one or more control resource sets for at least one type of common search space and/or one UE-specific search space. For example, a base station may not configure a UE without a common search space on a PCell, or on a PSCell, in an active DL BWP.

For an UL BWP in a set of one or more UL BWPs, a base station may configure a UE with one or more resource sets for one or more PUCCH transmissions.

In an example, if a DCI comprises a BWP indicator field, a BWP indicator field value may indicate an active DL BWP, from a configured DL BWP set, for one or more DL receptions. If a DCI comprises a BWP indicator field, a BWP indicator field value may indicate an active UL BWP, from a configured UL BWP set, for one or more UL transmissions.

In an example, for a PCell, a base station may semi-statistically configure a UE with a default DL BWP among configured DL BWPs. If a UE is not provided a default DL BWP, a default BWP may be an initial active DL BWP.

In an example, a base station may configure a UE with a timer value for a PCell. For example, a UE may start a timer, referred to as BWP inactivity timer, when a UE detects a DCI indicating an active DL BWP, other than a default DL BWP, for a paired spectrum operation or when a UE detects a DCI indicating an active DL BWP or UL BWP, other than a default DL BWP or UL BWP, for an unpaired spectrum operation. The UE may increment the timer by an interval of a first value (e.g., the first value may be 1 millisecond or 0.5 milliseconds) if the UE does not detect a DCI during the interval for a paired spectrum operation or for an unpaired spectrum operation. In an example, the timer may expire when the timer is equal to the timer value. A UE may switch to the default DL BWP from an active DL BWP when the timer expires.

In an example, a base station may semi-statistically configure a UE with one or more BWPs. A UE may switch an active BWP from a first BWP to a second BWP in response to receiving a DCI indicating the second BWP as an active BWP and/or in response to an expiry of BWP inactivity timer (for example, the second BWP may be a default BWP). For example, FIG. 10 is an example diagram of 3 BWPs configured, BWP1 (1010 and 1050), BWP2 (1020 and 1040), and BWP3 (1030). BWP2 (1020 and 1040) may be a default BWP. BWP1 (1010) may be an initial active BWP. In an example, a UE may switch an active BWP from BWP1 1010 to BWP2 1020 in response to an expiry of BWP inactivity timer. For example, a UE may switch an active BWP from BWP2 1020 to BWP3 1030 in response to receiving a DCI indicating BWP3 1030 as an active BWP. Switching an active BWP from BWP3 1030 to BWP2 1040 and/or from BWP2 1040 to BWP1 1050 may be in response to receiving a DCI indicating an active BWP and/or in response to an expiry of BWP inactivity timer.

In an example, if a UE is configured for a secondary cell with a default DL BWP among configured DL BWPs and a timer value, UE procedures on a secondary cell may be same as on a primary cell using the timer value for the secondary cell and the default DL BWP for the secondary cell.

In an example, if a base station configures a UE with a first active DL BWP and a first active UL BWP on a secondary cell or carrier, a UE may employ an indicated DL BWP and an indicated UL BWP on a secondary cell as a respective first active DL BWP and first active UL BWP on a secondary cell or carrier.

Figure 11A:
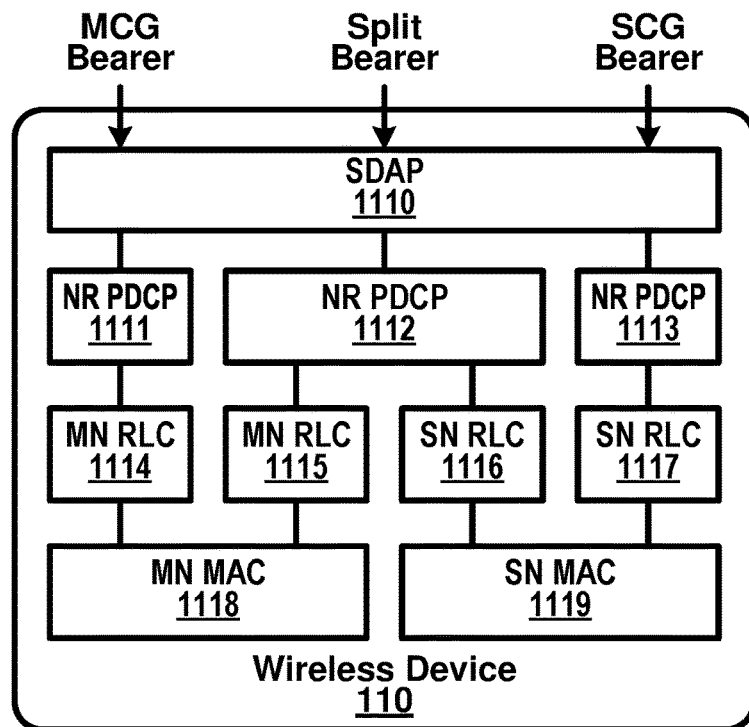
FIG. 11A and FIG. 11B are diagrams of an example multi-connectivity as per an aspect of an embodiment of the present disclosure.
Figure 11B:
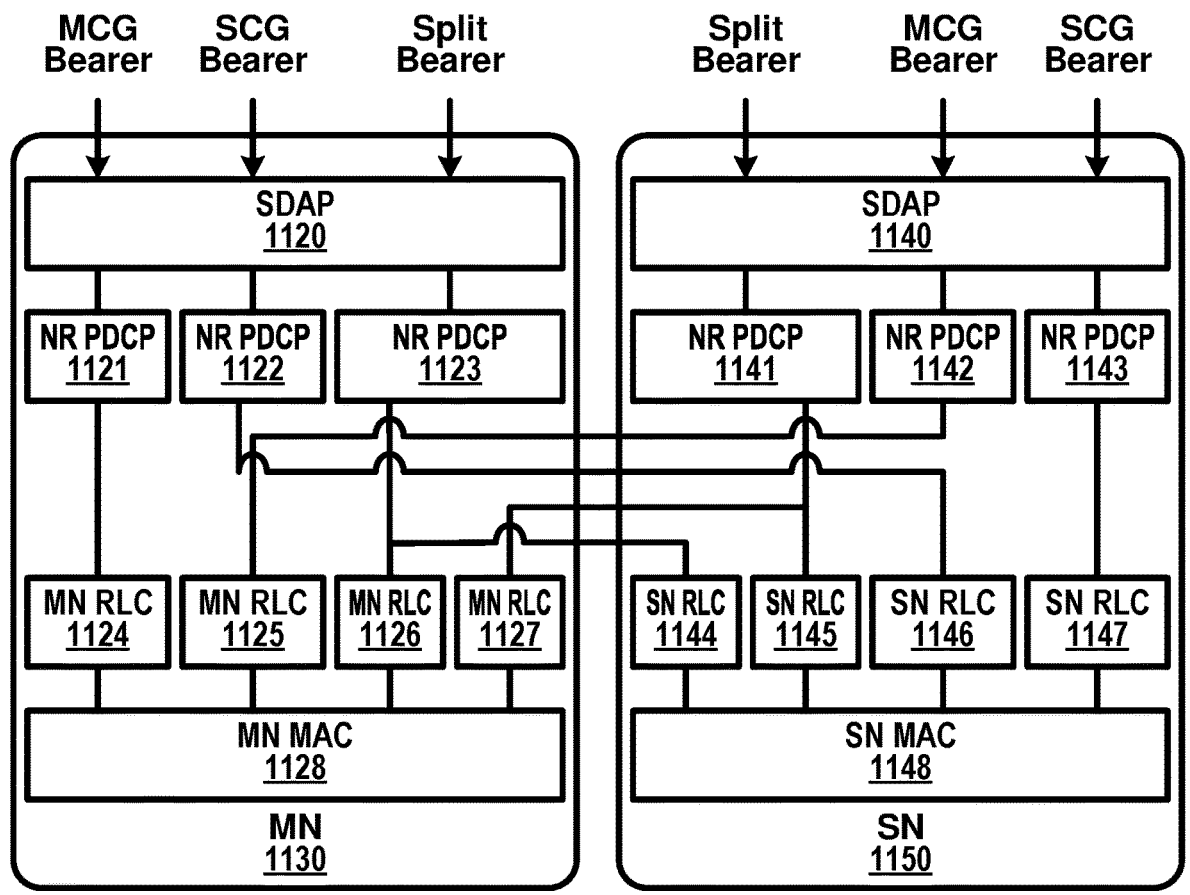

FIG. 11A and FIG. 11B show packet flows employing a multi connectivity (e.g. dual connectivity, multi connectivity, tight interworking, and/or the like). FIG. 11A is an example diagram of a protocol structure of a wireless device 110 (e.g. UE) with CA and/or multi connectivity as per an aspect of an embodiment. FIG. 11B is an example diagram of a protocol structure of multiple base stations with CA and/or multi connectivity as per an aspect of an embodiment. The multiple base stations may comprise a master node, MN 1130 (e.g. a master node, a master base station, a master gNB, a master eNB, and/or the like) and a secondary node, SN 1150 (e.g. a secondary node, a secondary base station, a secondary gNB, a secondary eNB, and/or the like). A master node 1130 and a secondary node 1150 may co-work to communicate with a wireless device 110.

When multi connectivity is configured for a wireless device 110, the wireless device 110, which may support multiple reception/transmission functions in an RRC connected state, may be configured to utilize radio resources provided by multiple schedulers of a multiple base stations. Multiple base stations may be inter-connected via a non-ideal or ideal backhaul (e.g. Xn interface, X2 interface, and/or the like). A base station involved in multi connectivity for a certain wireless device may perform at least one of two different roles: a base station may either act as a master base station or as a secondary base station. In multi connectivity, a wireless device may be connected to one master base station and one or more secondary base stations. In an example, a master base station (e.g. the MN 1130) may provide a master cell group (MCG) comprising a primary cell and/or one or more secondary cells for a wireless device (e.g. the wireless device 110). A secondary base station (e.g. the SN 1150) may provide a secondary cell group (SCG) comprising a primary secondary cell (PSCell) and/or one or more secondary cells for a wireless device (e.g. the wireless device 110).

In multi connectivity, a radio protocol architecture that a bearer employs may depend on how a bearer is setup. In an example, three different type of bearer setup options may be supported: an MCG bearer, an SCG bearer, and/or a split bearer. A wireless device may receive/transmit packets of an MCG bearer via one or more cells of the MCG, and/or may receive/transmits packets of an SCG bearer via one or more cells of an SCG. Multi-connectivity may also be described as having at least one bearer configured to use radio resources provided by the secondary base station. Multi-connectivity may or may not be configured/implemented in some of the example embodiments.

In an example, a wireless device (e.g. Wireless Device 110) may transmit and/or receive: packets of an MCG bearer via an SDAP layer (e.g. SDAP 1110), a PDCP layer (e.g. NR PDCP 1111), an RLC layer (e.g. MN RLC 1114), and a MAC layer (e.g. MN MAC 1118); packets of a split bearer via an SDAP layer (e.g. SDAP 1110), a PDCP layer (e.g. NR PDCP 1112), one of a master or secondary RLC layer (e.g. MN RLC 1115, SN RLC 1116), and one of a master or secondary MAC layer (e.g. MN MAC 1118, SN MAC 1119); and/or packets of an SCG bearer via an SDAP layer (e.g. SDAP 1110), a PDCP layer (e.g. NR PDCP 1113), an RLC layer (e.g. SN RLC 1117), and a MAC layer (e.g. MN MAC 1119).

In an example, a master base station (e.g. MN 1130) and/or a secondary base station (e.g. SN 1150) may transmit/receive: packets of an MCG bearer via a master or secondary node SDAP layer (e.g. SDAP 1120, SDAP 1140), a master or secondary node PDCP layer (e.g. NR PDCP 1121, NR PDCP 1142), a master node RLC layer (e.g. MN RLC 1124, MN RLC 1125), and a master node MAC layer (e.g. MN MAC 1128); packets of an SCG bearer via a master or secondary node SDAP layer (e.g. SDAP 1120, SDAP 1140), a master or secondary node PDCP layer (e.g. NR PDCP 1122, NR PDCP 1143), a secondary node RLC layer (e.g. SN RLC 1146, SN RLC 1147), and a secondary node MAC layer (e.g. SN MAC 1148); packets of a split bearer via a master or secondary node SDAP layer (e.g. SDAP 1120, SDAP 1140), a master or secondary node PDCP layer (e.g. NR PDCP 1123, NR PDCP 1141), a master or secondary node RLC layer (e.g. MN RLC 1126, SN RLC 1144, SN RLC 1145, MN RLC 1127), and a master or secondary node MAC layer (e.g. MN MAC 1128, SN MAC 1148).

In multi connectivity, a wireless device may configure multiple MAC entities: one MAC entity (e.g. MN MAC 1118) for a master base station, and other MAC entities (e.g. SN MAC 1119) for a secondary base station. In multi-connectivity, a configured set of serving cells for a wireless device may comprise two subsets: an MCG comprising serving cells of a master base station, and SCGs comprising serving cells of a secondary base station. For an SCG, one or more of following configurations may be applied: at least one cell of an SCG has a configured UL CC and at least one cell of a SCG, named as primary secondary cell (PSCell, PCell of SCG, or sometimes called PCell), is configured with PUCCH resources; when an SCG is configured, there may be at least one SCG bearer or one Split bearer; upon detection of a physical layer problem or a random access problem on a PSCell, or a number of NR RLC retransmissions has been reached associated with the SCG, or upon detection of an access problem on a PSCell during a SCG addition or a SCG change: an RRC connection re-establishment procedure may not be triggered, UL transmissions towards cells of an SCG may be stopped, a master base station may be informed by a wireless device of a SCG failure type, for split bearer, a DL data transfer over a master base station may be maintained; an NR RLC acknowledged mode (AM) bearer may be configured for a split bearer; PCell and/or PSCell may not be de-activated; PSCell may be changed with a SCG change procedure (e.g. with security key change and a RACH procedure); and/or a bearer type change between a split bearer and a SCG bearer or simultaneous configuration of a SCG and a split bearer may or may not supported.

With respect to interaction between a master base station and a secondary base stations for multi-connectivity, one or more of the following may be applied: a master base station and/or a secondary base station may maintain RRM measurement configurations of a wireless device; a master base station may (e.g. based on received measurement reports, traffic conditions, and/or bearer types) may decide to request a secondary base station to provide additional resources (e.g. serving cells) for a wireless device; upon receiving a request from a master base station, a secondary base station may create/modify a container that may result in configuration of additional serving cells for a wireless device (or decide that the secondary base station has no resource available to do so); for a UE capability coordination, a master base station may provide (a part of) an AS configuration and UE capabilities to a secondary base station; a master base station and a secondary base station may exchange information about a UE configuration by employing of RRC containers (inter-node messages) carried via Xn messages; a secondary base station may initiate a reconfiguration of the secondary base station existing serving cells (e.g. PUCCH towards the secondary base station); a secondary base station may decide which cell is a PSCell within a SCG; a master base station may or may not change content of RRC configurations provided by a secondary base station; in case of a SCG addition and/or a SCG SCell addition, a master base station may provide recent (or the latest) measurement results for SCG cell(s); a master base station and secondary base stations may receive information of SFN and/or subframe offset of each other from OAM and/or via an Xn interface, (e.g. for a purpose of DRX alignment and/or identification of a measurement gap). In an example, when adding a new SCG SCell, dedicated RRC signaling may be used for sending required system information of a cell as for CA, except for a SFN acquired from a MIB of a PSCell of a SCG.

Figure 12:
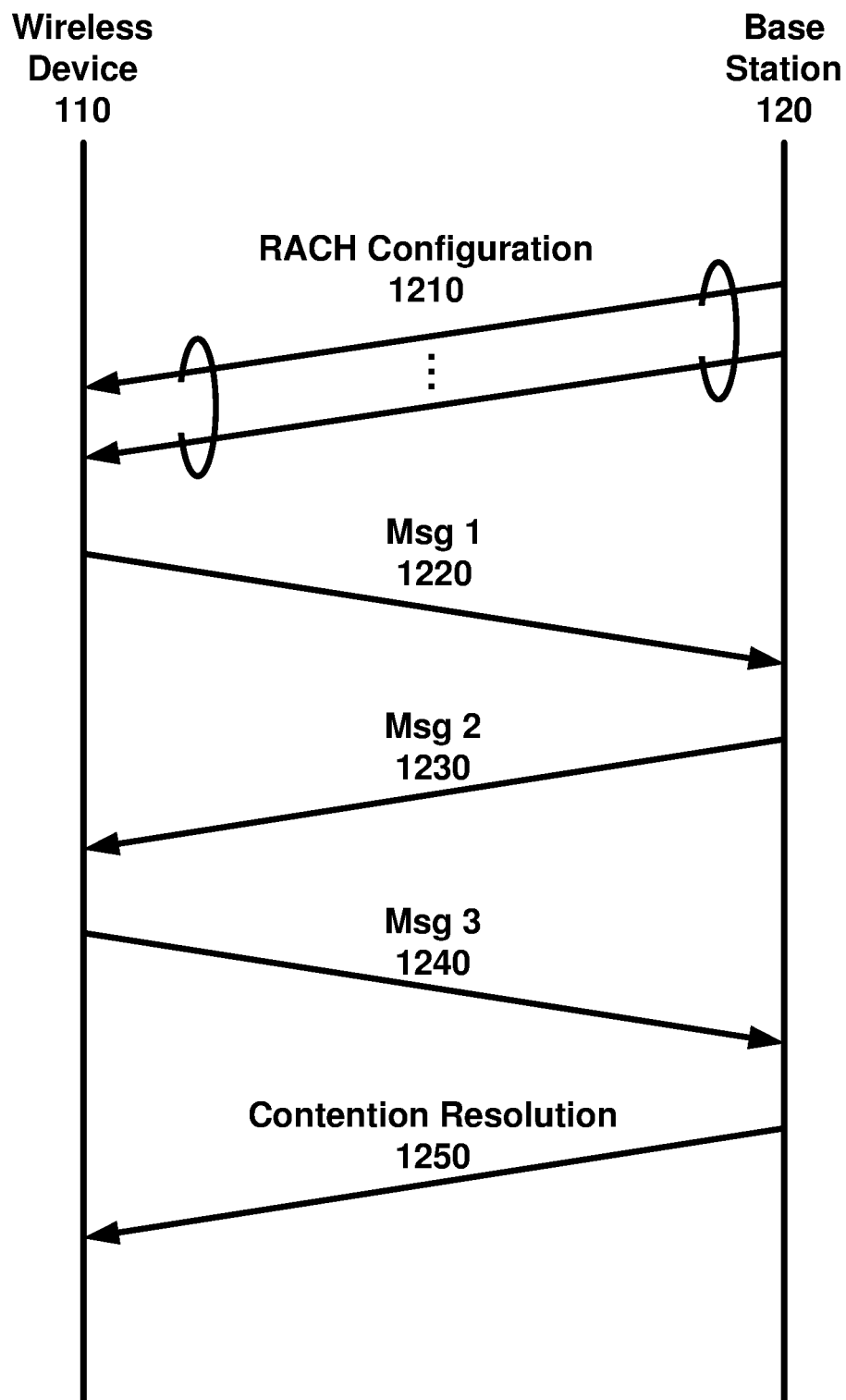
FIG. 12 is a diagram of an example random access procedure as per an aspect of an embodiment of the present disclosure.

FIG. 12 is an example diagram of a random access procedure. One or more events may trigger a random access procedure. For example, one or more events may be at least one of following: initial access from RRC_IDLE, RRC connection re-establishment procedure, handover, DL or UL data arrival during RRC_CONNECTED when UL synchronization status is non-synchronized, transition from RRC_Inactive, and/or request for other system information. For example, a PDCCH order, a MAC entity, and/or a beam failure indication may initiate a random access procedure.

In an example embodiment, a random access procedure may be at least one of a contention based random access procedure and a contention free random access procedure. For example, a contention based random access procedure may comprise, one or more Msg 1 1220 transmissions, one or more Msg2 1230 transmissions, one or more Msg3 1240 transmissions, and contention resolution 1250. For example, a contention free random access procedure may comprise one or more Msg 1 1220 transmissions and one or more Msg2 1230 transmissions.

In an example, a base station may transmit (e.g., unicast, multicast, or broadcast), to a UE, a RACH configuration 1210 via one or more beams. The RACH configuration 1210 may comprise one or more parameters indicating at least one of following: available set of PRACH resources for a transmission of a random access preamble, initial preamble power (e.g., random access preamble initial received target power), an RSRP threshold for a selection of a SS block and corresponding PRACH resource, a power-ramping factor (e.g., random access preamble power ramping step), random access preamble index, a maximum number of preamble transmission, preamble group A and group B, a threshold (e.g., message size) to determine the groups of random access preambles, a set of one or more random access preambles for system information request and corresponding PRACH resource(s), if any, a set of one or more random access preambles for beam failure recovery request and corresponding PRACH resource(s), if any, a time window to monitor RA response(s), a time window to monitor response(s) on beam failure recovery request, and/or a contention resolution timer.

In an example, the Msg1 1220 may be one or more transmissions of a random access preamble. For a contention based random access procedure, a UE may select a SS block with a RSRP above the RSRP threshold. If random access preambles group B exists, a UE may select one or more random access preambles from a group A or a group B depending on a potential Msg3 1240 size. If a random access preambles group B does not exist, a UE may select the one or more random access preambles from a group A. A UE may select a random access preamble index randomly (e.g. with equal probability or a normal distribution) from one or more random access preambles associated with a selected group. If a base station semi-statistically configures a UE with an association between random access preambles and SS blocks, the UE may select a random access preamble index randomly with equal probability from one or more random access preambles associated with a selected SS block and a selected group.

For example, a UE may initiate a contention free random access procedure based on a beam failure indication from a lower layer. For example, a base station may semi-statistically configure a UE with one or more contention free PRACH resources for beam failure recovery request associated with at least one of SS blocks and/or CSI-RSs. If at least one of SS blocks with a RSRP above a first RSRP threshold amongst associated SS blocks or at least one of CSI-RSs with a RSRP above a second RSRP threshold amongst associated CSI-RSs is available, a UE may select a random access preamble index corresponding to a selected SS block or CSI-RS from a set of one or more random access preambles for beam failure recovery request.

For example, a UE may receive, from a base station, a random access preamble index via PDCCH or RRC for a contention free random access procedure. If a base station does not configure a UE with at least one contention free PRACH resource associated with SS blocks or CSI-RS, the UE may select a random access preamble index. If a base station configures a UE with one or more contention free PRACH resources associated with SS blocks and at least one SS block with a RSRP above a first RSRP threshold amongst associated SS blocks is available, the UE may select the at least one SS block and select a random access preamble corresponding to the at least one SS block. If a base station configures a UE with one or more contention free PRACH resources associated with CSI-RSs and at least one CSI-RS with a RSRP above a second RSPR threshold amongst the associated CSI-RSs is available, the UE may select the at least one CSI-RS and select a random access preamble corresponding to the at least one CSI-RS.

A UE may perform one or more Msg1 1220 transmissions by transmitting the selected random access preamble. For example, if a UE selects an SS block and is configured with an association between one or more PRACH occasions and one or more SS blocks, the UE may determine an PRACH occasion from one or more PRACH occasions corresponding to a selected SS block. For example, if a UE selects a CSI-RS and is configured with an association between one or more PRACH occasions and one or more CSI-RSs, the UE may determine a PRACH occasion from one or more PRACH occasions corresponding to a selected CSI-RS. A UE may transmit, to a base station, a selected random access preamble via a selected PRACH occasions. A UE may determine a transmit power for a transmission of a selected random access preamble at least based on an initial preamble power and a power-ramping factor. A UE may determine a RA-RNTI associated with a selected PRACH occasions in which a selected random access preamble is transmitted. For example, a UE may not determine a RA-RNTI for a beam failure recovery request. A UE may determine an RA-RNTI at least based on an index of a first OFDM symbol and an index of a first slot of a selected PRACH occasions, and/or an uplink carrier index for a transmission of Msg1 1220.

In an example, a UE may receive, from a base station, a random access response, Msg 2 1230. A UE may start a time window (e.g., ra-Response Window) to monitor a random access response. For beam failure recovery request, a base station may configure a UE with a different time window (e.g., bfr-ResponseWindow) to monitor response on beam failure recovery request. For example, a UE may start a time window (e.g., ra-ResponseWindow or bfr-Response Window) at a start of a first PDCCH occasion after a fixed duration of one or more symbols from an end of a preamble transmission. If a UE transmits multiple preambles, the UE may start a time window at a start of a first PDCCH occasion after a fixed duration of one or more symbols from an end of a first preamble transmission. A UE may monitor a PDCCH of a cell for at least one random access response identified by a RA-RNTI or for at least one response to beam failure recovery request identified by a C-RNTI while a timer for a time window is running.

In an example, a UE may consider a reception of random access response successful if at least one random access response comprises a random access preamble identifier corresponding to a random access preamble transmitted by the UE. A UE may consider the contention free random access procedure successfully completed if a reception of random access response is successful. If a contention free random access procedure is triggered for a beam failure recovery request, a UE may consider a contention free random access procedure successfully complete if a PDCCH transmission is addressed to a C-RNTI. In an example, if at least one random access response comprises a random access preamble identifier, a UE may consider the random access procedure successfully completed and may indicate a reception of an acknowledgement for a system information request to upper layers. If a UE has signaled multiple preamble transmissions, the UE may stop transmitting remaining preambles (if any) in response to a successful reception of a corresponding random access response.

In an example, a UE may perform one or more Msg 3 1240 transmissions in response to a successful reception of random access response (e.g., for a contention based random access procedure). A UE may adjust an uplink transmission timing based on a timing advanced command indicated by a random access response and may transmit one or more transport blocks based on an uplink grant indicated by a random access response. Subcarrier spacing for PUSCH transmission for Msg3 1240 may be provided by at least one higher layer (e.g. RRC) parameter. A UE may transmit a random access preamble via PRACH and Msg3 1240 via PUSCH on a same cell. A base station may indicate an UL BWP for a PUSCH transmission of Msg3 1240 via system information block. A UE may employ HARQ for a retransmission of Msg 3 1240.

In an example, multiple UEs may perform Msg 1 1220 by transmitting a same preamble to a base station and receive, from the base station, a same random access response comprising an identity (e.g., TC-RNTI). Contention resolution 1250 may ensure that a UE does not incorrectly use an identity of another UE. For example, contention resolution 1250 may be based on C-RNTI on PDCCH or a UE contention resolution identity on DL-SCH. For example, if a base station assigns a C-RNTI to a UE, the UE may perform contention resolution 1250 based on a reception of a PDCCH transmission that is addressed to the C-RNTI. In response to detection of a C-RNTI on a PDCCH, a UE may consider contention resolution 1250 successful and may consider a random access procedure successfully completed. If a UE has no valid C-RNTI, a contention resolution may be addressed by employing a TC-RNTI. For example, if a MAC PDU is successfully decoded and a MAC PDU comprises a UE contention resolution identity MAC CE that matches the CCCH SDU transmitted in Msg3 1250, a UE may consider the contention resolution 1250 successful and may consider the random access procedure successfully completed.

Figure 13:
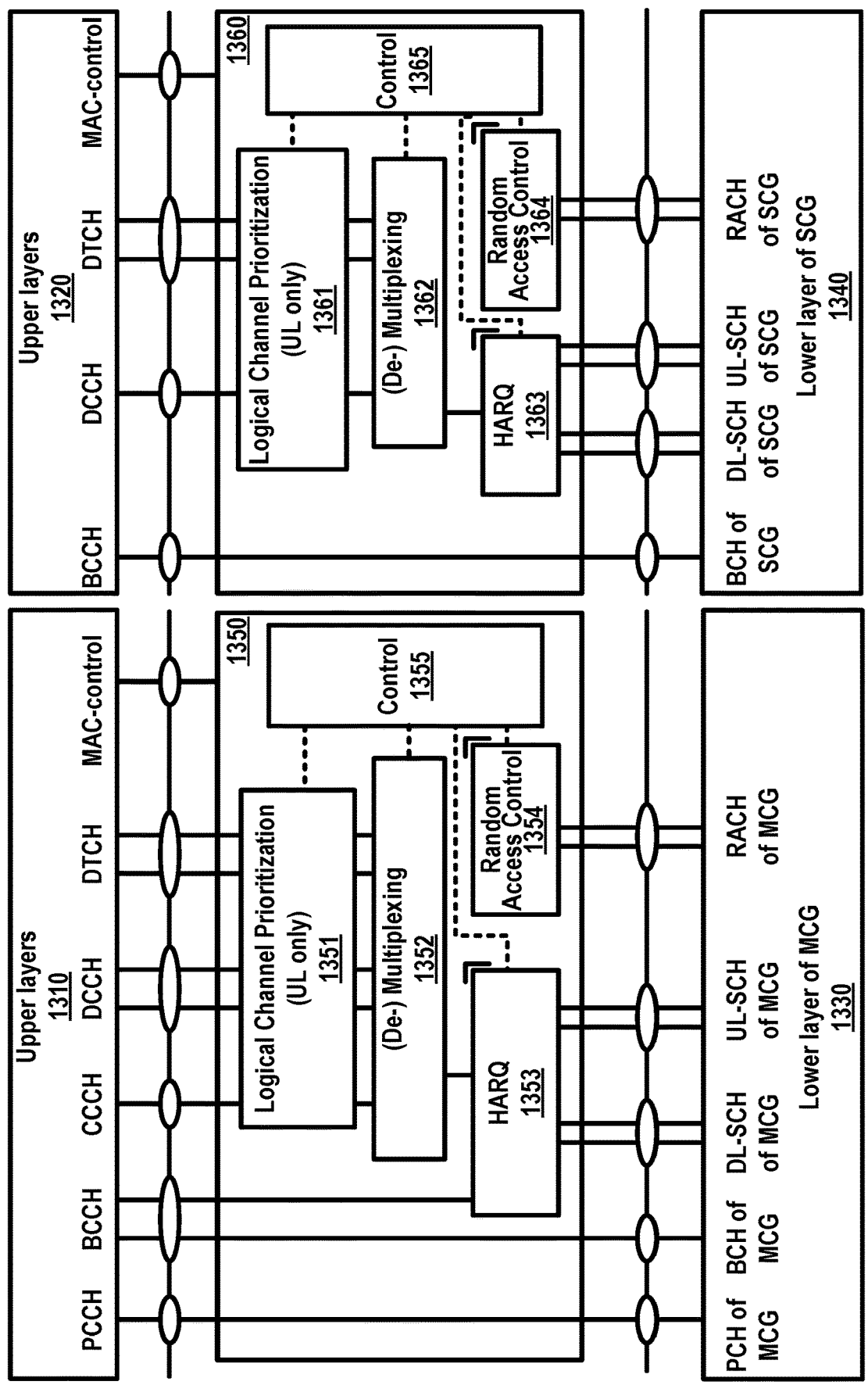
FIG. 13 is a structure of example MAC entities as per an aspect of an embodiment of the present disclosure.

FIG. 13 is an example structure for MAC entities as per an aspect of an embodiment. In an example, a wireless device may be configured to operate in a multi-connectivity mode. A wireless device in RRC_CONNECTED with multiple RX/TX may be configured to utilize radio resources provided by multiple schedulers located in a plurality of base stations. The plurality of base stations may be connected via a non-ideal or ideal backhaul over the Xn interface. In an example, a base station in a plurality of base stations may act as a master base station or as a secondary base station. A wireless device may be connected to one master base station and one or more secondary base stations. A wireless device may be configured with multiple MAC entities, e.g. one MAC entity for master base station, and one or more other MAC entities for secondary base station(s). In an example, a configured set of serving cells for a wireless device may comprise two subsets: an MCG comprising serving cells of a master base station, and one or more SCGs comprising serving cells of a secondary base station(s). FIG. 13 illustrates an example structure for MAC entities when MCG and SCG are configured for a wireless device.

In an example, at least one cell in a SCG may have a configured UL CC, wherein a cell of at least one cell may be called PSCell or PCell of SCG, or sometimes may be simply called PCell. A PSCell may be configured with PUCCH resources. In an example, when a SCG is configured, there may be at least one SCG bearer or one split bearer. In an example, upon detection of a physical layer problem or a random access problem on a PSCell, or upon reaching a number of RLC retransmissions associated with the SCG, or upon detection of an access problem on a PSCell during a SCG addition or a SCG change: an RRC connection re-establishment procedure may not be triggered, UL transmissions towards cells of an SCG may be stopped, a master base station may be informed by a UE of a SCG failure type and DL data transfer over a master base station may be maintained.

In an example, a MAC sublayer may provide services such as data transfer and radio resource allocation to upper layers (e.g. 1310 or 1320). A MAC sublayer may comprise a plurality of MAC entities (e.g. 1350 and 1360). A MAC sublayer may provide data transfer services on logical channels. To accommodate different kinds of data transfer services, multiple types of logical channels may be defined. A logical channel may support transfer of a particular type of information. A logical channel type may be defined by what type of information (e.g., control or data) is transferred. For example, BCCH, PCCH, CCCH and DCCH may be control channels and DTCH may be a traffic channel. In an example, a first MAC entity (e.g. 1310) may provide services on PCCH, BCCH, CCCH, DCCH, DTCH and MAC control elements. In an example, a second MAC entity (e.g. 1320) may provide services on BCCH, DCCH, DTCH and MAC control elements.

A MAC sublayer may expect from a physical layer (e.g. 1330 or 1340) services such as data transfer services, signaling of HARQ feedback, signaling of scheduling request or measurements (e.g. CQI). In an example, in dual connectivity, two MAC entities may be configured for a wireless device: one for MCG and one for SCG. A MAC entity of wireless device may handle a plurality of transport channels. In an example, a first MAC entity may handle first transport channels comprising a PCCH of MCG, a first BCH of MCG, one or more first DL-SCHs of MCG, one or more first UL-SCHs of MCG and one or more first RACHs of MCG. In an example, a second MAC entity may handle second transport channels comprising a second BCH of SCG, one or more second DL-SCHs of SCG, one or more second UL-SCHs of SCG and one or more second RACHs of SCG.

In an example, if a MAC entity is configured with one or more SCells, there may be multiple DL-SCHs and there may be multiple UL-SCHs as well as multiple RACHs per MAC entity. In an example, there may be one DL-SCH and UL-SCH on a SpCell. In an example, there may be one DL-SCH, zero or one UL-SCH and zero or one RACH for an SCell. A DL-SCH may support receptions using different numerologies and/or TTI duration within a MAC entity. A UL-SCH may also support transmissions using different numerologies and/or TTI duration within the MAC entity.

In an example, a MAC sublayer may support different functions and may control these functions with a control (e.g. 1355 or 1365) element. Functions performed by a MAC entity may comprise mapping between logical channels and transport channels (e.g., in uplink or downlink), multiplexing (e.g. 1352 or 1362) of MAC SDUs from one or different logical channels onto transport blocks (TB) to be delivered to the physical layer on transport channels (e.g., in uplink), demultiplexing (e.g. 1352 or 1362) of MAC SDUs to one or different logical channels from transport blocks (TB) delivered from the physical layer on transport channels (e.g., in downlink), scheduling information reporting (e.g., in uplink), error correction through HARQ in uplink or downlink (e.g. 1363), and logical channel prioritization in uplink (e.g. 1351 or 1361). A MAC entity may handle a random access process (e.g. 1354 or 1364).

Figure 14:
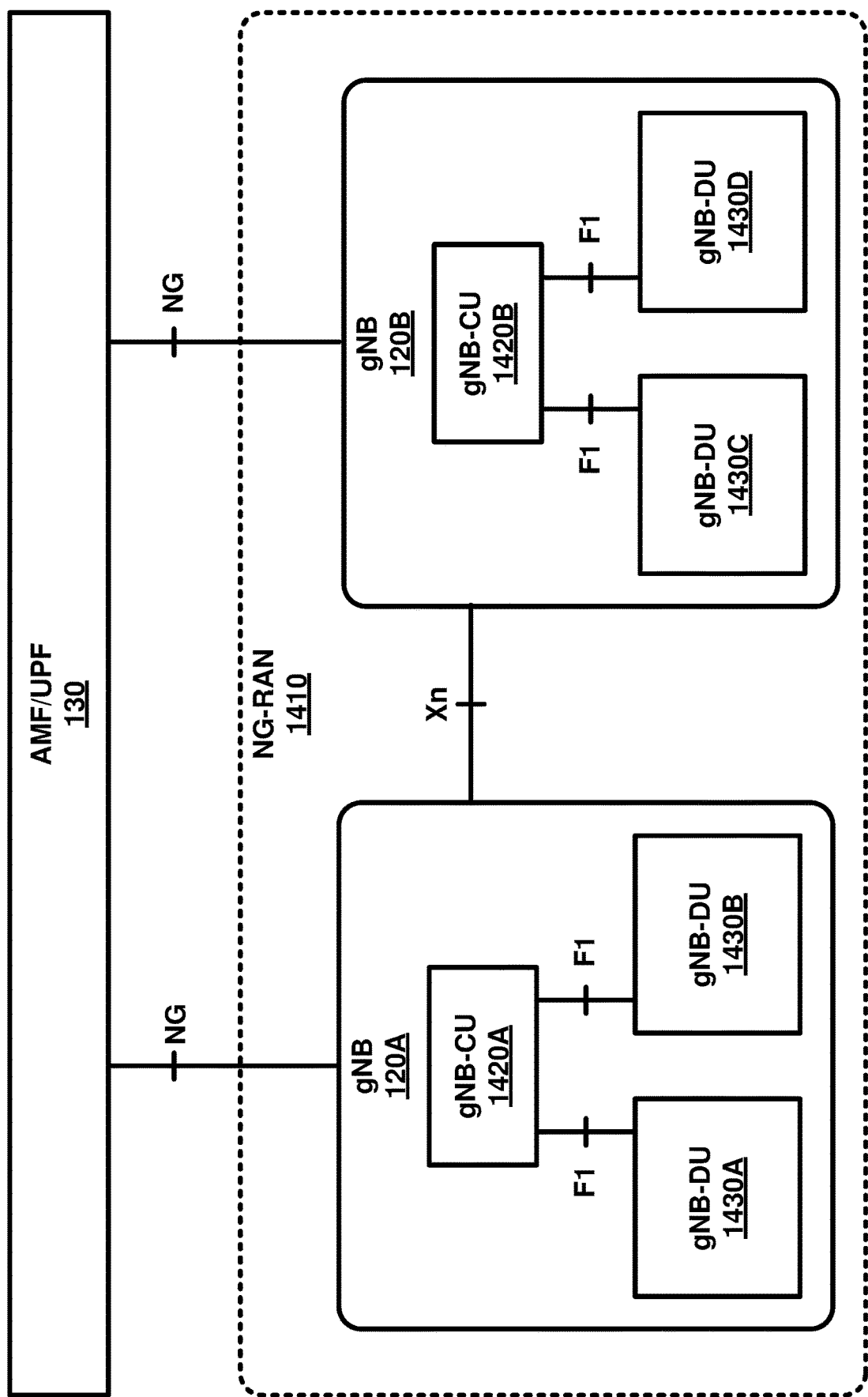
FIG. 14 is a diagram of an example RAN architecture as per an aspect of an embodiment of the present disclosure.

FIG. 14 is an example diagram of a RAN architecture comprising one or more base stations. In an example, a protocol stack (e.g. RRC, SDAP, PDCP, RLC, MAC, and PHY) may be supported at a node. A base station (e.g. 120A or 120B) may comprise a base station central unit (CU) (e.g. gNB-CU 1420A or 1420B) and at least one base station distributed unit (DU) (e.g. gNB-DU 1430A, 1430B, 1430C, or 1430D) if a functional split is configured. Upper protocol layers of a base station may be located in a base station CU, and lower layers of the base station may be located in the base station DUs. An F1 interface (e.g. CU-DU interface) connecting a base station CU and base station DUs may be an ideal or non-ideal backhaul. F1-C may provide a control plane connection over an F1 interface, and F1-U may provide a user plane connection over the F1 interface. In an example, an Xn interface may be configured between base station CUs.

In an example, a base station CU may comprise an RRC function, an SDAP layer, and a PDCP layer, and base station DUs may comprise an RLC layer, a MAC layer, and a PHY layer. In an example, various functional split options between a base station CU and base station DUs may be possible by locating different combinations of upper protocol layers (RAN functions) in a base station CU and different combinations of lower protocol layers (RAN functions) in base station DUs. A functional split may support flexibility to move protocol layers between a base station CU and base station DUs depending on service requirements and/or network environments.

In an example, functional split options may be configured per base station, per base station CU, per base station DU, per UE, per bearer, per slice, or with other granularities. In per base station CU split, a base station CU may have a fixed split option, and base station DUs may be configured to match a split option of a base station CU. In per base station DU split, a base station DU may be configured with a different split option, and a base station CU may provide different split options for different base station DUs. In per UE split, a base station (base station CU and at least one base station DUs) may provide different split options for different wireless devices. In per bearer split, different split options may be utilized for different bearers. In per slice splice, different split options may be applied for different slices.

Figure 15:
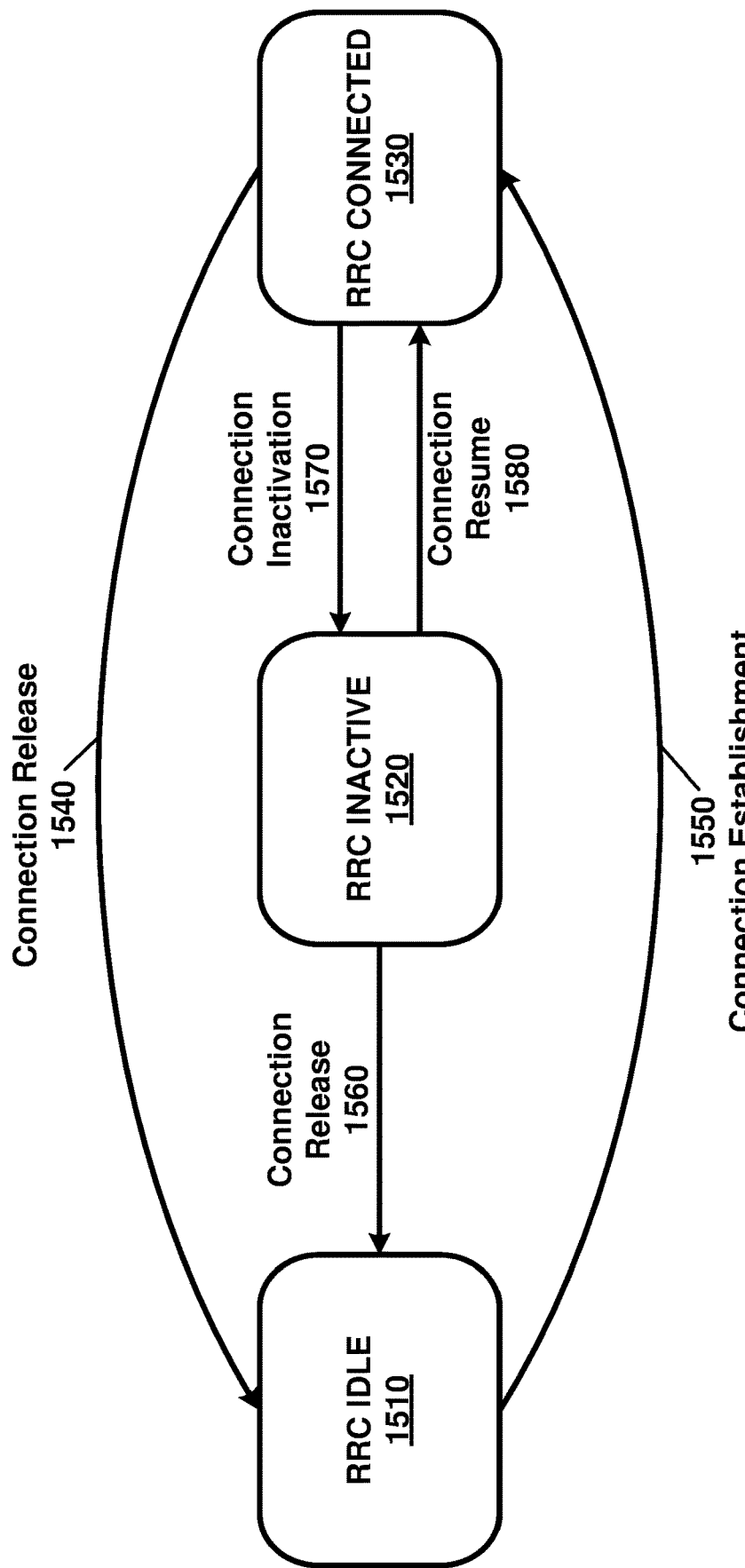
FIG. 15 is a diagram of example RRC states as per an aspect of an embodiment of the present disclosure.

FIG. 15 is an example diagram showing RRC state transitions of a wireless device. In an example, a wireless device may be in at least one RRC state among an RRC connected state (e.g. RRC Connected 1530, RRC_Connected), an RRC idle state (e.g. RRC Idle 1510, RRC_Idle), and/or an RRC inactive state (e.g. RRC Inactive 1520, RRC_Inactive). In an example, in an RRC connected state, a wireless device may have at least one RRC connection with at least one base station (e.g. gNB and/or eNB), which may have a UE context of the wireless device. A UE context (e.g. a wireless device context) may comprise at least one of an access stratum context, one or more radio link configuration parameters, bearer (e.g. data radio bearer (DRB), signaling radio bearer (SRB), logical channel, QoS flow, PDU session, and/or the like) configuration information, security information, PHY/MAC/RLC/PDCP/SDAP layer configuration information, and/or the like configuration information for a wireless device. In an example, in an RRC idle state, a wireless device may not have an RRC connection with a base station, and a UE context of a wireless device may not be stored in a base station. In an example, in an RRC inactive state, a wireless device may not have an RRC connection with a base station. A UE context of a wireless device may be stored in a base station, which may be called as an anchor base station (e.g. last serving base station).

In an example, a wireless device may transition a UE RRC state between an RRC idle state and an RRC connected state in both ways (e.g. connection release 1540 or connection establishment 1550; or connection reestablishment) and/or between an RRC inactive state and an RRC connected state in both ways (e.g. connection inactivation 1570 or connection resume 1580). In an example, a wireless device may transition its RRC state from an RRC inactive state to an RRC idle state (e.g. connection release 1560).

In an example, an anchor base station may be a base station that may keep a UE context (a wireless device context) of a wireless device at least during a time period that a wireless device stays in a RAN notification area (RNA) of an anchor base station, and/or that a wireless device stays in an RRC inactive state. In an example, an anchor base station may be a base station that a wireless device in an RRC inactive state was lastly connected to in a latest RRC connected state or that a wireless device lastly performed an RNA update procedure in. In an example, an RNA may comprise one or more cells operated by one or more base stations. In an example, a base station may belong to one or more RNAs. In an example, a cell may belong to one or more RNAs.

In an example, a wireless device may transition a UE RRC state from an RRC connected state to an RRC inactive state in a base station. A wireless device may receive RNA information from the base station. RNA information may comprise at least one of an RNA identifier, one or more cell identifiers of one or more cells of an RNA, a base station identifier, an IP address of the base station, an AS context identifier of the wireless device, a resume identifier, and/or the like.

In an example, an anchor base station may broadcast a message (e.g. RAN paging message) to base stations of an RNA to reach to a wireless device in an RRC inactive state, and/or the base stations receiving the message from the anchor base station may broadcast and/or multicast another message (e.g. paging message) to wireless devices in their coverage area, cell coverage area, and/or beam coverage area associated with the RNA through an air interface.

In an example, when a wireless device in an RRC inactive state moves into a new RNA, the wireless device may perform an RNA update (RNAU) procedure, which may comprise a random access procedure by the wireless device and/or a UE context retrieve procedure. A UE context retrieve may comprise: receiving, by a base station from a wireless device, a random access preamble; and fetching, by a base station, a UE context of the wireless device from an old anchor base station. Fetching may comprise: sending a retrieve UE context request message comprising a resume identifier to the old anchor base station and receiving a retrieve UE context response message comprising the UE context of the wireless device from the old anchor base station.

In an example embodiment, a wireless device in an RRC inactive state may select a cell to camp on based on at least a on measurement results for one or more cells, a cell where a wireless device may monitor an RNA paging message and/or a core network paging message from a base station. In an example, a wireless device in an RRC inactive state may select a cell to perform a random access procedure to resume an RRC connection and/or to transmit one or more packets to a base station (e.g. to a network). In an example, if a cell selected belongs to a different RNA from an RNA for a wireless device in an RRC inactive state, the wireless device may initiate a random access procedure to perform an RNA update procedure. In an example, if a wireless device in an RRC inactive state has one or more packets, in a buffer, to transmit to a network, the wireless device may initiate a random access procedure to transmit one or more packets to a base station of a cell that the wireless device selects. A random access procedure may be performed with two messages (e.g. 2 stage random access) and/or four messages (e.g. 4 stage random access) between the wireless device and the base station.

In an example embodiment, a base station receiving one or more uplink packets from a wireless device in an RRC inactive state may fetch a UE context of a wireless device by transmitting a retrieve UE context request message for the wireless device to an anchor base station of the wireless device based on at least one of an AS context identifier, an RNA identifier, a base station identifier, a resume identifier, and/or a cell identifier received from the wireless device. In response to fetching a UE context, a base station may transmit a path switch request for a wireless device to a core network entity (e.g. AMF, MME, and/or the like). A core network entity may update a downlink tunnel endpoint identifier for one or more bearers established for the wireless device between a user plane core network entity (e.g. UPF, S-GW, and/or the like) and a RAN node (e.g. the base station), e.g. changing a downlink tunnel endpoint identifier from an address of the anchor base station to an address of the base station.

A gNB may communicate with a wireless device via a wireless network employing one or more new radio technologies. The one or more radio technologies may comprise at least one of: multiple technologies related to physical layer; multiple technologies related to medium access control layer; and/or multiple technologies related to radio resource control layer. Example embodiments of enhancing the one or more radio technologies may improve performance of a wireless network. Example embodiments may increase the system throughput, or data rate of transmission. Example embodiments may reduce battery consumption of a wireless device. Example embodiments may improve latency of data transmission between a gNB and a wireless device. Example embodiments may improve network coverage of a wireless network. Example embodiments may improve transmission efficiency of a wireless network.

In an example, a base station may transmit a DCI via a PDCCH for at least one of: scheduling assignment/grant; slot format notification; pre-emption indication; and/or power-control commends. More specifically, the DCI may comprise at least one of: identifier of a DCI format (e.g., via RNTI); downlink scheduling assignment(s); uplink scheduling grant(s); slot format indicator; pre-emption indication; power-control for PUCCH/PUSCH; and/or power-control for SRS.

In an example, a downlink scheduling assignment DCI (e.g., a downlink DCI comprising resource assignment(s) for downlink data) may comprise parameters indicating at least one of: identifier of a DCI format (e.g., a downlink scheduling assignment or an uplink grant); PDSCH resource indication; transport format; HARQ information; control information related to multiple antenna schemes; and/or a command for power control of the PUCCH.

In an example, an uplink scheduling grant DCI (e.g., an uplink DCI comprising resource assignment(s) for uplink data) may comprise parameters indicating at least one of: identifier of a DCI format (e.g., a downlink scheduling assignment or an uplink grant); PUSCH resource indication; transport format; HARQ related information; and/or a power control command of the PUSCH.

In an example, different types of control information may correspond to different DCI message sizes. For example, supporting multiple beams and/or spatial multiplexing in the spatial domain and noncontiguous allocation of RBs in the frequency domain may require a larger scheduling message, in comparison with an uplink grant allowing for frequency-contiguous allocation. DCI may be categorized into different DCI formats, where a format corresponds to a certain message size and/or usage and/or use cases.

In an example, a wireless device may monitor one or more PDCCH for detecting one or more DCI with one or more DCI format, in common search space (CSS) or UE-specific search space (USS). In an example, a wireless device may monitor PDCCH with a limited set of DCI formats, to save power consumption. The more DCI formats to be detected, the more power be consumed at the wireless device.

In an example, the information in the DCI formats for downlink scheduling may comprise at least one of: identifier of a DCI format (e.g., a downlink scheduling assignment or an uplink grant); carrier indicator; RB allocation; time resource allocation; bandwidth part indicator; HARQ process number; rate matching indication, one or more MCS; one or more NDI; one or more RV; MIMO related information; Downlink assignment index (DAI); TPC for PUCCH; SRS request; and padding if necessary. In an example, the MIMO related information may comprise at least one of: PMI; precoding information; transport block swap flag; power offset between PDSCH and reference signal; reference-signal scrambling sequence; number of layers; and/or antenna ports for the transmission; and/or transmission configuration indicator (TCI). In an example, one or more DCI fields for an URLLC service may comprise a repetition number, finer time resource allocation (e.g., time allocation at a OFDM symbols, a bitmap of OFDM symbols/slots allocation), one or more frequency/time domain resource allocations to support one or more TB (transport blocks) across one or more slots.

In an example, the information in the DCI formats used for uplink scheduling may comprise at least one of: an identifier of a DCI format; carrier indicator; bandwidth part indication; resource allocation type; RB allocation; time resource allocation; MCS; NDI; Phase rotation of the uplink DMRS; precoding information; CSI request; SRS request; Uplink index/DAI; TPC for PUSCH; and/or padding if necessary. In an example, one or more DCI fields for an URLLC service may comprise a repetition number, finer time resource allocation (e.g., time allocation at a OFDM symbols, a bitmap of OFDM symbols/slots allocation), one or more frequency/time domain resource allocations to support one or more TB (transport blocks) across one or more slots.

In an example, a base station may perform CRC scrambling for a DCI, before transmitting the DCI via a PDCCH. The base station may perform CRC scrambling by binarily adding multiple bits of at least one wireless device identifier (e.g., C-RNTI, MCS-C-RNTI, CS-RNTI, TPC-CS-RNTI, TPC-PUCCH-RNTI, TPC-PUSCH-RNTI, SP CSI C-RNTI, SRS-TPC-RNTI, INT-RNTI, SFI-RNTI, C-URLLC-RNTI) on the CRC bits of the DCI. A C-URLLC-RNTI may be a new RNTI used in a DCI scheduling a downlink scheduling or uplink grant for a URLLC service. The wireless device may check the CRC bits of the DCI, when detecting the DCI. The wireless device may receive the DCI when the CRC is scrambled by a sequence of bits that is the same as the at least one wireless device identifier.

In an example, in order to support wide bandwidth operation, a base station may transmit one or more PDCCHs in different control resource sets (CORESETs). The base station may transmit one or more RRC message comprising configuration parameters of one or more coresets. Configuration parameter(s) of a coreset may comprise at least one of: a first OFDM symbol; a number of consecutive OFDM symbols; a set of resource blocks; a CCE-to-REG mapping. In an example, a base station may transmit a PDCCH in a dedicated coreset for particular purpose, for example, for beam failure recovery (BFR) confirmation (e.g., BFR-coreset).

In an example, a wireless device may monitor PDCCH for detecting DCI, comprising a command to transition one or more cells to a power saving state, in one or more configured coresets, to reduce the power consumption.

In an example, a base station may transmit one or more PDCCHs in one or more search space sets (SSs). A search space set may be associated with a coreset (CORESET). The base station may transmit one or more RRC message comprising configuration parameters of one or more SSs. Configuration parameter(s) of a search space set (SS) may comprise at least one of: monitoring periodicity and/or offset in a unit (e.g., a slot), a duration (e.g., for common search space set), monitoring symbols in a slot (e.g., finer monitoring periodicity than a unit), a list of candidates with a set of aggregation levels, a type of search space (e.g., CSS or USS), one or more DCI formats associated with the SS. In an example, a base station may transmit a PDCCH in a dedicated SS for particular purpose, for example, for beam failure recovery (BFR) confirmation (e.g., BFR-SS).

In an example, a base station may transmit one or more first PDCCHs via one or more first SSs for supporting a use case such as URLLC. In an example, the base station may transmit one or more second PDCCHs via one or more second SSs for supporting a use case such as eMBB. For example, a first search space of the one or more first SSs may partially or fully overlap with a second search space of the one or more second SSs.

Figure 16:
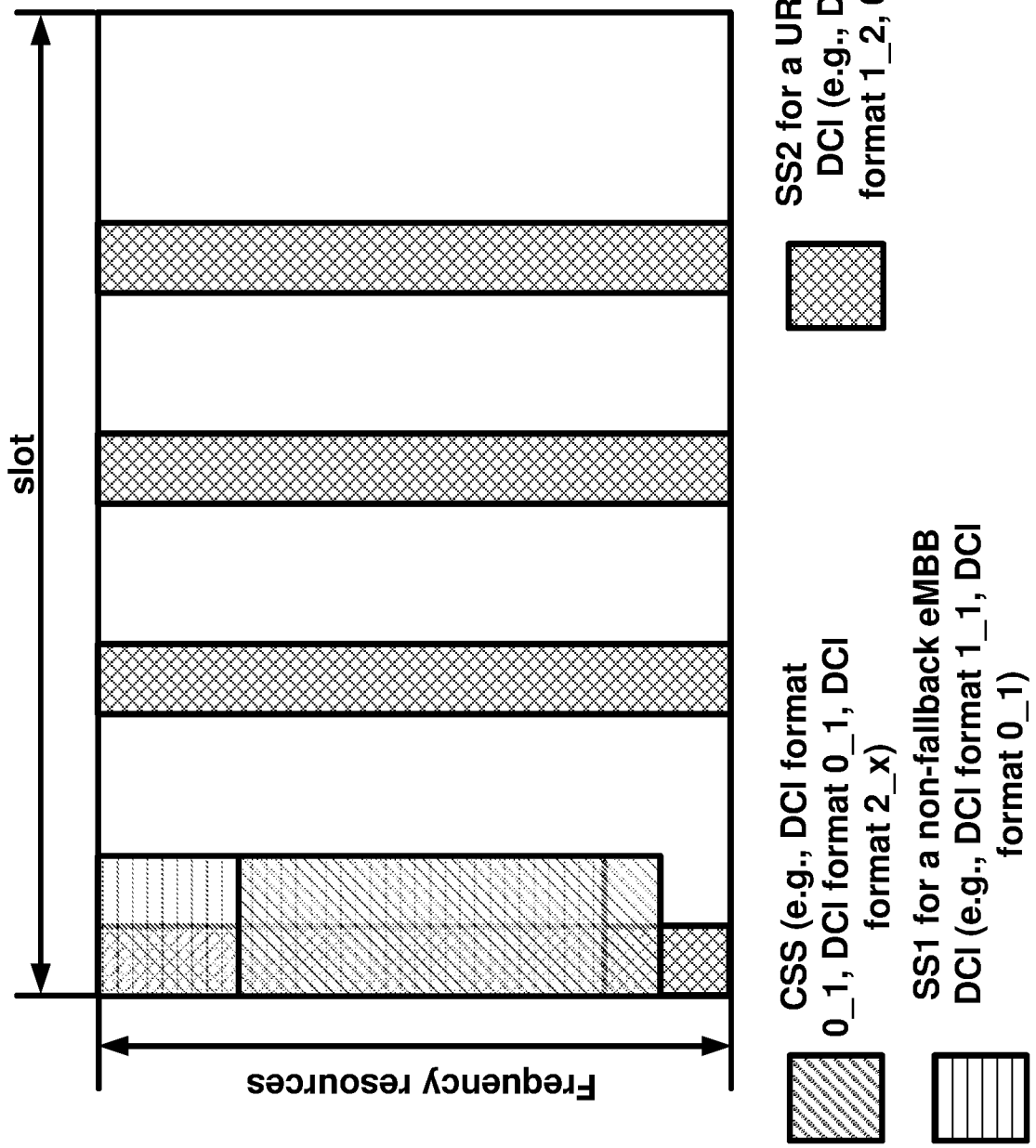
FIG. 16 is a diagram of one or more search space or search space sets in a slot as per an embodiment of the present disclosure.

In an example, one or more SSs may partially or fully overlap in time and/or may partially or fully overlap in frequency. FIG. 16 illustrates that one or more SSs are overlaid in a slot. For example, a wireless device receives one or more RRC configuration parameters of CSS, SS1 and SS2. The wireless device may be configured with CSS monitoring in every 5 slots during a first two OFDM symbols in a slot of the every 5 slots. The wireless device may be configured with SS1 for monitoring a non-fallback DCI (e.g., DCI format 1_1 and DCI format 0_1) for eMBB service, and SS2 for monitoring a non-fallback DCI (e.g., DCI format 1_2 and DCI format 0_2, a new DCI format to support a URLLC) for URLLC service. The wireless device may monitor SS1 in every slot during a first two OFDM symbols of the slot. The wireless device may monitor SS2 in every slot in a first, a fifth, an eighth, a twelfth OFDM symbol. Monitoring occasions of SS2 may overlap with monitoring occasions of CSS and/or SS1 in a slot over a first two OFDM symbols.

Figure 17:
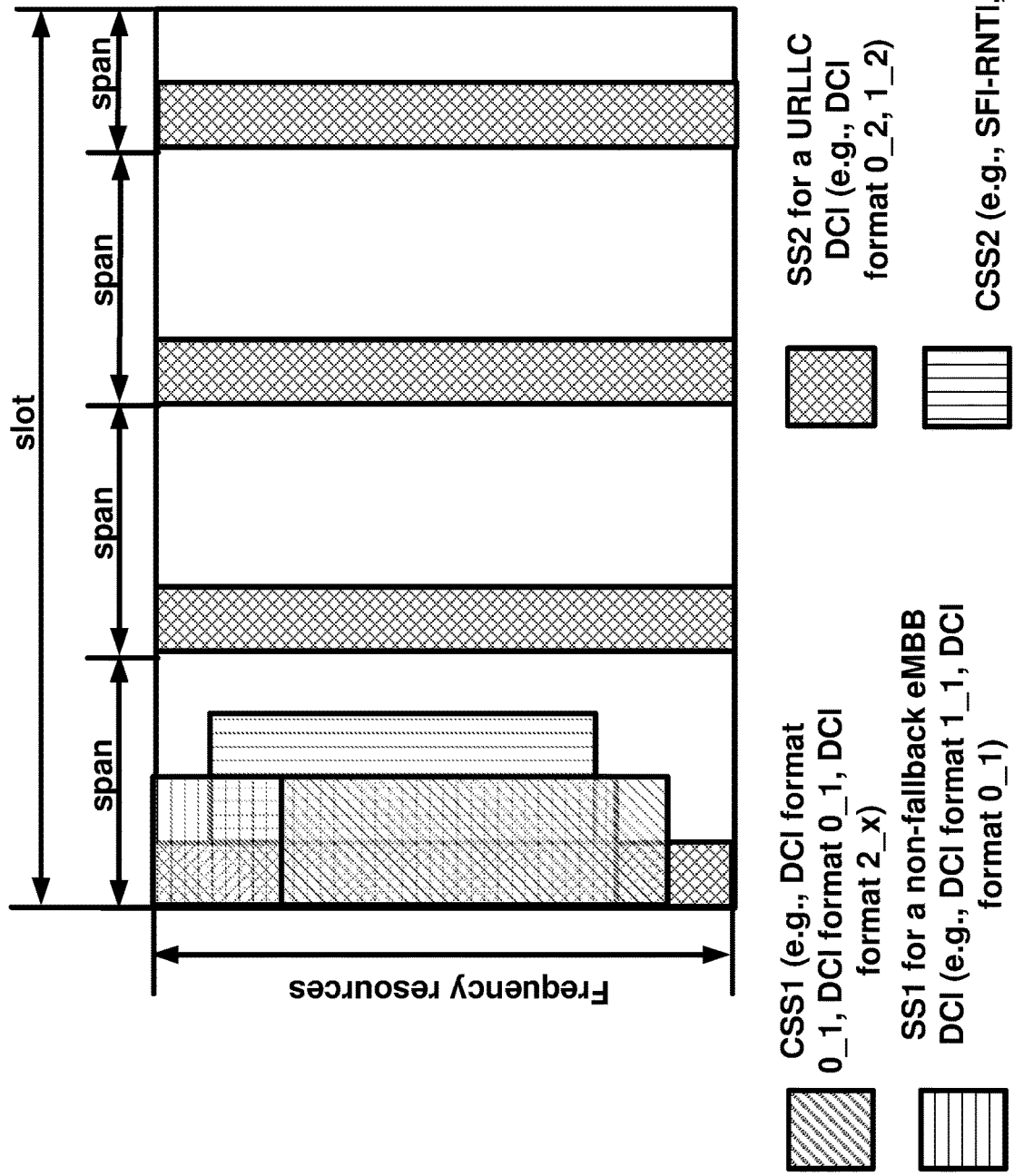
FIG. 17 is a diagram of one or more search space or search space sets in a slot as per an embodiment of the present disclosure.

In an example, a wireless device may receive a first SS and a second SS which are not overlapped in time but may belong to the same span. FIG. 17 illustrates an example. For example, a span may comprise consecutive Y (e.g., 1, 2, 3, or any positive number) OFDM symbols (for example, 4 symbols in FIG. 17). FIG. 17 illustrates four spans in a slot (e.g., 4 symbols, 4 symbols, 4 symbols and 2 symbols). In a first span of a slot in FIG. 17, a wireless device is configured to monitor CSS1, CSS2, SS1 and SS2. In an example, a span may be defined as a set of consecutive OFDM symbols comprising SSs with the same starting OFDM symbol (e.g., a span of $1^{st}$ and $2^{nd}$ OFDM symbols with CSS1, SS1, and SS2 and another span of CSS2). Depending on a UE capability, a wireless device may support a minimum gap between two spans. For example, the wireless device may support any structure of spans (e.g., no minimum gap between spans is required). In an example, a wireless device may not be able to support SS2 and CSS2 even if they are not overlapped in time due to the limited UE capabilities. For example, the wireless device may support up to M candidates in each span. When the wireless device is configured with more candidates from one or more search spaces of a span, the wireless device may skip monitoring one or more second search spaces of the one or more search spaces. In the example, the wireless device may perform a DCI size alignment among one or more DCI formats configured for the one or more search spaces, such that a total number of blind decodings may be reduced smaller than or equal to the UE capability. For example, the wireless device may align a first DCI monitored in SS1 and a second DCI monitored in SS1 to reduce a number of blind decodings.

In an example, a wireless device may support up to K number of DCI sizes for a given carrier. In an example, a wireless device may support a first DCI size for DCI format 1_0/0_0, DCI format 2_3, DCI format 2_0 in CSS, a second DCI size for DCI format 1_0/0_0 in USS, a third DCI size for DCI format 1_1/0_1, a fourth DCI size for DCI format 2_1. In an example, the wireless device may support up to K-1 number of DCI sizes for unicast scheduling for the given carrier. The wireless device may determine the first DCI size for the DCI format 1_0/0_0 in both CSS/USS. The wireless device may determine the second DCI size for the DCI format 1_1/0_1. The wireless device may determine the third DCI size for the DCI format 0_2/1_2. For example, the DCI format 1_0/0_0 is a downlink DCI format/an uplink DCI format, used for scheduling downlink/uplink data, wherein one or more DCI fields of the DCI format 1_0/0_0 may be determined based on one or more configuration parameters received via receiving master information block and/or system information blocks. For example, the DCI format 1_1/0_1 is a downlink DCI format/an uplink DCI format used for scheduling downlink/uplink data, wherein one or more DCI fields of the DCI format 1_1/0_1 may be determined based on one or more configuration parameters received via system information blocks and/or radio resource control (RRC) messages. For example, the DCI format 1_2/0_2 is a downlink DCI format/an uplink DCI format used for scheduling downlink/uplink data, wherein one or more DCI fields of the DCI format 1_2/0_2 may be determined based on one or more configuration parameters received via system information blocks and/or radio resource control (RRC) messages. The DCI format 1_2/0_2 may have smaller size than the DCI format 1_1/0_1 to support URLLC services (e.g., higher reliability via a smaller DCI size/compact DCI size). In an example, a wireless device may support up to K+1 number of DCI sizes for a given carrier to support different services such as eMBB and/or URLLC.

In an example, a wireless device may perform the DCI size alignment between a plurality of DCI formats based on at least one of the followings. In an example, the wireless device may perform a DCI size alignment between a first DCI format and a second DCI format, wherein the wireless device may determine a single DCI size for the first DCI format and the second DCI format. For example, the wireless device may determine the single DCI size based on a larger size between a first DCI size of the first DCI format and a second DCI size of the second DCI format. The wireless device may append zeros to a DCI format, which has smaller size, until the DCI format has an equal size to the other DCI format. For example, the wireless device may determine the single DCI size based on the first DCI format. For example, the wireless device may add zeros to the second DCI format, when a second DCI size of the second DCI format is smaller than a first DCI size of the first DCI format. The wireless device may truncate bits from the second DCI format, when the second DCI size of the second DCI format is larger than the first DCI size of the first DCI format. For example, the wireless device may determine the single DCI size based on one or more configuration parameters by a base station. For example, the base station may configure a reference DCI size for the first DCI format and the second DCI format. The wireless device may add zeros or truncate bits to/from the first DCI format until a first DCI size of the first DCI format matches the reference DCI size. The wireless device may add zeros or truncate bits to/from the second DCI format until a second DCI size of the second DCI format matches the reference DCI size.

In existing systems, a base station may transmit to, or receive from, a wireless device one or more data packets, via one or more radio resources. The one or more data packets may be one or more URLLC (Ultra-Reliable Low Latency Communication) data packets with a small packet size (e.g., <100 bytes), which may require ultra-reliable (e.g., BLER less than 10^(−5)) and low latency delivery between the base station and the wireless device. In another example, the one or more data packets may be one or more eMBB (enhanced Mobile Broadband) data packets with a large packet size (e.g., >1000 bytes), which may require a large bandwidth and/or a large amount of radio resources. In existing systems, a base station may schedule different services such as URLLC and eMBB using a same set of DCI formats, but this one-size-fits-all approach may be inefficient. For example, a set of DCI formats that is suitable for providing eMBB services may have a high signaling overhead if that same set of DCI formats is used for providing URLLC services. There is a need to have a relatively smaller-sized DCI format to deliver a DCI for URLLC services as compared to a relatively larger-sized DCI format to deliver a DCI for eMBB services. There is also a need to support different DCI formats/sizes for multiple services without requiring increasing UE capabilities, resulting in excessive implementation complexity and/or device cost. Examples of such changes may include increases in the number of supporting DCI sizes, the number of blind decodings, the number of channel estimations, and/or the like.

In an example, a base station may configure a first search space comprising monitoring occasions, a set of first candidates, a reference DCI format (e.g., a first DCI format), and a second DCI format. The base station may configure a second search space comprising monitoring occasions, a set of second candidates, and the second DCI format. The base station may determine, for the second DCI format in a search space (e.g., the first search space or the second search space), a target DCI size depending on one or more first cases and/or one or more second cases. The base station may, based on the target DCI size, use the second DCI format for scheduling a URLLC control/data packet on one of the first search space and/or the second search space. For example, the one or more first cases may comprise cases wherein a wireless device may monitor a first DCI based on a first DCI format and a second DCI based on the second DCI format on an active BWP of a cell. The first DCI and the second DCI may have different sizes, in a search space (e.g., the first search space or the second search space) of the active BWP of the cell. A search space may comprise a set of candidates, wherein the wireless device may receive a DCI via a candidate of the set of candidates. The search space may be used interchangeably with a search space set in the specification.

For example, the one or more first cases may comprise cases wherein a wireless device may support eMBB and URLLC services (or a plurality of services). The wireless device may monitor a DCI comprising resource assignment for a service of the plurality of services (or the eMBB and the URLLC services) based on a DCI format, wherein each service may use a different DCI format. For example, the wireless device may monitor the first DCI based on the first DCI format for the eMBB service, the second DCI based on the second DCI format for the URLLC service, and a third DCI based on a third DCI format for a service to receive a scheduling command for a unicast DL data. Similar behavior (e.g., a first UL DCI, a second UL DCI and/or a third UL DCI based on a first UL DCI format, a second UL DCI format, and/or a third UL DCI format respectively) may be assumed for the UL data scheduling. For example, the first DCI format may be a fallback DCI format such as DCI format 1_0 for downlink and DCI format 0_0 for uplink scheduling. For example, the third DCI format may be a non-fallback DCI format such as a DCI format 1_1 for downlink scheduling, and a DCI format 0_1 for uplink scheduling. For example, the second DCI format may be a non-fallback DCI for URLLC such as DCI format 1_2 for downlink and DCI format 0_2 for uplink scheduling.

For example, the one or more second cases may comprise cases when a wireless device may monitor a second DCI based on the second DCI format in a search space (e.g., the first search space or the second search space). For example, the one or more second cases may comprises cases when a wireless device may support URLLC service or a single service, wherein the wireless device may monitor a second DCI based on the second DCI format and a first DCI based on the first DCI format to receive a DCI for a unicast DL data scheduling in one or more configured search space sets. Similar behavior (e.g., a first UL DCI based on a first UL DCI format and a second UL DCI based on a second UL DCI format, a second DCI based on a second UL DCI format) may be taken for the UL data scheduling. For example, the first DCI and the second DCI may be scheduled to support the single service such as URLLC. For example, the first DCI format may be a fallback DCI such as a DCI format 1_0 for downlink scheduling, and a DCI format 0_0 for uplink scheduling. For example, the one or more second cases may include the case where a wireless device may support, with enhanced capabilities, one or more DCI formats, a number of blind decoding and/or a number of channel estimation based on one or more configured search space sets.

In an example, the first DCI format, addressed in the specification, may comprise one of one or more DCI formats. Similarly, the second DCI format may comprise one of one or more DCI formats. The third DCI format may comprise one of the one or more DCI formats. The first DCI format may comprise a downlink DCI format for downlink scheduling and/or an uplink DCI format for uplink scheduling for a first service such as eMBB. For example, the first DCI format may comprise a DCI format carrying a group of DCI entries to one or more UEs and/or one or more cells. For example, the wireless device may determine the first DCI size of the second DCI format as a number (e.g., a maximum, a minimum, or a medium) between a first size of the downlink DCI format for downlink scheduling for the services and a second size of the uplink DCI format for uplink scheduling for the services.

In an example, a wireless device may determine the first DCI size of the second DCI format based on the second DCI format and the reference DCI format. The wireless device, based on the first DCI size, may monitor a first DCI, based on the second DCI format, on the set of first candidates. The wireless device may determine a second DCI size for the second DCI format based on the second DCI format, and monitor a second DCI, based on the second DCI format, based on the second DCI size on the set of second candidates. For example, the reference DCI format is a DCI format configured in the first search space (e.g., a DCI format 1_0/0_0, DCI format 2_0, DCI format 2_2, DCI format 2_3). For example, the reference DCI format may comprise at least one of: a DCI format 1_0, a DCI format 0_0, a DCI format 1_1, a DCI format 0_1, a DCI format 2_0 or 2_1 or 2_2. For example, the reference DCI format may comprise a DCI format 1_0 in common search space (CSS). For example, the reference DCI format may comprise a DCI format 1_0 in UE-specific search space (USS).

For example, a wireless device may be configured with a first DCI format and a reference DCI format in a search space set. In decoding a first DCI based on the first DCI format, wherein a first DCI size of the first DCI/the first DCI format is determined based on the first DCI format and the reference DCI format. For example, the wireless device may append zeros to the first DCI format until a size of the first DCI format becomes equal to a size of the reference DCI format. The wireless device may assume 'zeros' in the bits where the first DCI format does not contain one more DCI fields. The wireless device may append the zeros after one or more DCI fields of the first DCI format. The wireless device may append the zeros to one or more second DCI fields of the one or more DCI fields (e.g., add the zeros to a time domain resource allocation field, add the zeros to a frequency domain resource assignment field). Embodiments may allow a wireless device not to increase UE capability to support additional DCI format(s) for an URLLC service, in addition to eMBB service. For example, the wireless device may receive a first DCI format with a smaller DCI size when the wireless device may monitor only the first DCI format. The wireless device may receive a first DCI format without increasing the UE capability when the wireless device may monitor the first DCI format and the reference DCI format together.

In an example, a wireless device may determine a second DCI size based on a second DCI format. The second DCI format may comprise a downlink DCI format for downlink scheduling and/or an uplink DCI format for uplink scheduling for URLLC services. For example, the wireless device may determine the second DCI size as a larger number/size (e.g., a maximum, a minimum/a smaller, or a medium) between a first size of the downlink DCI format for downlink scheduling for the services and a size of another DCI format for uplink scheduling for the services.

A wireless device may determine a DCI size of a DCI format differently depending on one or more parameters associated with a search space. The wireless device may monitor a DCI based on the DCI format on the search space based on the determined DCI size. In an example, a wireless device may determine a single DCI size applied for one or more DCI formats associated with a search space. For a candidate of the search space, the wireless device may need to perform X number of blind decoding, wherein X denotes a number of DCI sizes of one or more DCI formats that a base station may schedule via the candidate. By aligning/determining the single DCI size for each candidate, the wireless device may limit the complexity of control channel monitoring. by aligning/determining the single size, the base station may be able to configure one or more first DCI formats for eMBB service and one or more second DCI formats for URLLC service monitored via one or more search spaces without increasing the UE complexity. The base station and the wireless device, for supporting URLLC service, may determine/adapt a different DCI size for a DCI format based on which search space that the wireless device may monitor the DCI format. The wireless device may acquire more monitoring occasions for a URLLC DCI while the wireless device may keep the complexity. The base station may have more flexibility in scheduling a URLLC DCI without impacting UE complexity.

In an example, a wireless device may not be required to increase its capability in terms of supporting number of DCI sizes regardless of supporting one or more services. In the example, a wireless device may receive one or more RRC messages indicating a set of pairs {a source DCI format, a target DCI format} where the source DCI format is a DCI format to align its sizes against the target DCI format. For example, the wireless device may add zeros or truncate bits from the source DCI format until a size of the source DCI format may be equal to a size of the reference DCI format. In an example, aligning the DCI size against the target DCI format may comprise that the wireless device detects a DCI with the source DCI format by assuming the source DCI format has a same DCI size as the target DCI format. For example, the wireless device may receive {DCI format 1_2, DCI format 2_1}, {DCI format 0_2, DCI format 2_1}. In the example, the wireless device may align the DCI size of DCI format 1_2 and 0_2 same as the size of DCI format 2_1 (e.g., a preemption indication DCI). For example, the wireless device may receive {DCI format 1_2, DCI format 1_0} and {DCI format 0_2, DCI format 1_0} to align a new DCI format(s) for URLLC to that of DCI format 1_0.

In an example, a wireless device may not expect to be configured with one or more DCI formats used for a group-common DCI or a broadcast as a source DCI format. For example, the wireless device may not expect to align a DCI format 2_0, 2_1, 2_2, 2_3 or 1_0 with SI-RNTI, P-RNTI, RA-RNTI to another DCI format by the configuration. The wireless device may not expect to align a fallback DCI format (e.g., DCI format 1_0) as a source DCI format with a reference DCI format at least when the fallback DCI is monitored on CSS. The wireless device may expect to be configured with {DCI format 1_0, DCI format X} in case DCI format 1_0 being monitored in USS. One example is that the wireless device is configured with {DCI format 1_0 in USS, DCI format 1_0 in CSS}. In an example, a wireless device may also receive USS or CSS in the one or more RRC messages, where the source or target DCI format is monitored. A wireless device may receive one or more pairs of {a source DCI format, a target DCI format}, wherein a source DCI format (e.g., a single source DCI format may be mapped to multiple target DCI formats). In response to receiving {a source DCI format, a target DCI format}, a wireless device may determine a DCI size of the source DCI format based on size of the target DCI format in a search space where the wireless device may receive a configuration of the source DCI format to be monitored in the search space.

In an example, the wireless device may maintain a single DCI size for the source DCI format over the one or more search spaces in an active BWP. When a wireless device receives multiple pairs corresponding to a single source DCI format, the wireless device may adjust (adapt or apply) multiple DCI sizes for the source DCI format. The wireless device may determine a DCI size for the source DCI format in a search space based on one of target DCI format(s) associated with the search space among the configured target DCI formats mapped to the source DCI format. For example, if a wireless device receives {DCI format 1_2, DCI format 1_0} and {DCI format 1_2, DCI format 2_0} and receives a SS1 with DCI format 1_0 and DCI format 1_2, and a SS2 with DCI format 1_2 and DCI format 2_0, the wireless device may apply the size of DCI format 1_0 for DCI format 1_2 in the SS1, and the wireless device may apply the size of DCI format 2_0 for DCI format 1_2 in the SS2. In an example, a wireless device may receive one or more pairs for a search space where the one or more pairs are used to determine the DCI sizes for the search space. In the example, the wireless device may not expect more than one target DCI formats corresponding to a single source DCI format for a search space.

Figure 18:
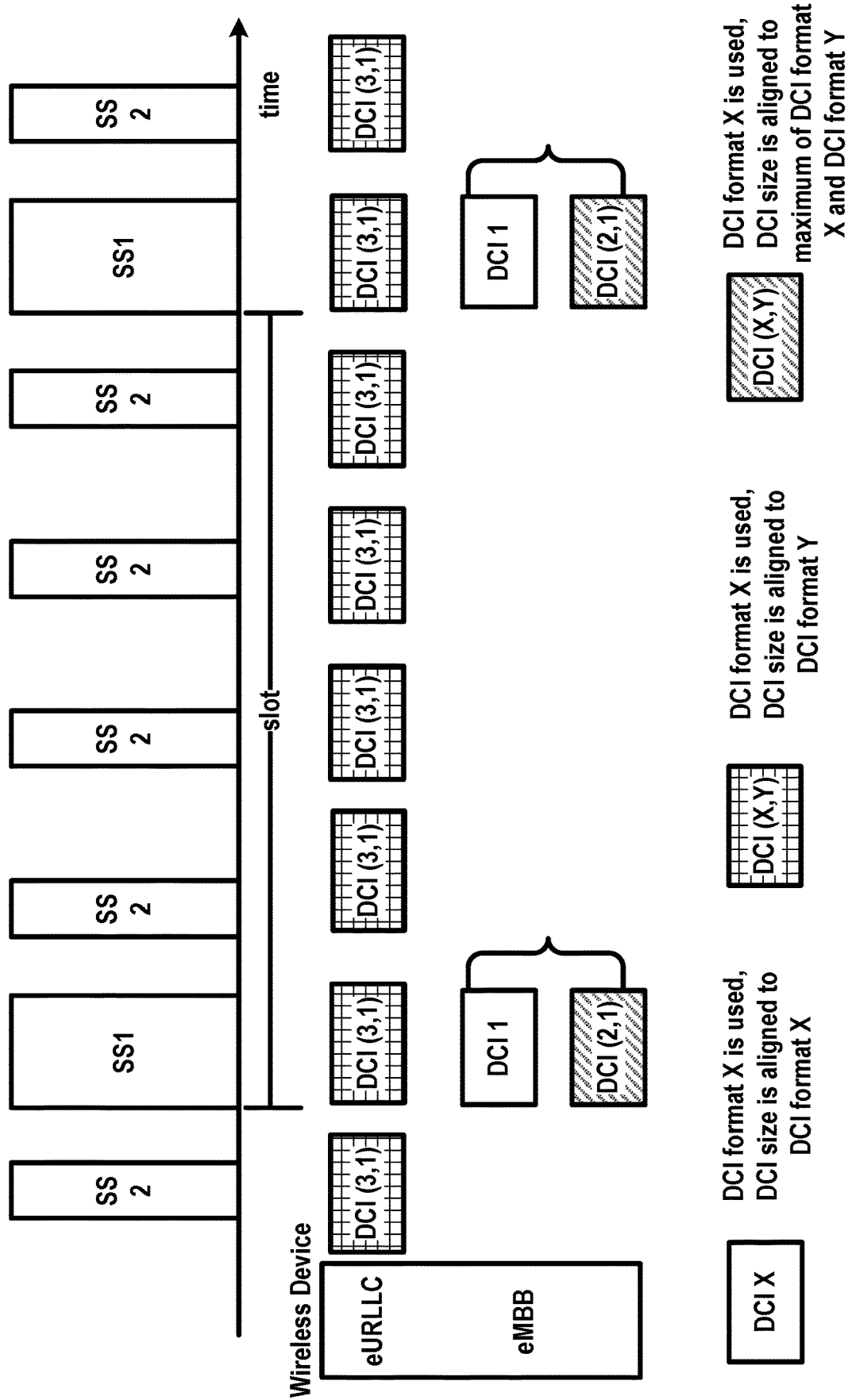
FIG. 18 is a diagram of an example of DCI size alignment as per an embodiment of the present disclosure.

FIG. 18 illustrates an example of embodiment in a cell. In an example, the wireless device may support two DCI sizes for the cell. The base station may configure a first DCI format (DCI 1) based on a fallback DCI format. The base station may configure a second DCI format (DCI 2) based on a non-fallback DCI format, wherein the second DCI format may schedule data for eMBB services. The base station may configure a third DCI format (DCI 3) based on a non-fallback DCI format (e.g., DCI (3, 1)), wherein the third DCI format may schedule data for URLLC services. The wireless device may be configured with {DCI format 3, DCI format 1} (e.g., DCI (3, 1)), wherein the DCI format 3 (the third DCI format, DCI 3) is a source DCI format and the DCI format 1 (the first DCI format, DCI 1) is a target DCI format. The wireless device may perform a DCI size alignment of the third DCI format (DCI 3) based on a DCI size of the DCI format 1 (DCI 1). For example, the wireless device may add zeros to the DCI format 3 in response to a first size of the DCI format 3 is smaller than a second size of the DCI format 1 before the alignment. The wireless device may truncate bits from the DCI format 3 in response to the first size of the DCI format 3 is larger than the second DCI size of the DCI format 1 before the alignment. The wireless device may determine a single DCI size for the DCI format 3 and the DCI format 1 regardless of search space where the wireless device monitors one or more of the DCI format 1 and the DCI format 3.

In an example, the wireless device may perform a DCI size alignment between the DCI format 1 and the DCI format 2 (DCI 2) (e.g., DCI (2, 1)). For example, the wireless device may determine a single DCI size of DCI 2 and DCI 1 based on a larger size between a first DCI size of DCI format 1 and a second DCI size of DCI format 2 (e.g., DCI format 1 is DCI format 1_0 and DCI format 2 is DCI format 0_0 in CSS). For example, the wireless device may determine the second DCI size of the second DCI format as the single DCI size as the second DCI size is larger than the first DCI size. As DCI format 3 is configured to be aligned with DCI format 1, the wireless device may assume the size of DCI format 3 is the same size to that of DCI format 1 and DCI format 2 in monitoring DCI format 3. In the example, the wireless device may determine the single DCI size based on the second DCI size of the second DCI format. The single DCI size is applied for the DCI format 1 based on the DCI size alignment between the DCI format 1 and the DCI format 2. The single DCI size is applied for the DCI format 3 based on the {DCI format 3, DCI format 1} configuration. Based on the indication/configuration by the base station, the wireless device may result in a single DCI size in the example.

In an example, when the size of DCI format 3 is larger than the size of DCI format 1 (after performing a DCI size alignment for the DCI format 1 if applicable), the wireless device may consider it is an invalid configuration, and may not monitor DCI format 3. Otherwise, the wireless device may assume that remaining bits to align DCI format 3 to the size of DCI format 1 are filled with zeros.

A wireless device may maintain a number of DCI formats within its capabilities while allowing more DCI formats defined to support various use cases.

In an example, a wireless device may support up to K+1 DCI sizes, and may support up to K DCI sizes to support a unicast scheduling such as based on C-RNTI and MCS-C-RNTI for a given cell regardless of actual monitored number of DCI sizes within a unit time (e.g., a slot, a few OFDM symbols). In the example, the wireless device may support up to K monitored number of DCI sizes and may support up to K-1 monitored number of DCI sizes to support a unicast scheduling such as based on C-RNTI and C-URLLC-RNTI for a given cell within the time unit. The wireless device may be configured with one or more SSs which may cross a first unit and a second unit. The wireless device may not support more than K DCI sizes in either the first unit or the second unit. The wireless device may not support more than K-1 DCI sizes for a ucast scheduling in either the first unit or the second unit.

In an example, a wireless device may receive one or more RRC messages of one or more search space sets (SSs). The parameters of a SS may comprise at least one of: monitoring periodicity and/or offset in a unit (e.g., a slot), a duration (e.g., for common search space set), monitoring symbols in a slot (e.g., finer monitoring periodicity than a unit), a list of candidates with a set of aggregation levels, a type of search space (e.g., CSS or USS), one or more DCI formats associated with the SS. In an example, each USS may comprise a configuration of a fallback DCI (e.g., DCI format 1_0 and/or 0_0) or a non-fallback DCI (e.g., DCI format 1_1 and/or 0_1). In addition, each USS may also comprise a configuration of a new DCI format (e.g., format 1_2 and/or 0_2) for URLLC service. In an example, each CSS may comprise a configuration of one or more DCI formats used for a group-common DCI and/or a broadcast, and/or a fallback DCI for a ucast scheduling. In addition, each CSS may comprise a configuration of a new DCI format (e.g., format 1_2 and/or 0_2).

In an example, a wireless device may receive RRC messages comprising one or more UE-specific SSs. The one or more UE-specific SSs may comprise a configuration of a new DCI format (e.g., DCI format 1_2 and/or 0_2). The wireless device may determine a DCI size of the new DCI format based on whether a SS configured with the new DCI format belongs to a first case or a second case. For example, the first case may include that the SS may be configured with one or more new DCI formats (e.g., DCI format 1_2 and/or 0_2). For example, the second case may include that the SS may be configured with one or more new DCI formats (e.g., DCI format 1_2 and/or 0_2) and other DCI formats (e.g., DCI format 1_0 and/or 0_0 and/or 2_3 and/or 2_0 and/or the like). The wireless device may determine the size of the new DCI format based on the new DCI format(s) on the first case. The wireless device may determine the size of new DCI format based on the new DCI format(s) and the other DCI formats. For example, in the first case, the wireless device may determine the size of the new DCI format based on a maximum size or a larger size between a first size of a first new DCI format and a second size of a second new DCI format. For example, the first new DCI format may schedule downlink data and the second new DCI format may schedule uplink data for URLLC services. For example, the first case may comprise that a wireless device is configured with the new DCI format(s) for one or more search spaces, wherein the wireless device may monitor only the new DCI format(s) via the one or more search spaces. For example, the first case may comprise that the wireless device may support one or more DCI sizes of the new DCI format(s) by an UE capability. For example, the first case may comprise that a base station may configure to determine the one or more DCI sizes of the new DCI format(s) without a DCI size alignment to other DCI format(s).

For example, in the second case, the wireless device may determine the size of the new DCI format based on a size of the other DCI format(s) (e.g., a size of DCI format 1_0). The new DCI format may be zero-padded (e.g., zeros are added) to match the size to the other DCI format(s). Among the other DCI format(s), if there are more than one DCI sizes to support the other DCI format(s), the smaller DCI size (or the larger DCI size) is chosen for the new DCI format(s). The wireless device may not expect more than one DCI size for the other DCI formats associated with the SS. In an example, the second case may comprise a wireless device is configured with the new DCI format(s) along with the other DCI format(s) for one or more search spaces, wherein the wireless device may monitor the new DCI format(s) and the other DCI format(s) via the one or more search spaces. For example, the second case may comprise that the wireless device may not support one or more DCI sizes of the new DCI format(s) by an UE capability. With the one or more DCI sizes additionally, a total number of DCI sizes may exceed the UE capability. For example, the second case may comprise that a base station may configure to determine the one or more DCI sizes of the new DCI format(s) by a DCI size alignment to the other DCI format(s).

Figure 19:
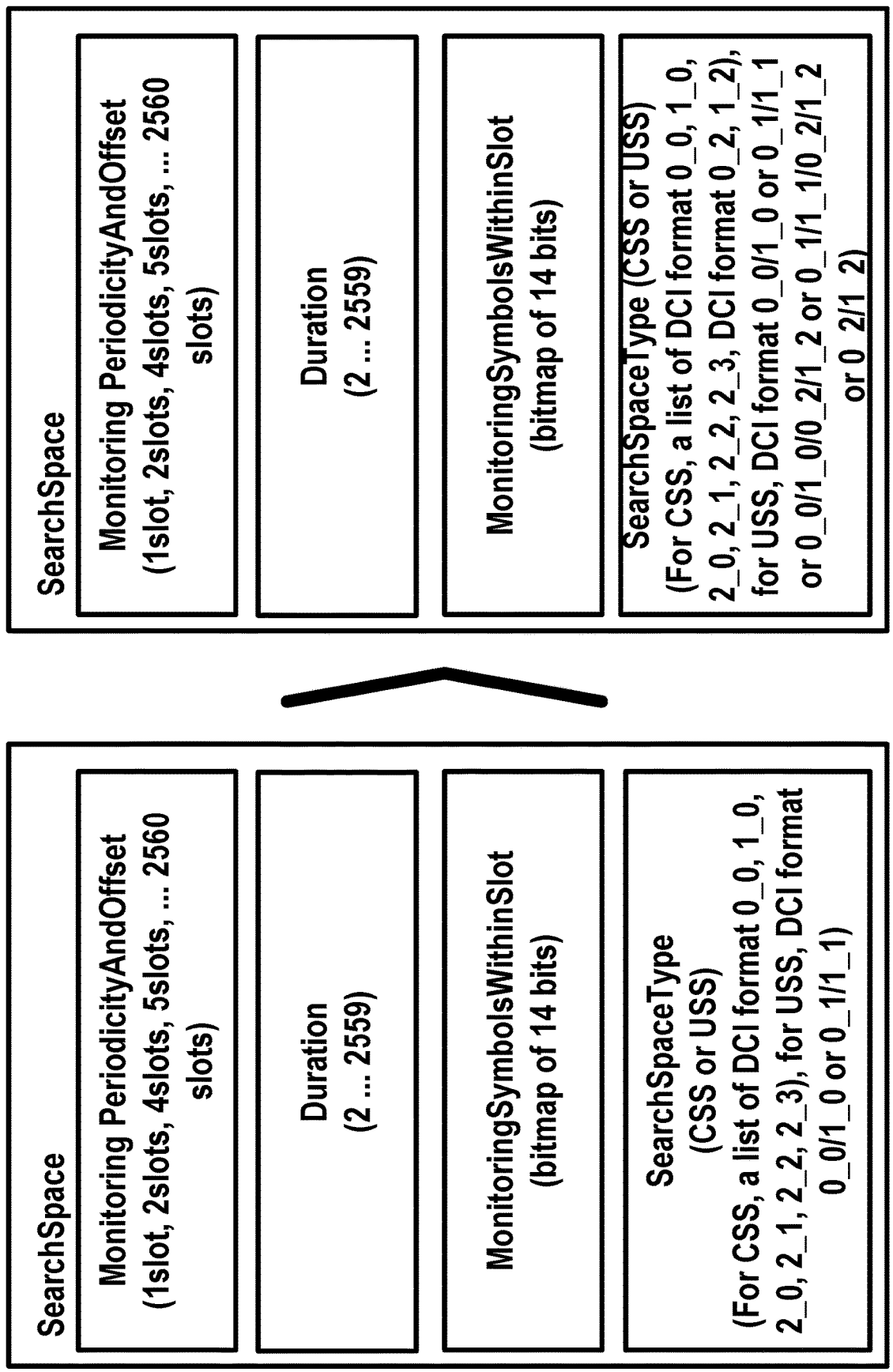
FIG. 19 is a diagram of an example of a configuration for a search space as per an embodiment of the present disclosure.

FIG. 19 illustrates an example. In configuring one or more new DCI formats supported for a different set of services (e.g., enhanced URLLC, URLLC), a base station may configure the one or more new DCI formats in a SS which may also configure other DCI formats to support existing services and/or existing DCI formats. In an example, a wireless device may receive one or more parameters related to a SS which may comprise monitoring occasion information across slots and/or within a slot, a search space type, and a list of DCI formats associated with the SS. In the list of DCI formats, the wireless device may expect to be configured with one or more new DCI formats. In a SS, a wireless device may be configured with a USS with one or more existing DCI formats. The wireless device may be configured with the USS with one or more new DCI formats. The wireless device may be configured with the USS with one or more existing DCI formats and one or more new DCI formats. The wireless device may be configured with a CSS with one or more existing DCI formats. The wireless device may be configured with the CSS with one or more existing DCI formats and one or more new DCI formats. FIG. 19 illustrates an example of enhancement in search space configuration, wherein a left diagram shows an example of an existing mechanism and a right diagram illustrates an example embodiment. For example, the base station may configure the existing DCI formats and the new DCI formats for a same search space, wherein the wireless device may perform a DCI size alignment between the existing DCI formats and the new DCI formats. For example, the wireless device may add zeros or truncate bits from the new DCI formats to match a DCI size to one of the existing DCI formats. For example, the wireless device may determine a larger DCI size of a first DCI format of the existing DCI formats and a second DCI format of the new DCI formats. The wireless device may align a downlink DCI format of the new DCI formats and an uplink DCI format of the new DCI formats. The wireless device may align a downlink DCI format of the existing DCI formats and an uplink DCI format of the existing DCI formats. For example, the wireless device may align a downlink DCI format of the new DCI formats and a downlink DCI format of the existing DCI formats. The wireless device may align an uplink DCI format of the new DCI formats and an uplink DCI format of the existing DCI formats.

Similar example shown in FIG. 18, a wireless device may receive a configuration of {DCI format 3, DCI format 1} and {DCI format 2, DCI format 1} for {source DCI format, target DCI format}. The wireless device may align DCI format 3 based on DCI format 1. The wireless device may align the DCI format 1 and DCI format 2. (e.g., DCI format 2 is also aligned to the size of DCI format 1 or DCI format 1 and DCI format 2 are aligned to a larger size). This may reduce effective use of a small DCI size for DCI format 3 (e.g., a new DCI format URLLC). This may not increase the requirement of the number of supported DCI sizes by the wireless device. In an example, a wireless device may receive a configuration of {DCI format 3, DCI format 1} and {DCI format 2, DCI format 1} only for eMBB SS1, and may not receive the configuration for URLLC SS2. In the example, the wireless device may align the size of DCI format 3 to the size of DCI format 1 only in eMBB SS1. This may allow the use of a small DCI size for URLLC at least in some search spaces. This may need to increase the number of DCI sizes that the wireless device may support.

Figure 20:
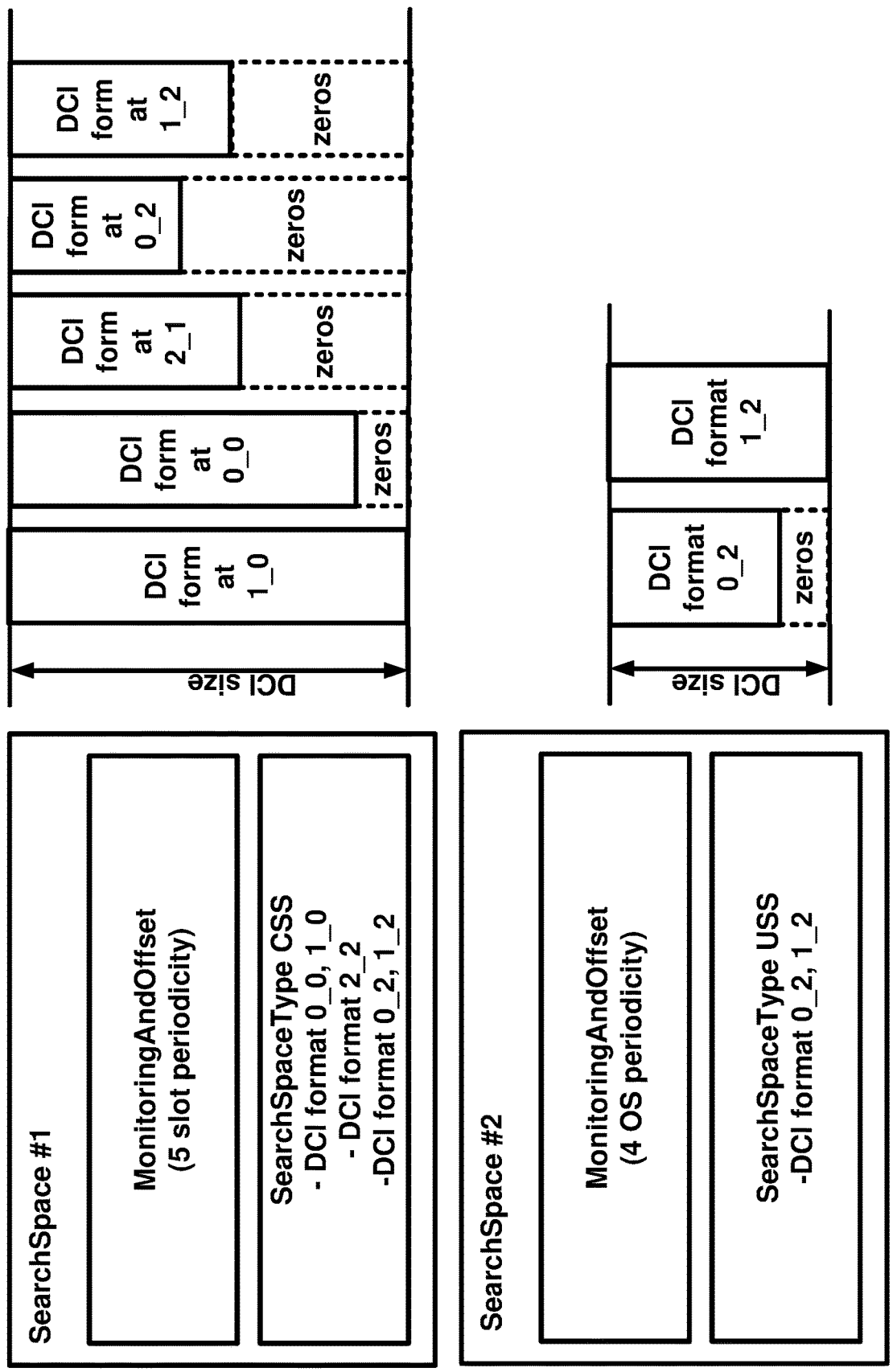
FIG. 20 is a diagram of an example of DCI size alignment as per an embodiment of the present disclosure.

In an example, a wireless device may determine a DCI size for a first DCI format depending on one or more parameters in a SS configured for monitoring the first DCI format. FIG. 20 illustrates an example. For example, the wireless device is configured with SearchSpace #1 and SearchSpace #2. In SearchSpace #1, the wireless device is configured with 5 slot periodicity CSS monitoring one or more DCI formats: DCI format 0-0/1-0 (size aligned to DCI format 1-0), and a DCI format 2-2 (size aligned to DCI format 1-0), and new DCI formats (e.g., DCI format 0-2 and 1-2 for downlink and uplink scheduling for URLLC services). In SearchSpace #2, the wireless device is configured with 4 OFDM symbols periodicity USS monitoring new DCI formats (e.g., DCI format 0-2 and 1-2). In response to monitoring the new DCI formats in SearchSpace #1, the wireless device may determine the DCI size according to the DCI format 1_0 as the other DCI formats are also aligned with DCI format 1_0 in terms of the size. In SearchSpace #1, the wireless device performs necessary zero-padding on a DCI format to align the size to that of DCI format 1_0 as shown in FIG. 20. In SearchSpace #2, the wireless device may determine a DCI size of the new DCI formats based on the new DCI formats. For example, the wireless device may take a larger value (e.g., the maximum) between sizes of two DCI formats (e.g., DCI format 0_2 and DCI format 1_2) to determine the DCI size. In an example, a wireless device may determine different size of a DCI format based on UE capabilities and/or configurations. For example, the wireless device may determine a single size for one or more DCI formats configured for a search space. In FIG. 20, the wireless device may determine a size of the DCI format 1_0 as the single size of SearchSpace #1. The wireless device may determine a size of larger size between the DCI format 0_2 and DCI format 1_2 as the single DCI size for the SearchSpace #2.

In FIG. 20, the wireless device may perform a DCI size alignment for a DCI format 0_2 and a DCI format 1_2 (e.g., new DCI formats supporting URLLC services) in a first search space (SearchSpace #1) based on a first case and in a second search space (SearchSpace #2) based on a second case. For example, the first case may comprise one or more cases wherein the wireless device may be required to perform a DCI size alignment by adding zeros or truncate bits. For example, the second case may comprise one or more cases wherein the wireless device may not perform additional DCI size alignment except that the wireless device may align a downlink DCI format (e.g., DCI format 1_2) and an uplink DCI format (e.g., a DCI format 0_2). The base station may configure the DCI format 0_2 to be aligned with a DCI format 1_0 in a CSS. The base station may configure the DCI format 1_2 to be aligned with the DCI format 1_0 in the CSS. In the first search space, the wireless device may align a first size of the DCI format 0_2 and a second size of the DCI format 1_2 based on a size of the DCI format 1_0 based on the configuration. The wireless device may align a size of a DCI format 2_1 to the size of the DCI format 1_0 based on one or more rules (e.g., a group common DCI may be aligned with a size of the fallback downlink DCI format). In the second search space, the wireless device may align the first size of the DCI format 0_2 and the second size of the DCI format 1_2 based on one or more rules (e.g., a downlink DCI format of a same DCI format (e.g., DCI format 1_X) may be aligned with an uplink DCI format of the same DCI format (e.g., DCI format 0_X)). Note that the DCI format X_Y may represent a downlink or an uplink DCI format of Y DCI format. For example, X=0 may represent the uplink DCI format of Y DCI format. For example, X=1 may represent the downlink DCI format of the Y DCI format. For example, Y may represent a DCI format. For example, Y=0 may represent a fallback DCI format. For example, Y=1 may represent a non-fallback DCI format. For example, Y=2 may represent an URLLC non-fallback DCI format (e.g., a compact DCI format).

The wireless device may add zeros to the DCI format 0_0 in the first search space in response to a size of the DCI format 0_0 before alignment is smaller than the size of the DCI format 1_1. Similarly, the wireless device may add zeros to the DCI format 2_1, the DCI format 0_2 and the DCI format 1_2 in the first search space. The wireless device may add zeros to a smaller sized DCI format between the downlink DCI format and the uplink DCI format in the second search space. The wireless device may add zeros to the DCI format 0_2 in response to the first size of the DCI format 0_2 is smaller than the second size of the DCI format 1_2. The wireless device may determine a DCI size of one or more DCI formats monitored on the first search space based on the size of the DCI format 1_0. The wireless device may determine a second DCI seize of the one or more DCI formats monitored on the second search space based on the second size of the DCI format 1_2.

In an example, a wireless device may receive one or more RRC messages comprising an DCI size alignment indication that may indicate to align a source DCI format to a reference DCI format. For example, the reference DCI format may be pre-determined. For example, the reference DCI format may be a DCI format 1_0. In an example, a wireless device may receive one or more RRC messages indicating/comprising configuration parameters of a reference DCI format for a source format for a search space. A base station may configure the reference DCI format for the source DCI format. The base station may be able to configure a DCI format with a similar size to the source DCI format as the reference DCI format. In an example, a wireless device may receive RRC messages indicating/comprising configuration parameters of one or more pairs of {a source DCI format, a target DCI format}. The wireless device, based on the configuration parameters, may determine a first size of the source DCI format based on a second size of the target DCI format. For example, a wireless device may receive 'a DCI size alignment indication' in a SS #1 where a DCI format 1_0/0_0 and a DCI format 1_2/0_2 are associated/configured with the SS #1. The wireless device may apply a DCI size alignment process for the DCI format 1_2/0_2 while keeping a size of the DCI format 1_0 and a size of the DCI format 0_0 being kept. For example, the wireless device may add zeros or truncate bits from the DCI format 1_2/0_2 to align sizes to the size of the DCI format 1_0.

For example, a wireless device may receive configurations indicating that new DCI format 0_2 and/or 1_2 may be aligned with a DCI format 1_0 in one or more search space sets. The wireless device may monitor the DCI format 0_2 and/or the DCI format 1_2 (the new DCI format(s)) on the one or more search space sets. When the configuration (e.g., RRC messages may comprise a reference DCI format, a DCI alignment indication or RRC messages may comprise a reference DCI format, a DCI alignment indication, a source DCI format) may indicate a reference DCI format for a source DCI format, the wireless device may align the source DCI format to the reference DCI format. When a wireless device receives a DCI alignment indication without indication of a reference DCI format for a SS, the wireless device may align DCI formats associated with the SS to the maximum DCI sizes of all the DCI formats monitored/configured to monitor on the SS. When a wireless device receives a DCI alignment indication without indication of a reference DCI format for a SS, the wireless device may align DCI formats associated with the SS to the maximum DCI sizes of all the legacy DCI formats (e.g., DCI formats being used for legacy systems such as DCI format 0_0/1_0 and DCI format 1_1/0_1). When a wireless device receives a DCI alignment indication without indication of a reference DCI format for a SS, the wireless device may align DCI formats associated with the SS to a DCI size of a DCI format (e.g., DCI format 1_0, DCI format 1_0/0_0 or DCI format 2_x or DCI format 1_1/0_1). If there are more than two DCI sizes supported by the SS when enabling of DCI size alignment indication is enabled, the wireless device may take a smallest or a largest value among the DCI sizes. For example, the wireless device may determine the smallest/smaller value among the more than two DCI sizes, wherein the smallest value may be a larger than a size of the source DCI format. For example, the wireless device may select a DCI size among the more than two DCI sizes, wherein the selected DCI size is larger or equal to the size of the source DCI format while smaller than other DCI sizes among the more than two DCI sizes (e.g., a smallest DCI size among DCI sizes larger than or equal to the size of the source DCI format, from the more than two DCI sizes).

Figure 21:
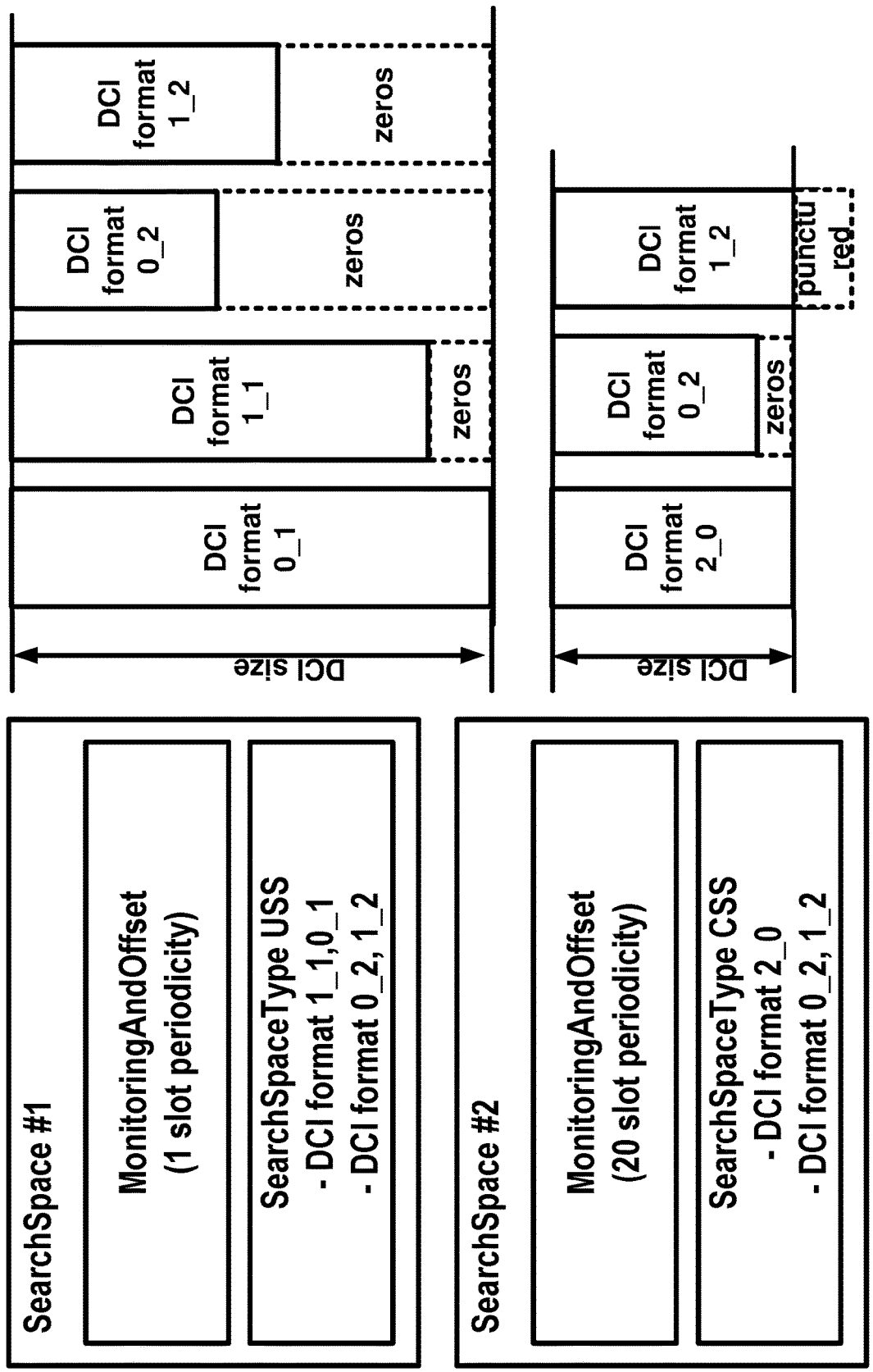
FIG. 21 is a diagram of an example of DCI size alignment as per an embodiment of the present disclosure.

FIG. 21 illustrates an example of configuring one or more new DCI formats in a first USS (SearchSpace #1) and a second CSS (SearchSpace #2). In the example, the wireless device may be configured with a reference DCI format as a DCI format 0_1 (or a DCI format 0_1/1_1) for a DCI format 0_2/DCI format 1_2 in the first USS. In the example, the wireless device may be configured with a reference DCI format as a DCI format 2_0 for the DCI format 0_2/1_2 in the second CSS. The first USS is for a non-fallback DCI based uncast (e.g., C-RNTI based on DCI format 1_1/0_1). The second CSS is for an SFI transmission where the size of DCI for SFI may be different from the size of DCI format 1_0. Based on the configuration, the wireless device may align the size of new DCI format(s) to the other DCI format(s) (e.g., maximum between the size of DCI format 1_1 and DCI format 0_1 for SearchSpace #1 and size of DCI format 2-0 for SearchSpace #1). For example, the wireless device may add zeros to the DCI format 0_2 until a first size of the DCI format 0_2 becomes equal to a size of the reference DCI format (e.g., DCI format 0_1 or a maximum or larger value between a first DCI size of the DCI format 1_1 and the size of the DCI format 0_1) in the SearchSpace #1. The wireless device may add zeros to the DCI format 1_2 until a second size of the DCI format 1_2 becomes equal to a size of the reference DCI format (e.g., DCI format 0_1 or a maximum or larger value between a first DCI size of the DCI format 1_1 and the size of the DCI format 0_1) in the SearchSpace #1.

The wireless device may truncate bits from the DCI format 1_2 as the first size of the DCI format 1_2 is larger than a size of the DCI format 2_0 in the SearchSpace #2. The DCI format 2_0 is the reference DCI format for the SearchSpace #2. The wireless device may add zeros to the DCI format 0_2 as the second size of the DCI format 0_2 is smaller than the size of the DCI format 2_0 in SearchSpace #2. The wireless device may determine a DCI size for SearchSpace #1 based on the size of DCI format 0_1. The reference DCI format may be the DCI format 0_1 in SearchSpace #1. The wireless device may determine a second DCI size for SearchSPace #2 based on the size of DCI format 2_0. The reference DCI format may be the DCI format 2_0 in SearchSpace #2.

The wireless device may truncate bits from the new DCI format to align its size to that of the other DCI format(s) as illustrated in FIG. 21. A wireless device may be configured with one or more new DCI formats in one or more SSs. The wireless device may determine the DCI size of the new DCI formats based on the configuration of a SS (e.g., the configured DCI formats) and the UE capability (e.g., whether the UE supports different DCI sizes including a DCI size of a new DCI format). In an example, the DCI size alignment of a new DCI format to an existing DCI format may be performed when the wireless device may not support additional DCI size from the new DCI format. The wireless device may trigger 'alignment' in case the wireless device is configured with more DCI sizes than the wireless device can support at a given unit for a cell or for a cell. The wireless device may receive a reference DCI format for one or more DCI formats to align the size. The wireless device may determine the DCI size for the one or more DCI formats based on the reference DCI format.

Figure 22:
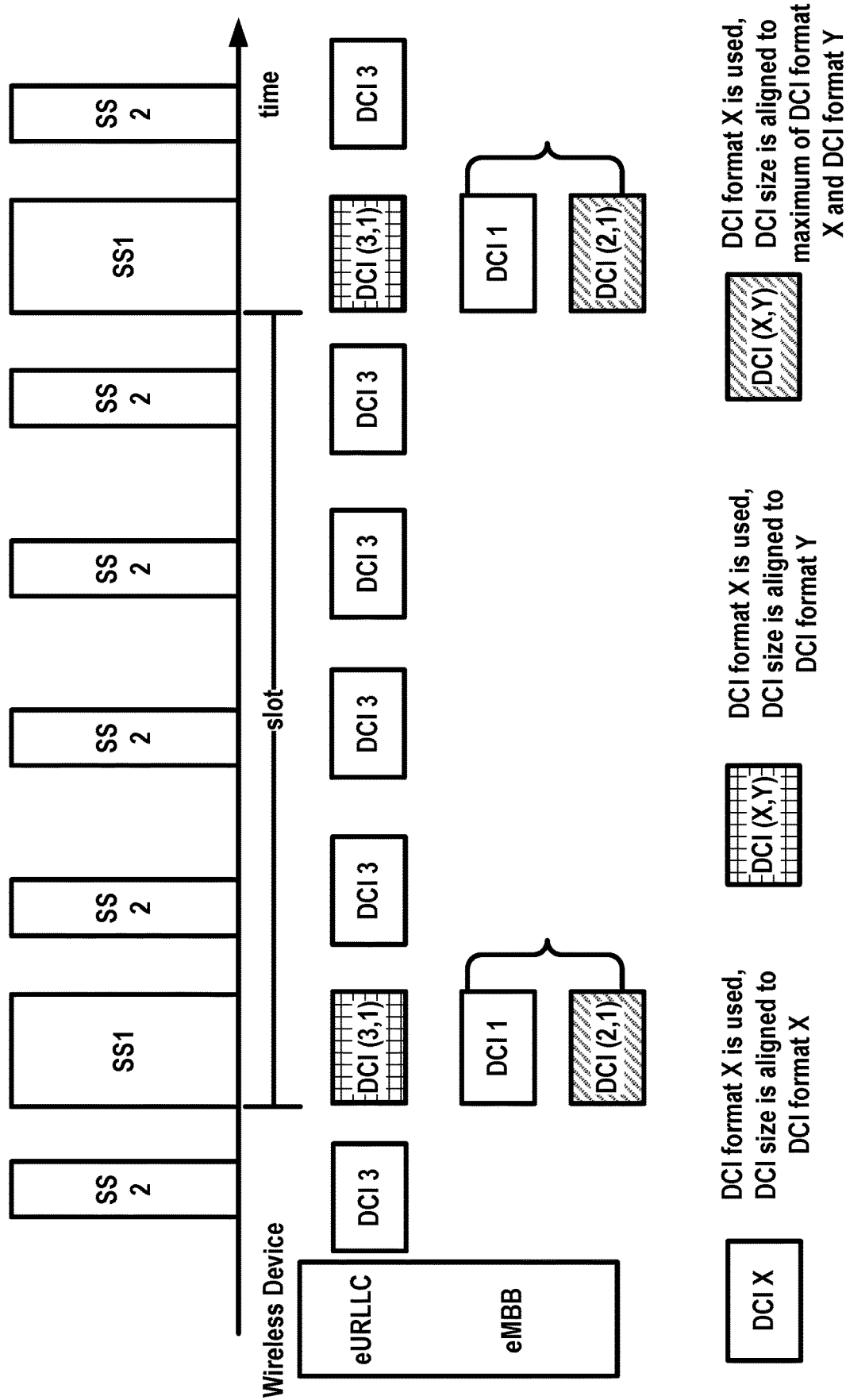
FIG. 22 is a diagram of an example of DCI size alignment as per an embodiment of the present disclosure.

FIG. 22 illustrates an example of embodiments. A wireless device may be configured with a first search space (SS1) for monitoring a DCI based on a DCI format 1, DCI format 2 or DCI format 3, and a second search space (SS2) for monitoring a DCI based on DCI format 3. When the wireless device monitors SS1, the wireless device aligns the sizes of DCI format 3 and DCI format 2 to the size of DCI format 1 to reduce the UE complexity. The wireless device determines the size of DCI format 3 based on DCI format 3 in SS2. The wireless device may determine a first DCI size for the DCI format 3 and a second DCI size for the DCI format 3 based on a first search space or a second search space wherein the wireless device monitors the DCI format 3. The wireless device may determine the first DCI size based on the DCI format 1, the DCI format 2 and the DCI format 3 in the first search space to minimize UE complexity increase. For example, the wireless device may determine a DCI size for the DCI format 1/DCI format 2/DCI format 3 as a largest DCI size among three DCI formats. The wireless device may need to add considerable zero bits to the DCI format 3 wherein the DCI format 3 may be a small sized DCI format to support URLLC services. The wireless device may experience a performance degradation in the first search space. This however allow more scheduling opportunities/occasions for the DCI format 3, which may lead to reduced latency. The wireless device may determine the size of the DCI format 3 based on the DCI format 3 in the second search space as there is no other DCI format monitored in the second search space. This may reduce adding unnecessary zeros to the DCI format 3 when DCI size alignment may not be necessary.

In an example, the wireless device may use the size of the DCI format in the first search space and the second search space. With increased number of DCI sizes in the first search space (e.g., a first size of the DCI format 1 and a second size of the DCI format 3), the wireless device may need to increase a number of blind decodings by two times of the first search space. This may lead to reduced number of candidates (e.g., half candidates) compared to a case wherein the first search space is not configured with the DCI format 3. This may lead to increase UE complexity (e.g., a number of blind decoding). Embodiments allow efficient mechanism to minimize adding unnecessary zeros to one or more small sized DCI formats while allowing maintaining a same number of candidates/blind decoding capabilities/UE capabilities. The wireless device may support a short duration of search space monitoring without increasing the UE complexity considerably.

In an example, a wireless device may support a DCI size for a search space. For the search space, the wireless device may receive configuration parameters such as monitoring periodicities and one or more DCI formats configured for the search space for monitoring one or more DCIs based on the one or more DCI formats. The wireless device may perform a DCI size alignment among the one or more DCI formats based on the DCI size. The wireless device may add zeros and/or truncate bits from a DCI format of the one or more DCI formats to align a size of the DCI format to the determined DCI size. The wireless device may determine the DCI size (e.g., a single DCI size) for the search space based on a rule. For example, the wireless device may determine the DCI size as a maximum DCI size (e.g., a largest size) among sizes of the one or more DCI formats. The wireless device may determine each size of each DCI format of the one or more DCI formats. The wireless device may determine a largest size as the DCI size for the one or more DCI formats.

For example, the wireless device may determine the DCI size based on a fallback DCI format for downlink (e.g., a downlink DCI format of the fallback DCI format, DCI format 1_0) at least when the search space is a CSS and DCI format 1_0 (e.g., the fallback DCI format for downlink) is configured to the search space. For example, the wireless device may determine the DCI size as a maximum DCI sizes (e.g., a largest size) of the one or more DCI formats (e.g., DCI formats configured for the search space). For example, the wireless device may determine the DCI size based on a maximum DCI sizes of DCI formats such as DCI format 1_0, DCI format 2_0, DCI format 2_1, DCI format 2_2, DCI format 2_3 (e.g., a group common DCI or a fallback DCI) among DCI formats configured to the search space. The DCI formats may comprise a DCI format wherein a size of the DCI format of the DCI formats may be determined based on a size of the DCI format 1_0. For example, the wireless device may determine the DCI size from a plurality of DCI sizes configured to the wireless device. The wireless device may determine one size from the plurality of DCI sizes, wherein the one size may be a smallest while the one size is larger than a DCI size of a DCI format of the DCI formats.

In an example, a wireless device may receive RRC configurations of a DCI size for a search space. The wireless device may receive one or more DCI sizes for the wireless device to apply to all carriers activated or configured with search space. The wireless device may receive one or more DCI sizes for the wireless device applied to a carrier across all bandwidth parts. The wireless device may receive one or more DCI sizes for a BWP of a cell. For example, a wireless device may receive one or more RRC messages comprising one or more parameters of a search space including a reference DCI format. The wireless device may determine the DCI size of the search space based on the size of the reference DCI format. For example, the reference DCI format, the wireless device may monitor a DCI based on the reference DCI format in the search space or not. The wireless device may perform truncation or zero-padding of each DCI format to align the size to the determined/configured DCI size for the search space. In case, the search space may also schedule a DCI for one or more cross-carriers, the number of DCI sizes for the search space may increase proportionally with the number of cross-carrier scheduled carriers/cells.

In an example, the wireless device may support a single DCI size per SS regardless of the presence of cross-carrier scheduling. For example, a first DCI format scheduling a first cell and a second DCI format scheduling a second cell may be aligned to have a same size. The wireless device may determine the DCI size considering all DCI sizes including DCI sizes from cross-carrier scheduling based on one or more DCI formats. For example, when a maximum DCI size is determined as the DCI size, the wireless device may determine/take the maximum DCI size among DCI sizes including carrier indication field for one or more DCI formats. For example, if a wireless device is configured with DCI format 1_1/0_1 for self-carrier scheduling and cross-carrier scheduling, the DCI size is determined based on maximum {DCI format 1_1 for self-carrier scheduling, DCI format 0_1 for self-carrier scheduling, DCI format 1_1 for cross-carrier scheduling, DCI format 0_1 for cross-carrier scheduling}. In an example, a wireless device may receive self-carrier or cross-carrier scheduling for a first BWP of a cell. The wireless device may receive one or more BWPs which may schedule a DCI for the BWP of the cell in a scheduling cell when cross-carrier scheduling is configured for the first BWP of the cell. When a BWP from the one or more BWPs of the scheduling cell is active (e.g., the BWP is an active BWP), the wireless device may assume a CIF (carrier indication flag) or carrier indicator (CI) is present regardless whether the first BWP is active on the scheduled cell or not to avoid any DCI size change for the self-scheduling in the BWP. When the wireless device may determine the DCI size based on the maximum DCI size among the sizes of the one or more DCI formats, the wireless device may assume cross-carrier scheduling in the BWP regardless whether the first BWP is active on the scheduled cell or not.

In an example, a wireless device may receive RRC messages associating a second BWP of a first cell and a third BWP of a second cell where the second BWP of the first cell is configured with a cross-carrier scheduling wherein the second cell is a scheduling cell, and the third BWP of the second cell may be the scheduling BWP. In response to a BWP switching to the second BWP of the first cell, the wireless device may switch to the third BWP of the second cell along with switching to the second BWP of the first cell. In response to a BWP switching to the third BWP of the second cell, the device may switch to the second BWP of the first cell along with switching to the third BWP of the second cell.

Figure 23:
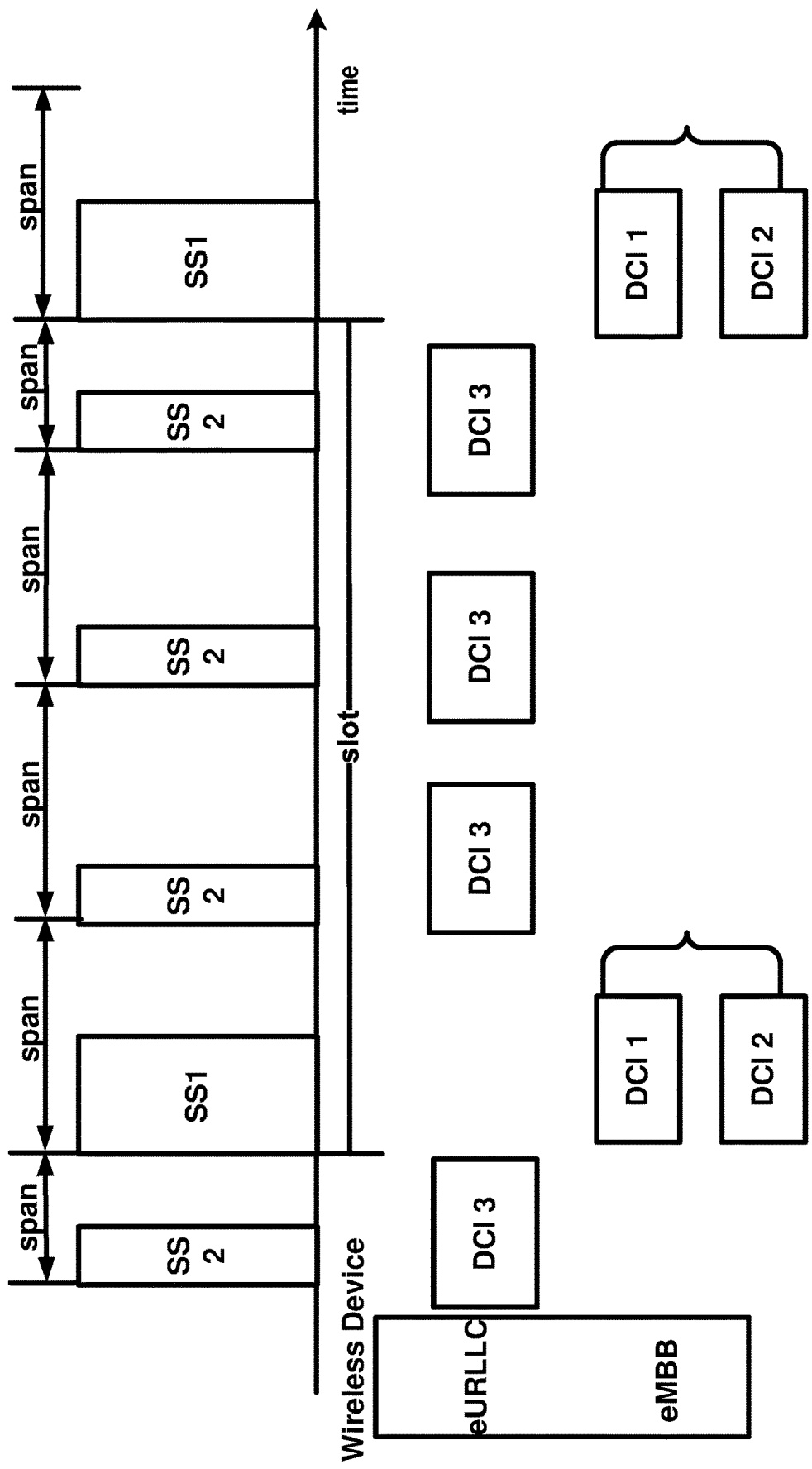
FIG. 23 is a diagram of an example of a search space configuration as per an embodiment of the present disclosure.

In an example, a wireless device may support a number of DCI sizes for one or more configured DCI formats for a cell, wherein the one or more configured DCI format may comprise one or more new DCI formats. The wireless device may have a limited set of capabilities in terms of the number of blind decodings and/or the number of channel estimations. A base station may configure a SS with one or more new DCI formats may not be overlapped with one or more SSs with other DCI formats not to exceed UE capabilities. For example, the limited set of capabilities may be defined in a span. FIG. 23 illustrates an example of an embodiment. For example, a base station may configure one or more first search space or search space sets (SSs) for eMBB and one or more second search space or search space sets (SSs) for URLLC, wherein each span may comprise either the one or more first search spaces or the one or more second search spaces, not to exceed a UE capability related to the maximum number of blind decodings, the maximum channel estimation complexity, and/or the like. As shown in FIG. 23, a slot may comprise four spans where a first span may comprise 4 OFDM symbols, a second span may comprise next 4 OFDM symbols and so on. Different span configuration may not be precluded. The wireless device may support one or more configurations for the span such as a number of spans in a slot and/or a minimum gap between two consecutive spans. The base station may configure a first SS (SS1) for eMBB services, wherein the first SS is configured with a DCI format 1 (DCI 1) and a DCI format 2 (DCI 2). The base station may configure a second SS (SS2) for URLLC services, wherein the second SS is configured with a DCI format 3 (DCI 3). The base station may configure the first SS in a first span of each slot. The base station may configure the second SS in remaining spans excluding the first span of the each slot. The wireless device may monitor one or more DCI formats associated with a SS. For example, the wireless device may be configured with DCI format 1 and 2 for SS1 and DCI format 3 for SS2 as shown in FIG. 23. The wireless device may monitor DCI format 3 in SS2 and DCI format 1 and 2 in SS1.

In an example, a wireless device may be configured with a first DCI format (e.g., DCI format 1_0 or DCI format 0_0) for supporting both eMBB and URLLC services at least in one or more search space sets (SSs). The wireless device may assume that one or more DCI fields of the first DCI format may be same for eMBB or URLLC services of the first DCI format. The wireless device may assume that the one or more DCI fields may have the same size for eMBB or URLLC services of the first DCI format. The wireless device may assume that a first DCI scheduling a downlink or uplink scheduling for eMBB service is encoded with a first RNTI. The wireless device may assume that a second DCI scheduling a downlink or uplink scheduling for URLLC service is encoded with a second RNTI. The wireless device may interpret one or more values for a DCI field of a DCI of the first DCI format differently depending on the RNTI of the DCI.

Figure 24:
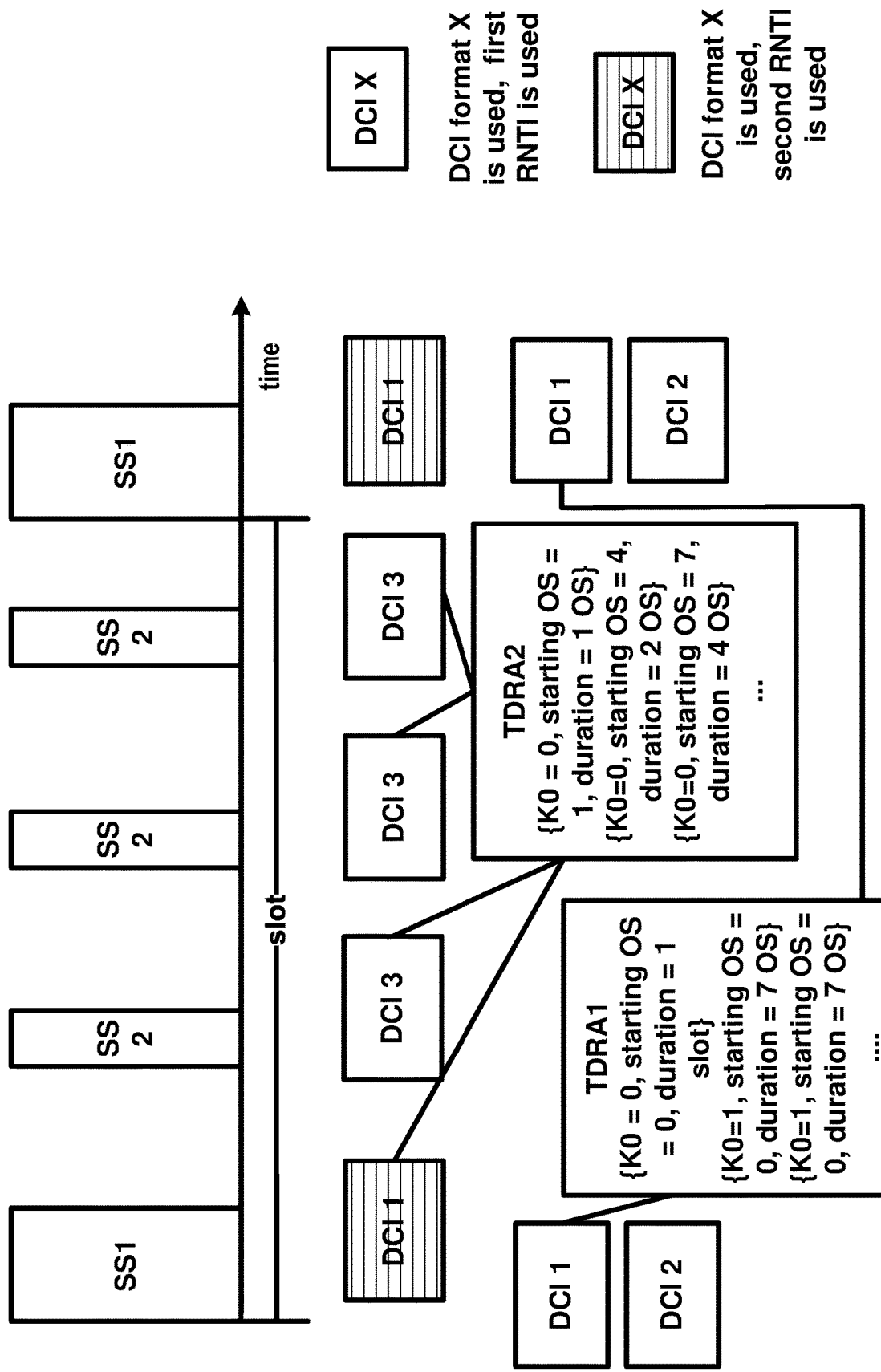
FIG. 24 is a diagram of an example for sharing a set of DCI fields across multiple services as per an embodiment of the present disclosure.

For example, FIG. 24 illustrates an example of different interpretation on a time-domain resource allocation (TDRA) field of the first DCI format (e.g., DCI format 1, DCI format 1_0, DCI format 0_0). The wireless device may apply a first time-domain resource allocation table (e.g., TDRA1) when a first DCI is encoded with the first RNTI. The wireless device may apply a second time-domain resource allocation table (e.g., TDRA2) when a second DCI is encoded with the second RNTI. For example, the first TDRA table may comprise one or more entries of slot-level scheduling (e.g., a duration of 7 OFDM symbols, a duration of 1 slot). For example, the second TDRA table may comprise one or more entries of sub-slot-level scheduling (e.g., a duration of 1 OFDM symbol, a duration of 2 OFDM symbols, a duration of 4 OFDM symbols). In an example, the wireless device may apply the first set of time-domain resource allocation table for a first service (e.g., eMBB service) and the second set of time-domain resource allocation able for a second service (e.g., URLLC service). For example, the wireless device interprets a TDRA field of a DCI based on the first DCI format using the second time-domain resource allocation table when the wireless device receives the DCI on SS 2 (e.g., SS configured to URLLC services). The wireless device may apply the second TDRA table when the DCI is scrambled with the second RNTI. The wireless device may apply the first TDRA table when the DCI is scrambled with the first RNTI. The wireless device may apply/interpret a TDRA field of a second DCI based on a third DCI format (DCI 3) using the second time-domain resource allocation table.

In an example, a wireless device may receive one or more RRC messages comprising configuration parameters of different sets of entries for one or more DCI fields for different services. For example, the wireless device may receive different frequency domain resource block grouping (RBG) unit (e.g., a larger size for URLLC and a small size for eMBB), different set of HARQ-ACK timing values (e.g., timing between PDSCH to PUCCH) (e.g., a OFDM symbol granularity for URLLC, a slot granularity for eMBB), different MCS tables/configurations (e.g., a MCS table with more entries in low SINR levels for URLLC and a second MCS table with fewer entries in low SINR levels for eMBB), or different set of HARQ-ACK resources (in frequency and/or time) for each service or based on RNTI. In an example, a wireless device may receive multiple sets of parameters where first set of parameters of the multiple sets of parameters may be applied to a first DCI based on one or more first RNTIs. For example, the one or more first RNTIs may comprise C-RNTI, MCS-C-RNTI, and/or CS-RNTI. Second set of parameters of the multiple sets of parameters may be applied to a second DCI based on one or more second RNTIs. For example, the one or more second RNTIs may comprise MCS-C-RNTI, a new RNTI, a non C-RNTI used for unicast scheduling.

The mapping between a set of parameters of the multiple sets of parameters to one or more RNTIs may be configured by the base station or an implicit mapping may be considered. For example, one or more new DCI formats which may have a same set of DCI fields to one or more existing DCI formats may be defined wherein the one or more new DCI formats may be encoded/scrambled with a RNTI of the second RNTIs. For example, for each set of parameters (e.g., a set of configuration), a set of RNTIs used for the configuration may be explicitly configured. For example, one or more new RNTIs may be defined where the one or more new RNTIs are based on the additional set of parameters which were not present in for the existing RNTIs and/or DCI formats. For example, the wireless device may receive a first SS and a second SS where a first set of parameters and a second set of parameters are applied respectively. The first SS and the second SS may have a same set of candidates, control channel element (CCE)/resource element group (REG) mapping, and the associated DCI formats so that the wireless device may monitor two SSs as if one SS (from the UE complexity perspective). The wireless device may be configured with first RNTIs for the first SS and second RNTIs for the second SS where different sets of parameters are applied. The wireless device may be configured with the one or more new DCI formats in the second SS where the size of the one or more new DCI formats are aligned with the size of one or more DCI formats associated with the first SS.

In an example, a wireless device may share a time-domain resource allocation table between one or more use cases, between one or more RNTIs, between one or more CORESETs. The wireless device may interpret a time-domain allocation entry differently for each use case, for each RNTI, for each CORESET, for each search space, and/or the like. For example, the wireless device may receive one or more RRC configurations indicating 'a size of scheduling unit' for a service. The wireless device may assume that the size of scheduling unit is a slot when there is no configuration is given. For example, the wireless device may receive 7 OS as the size of scheduling unit. In that case, the wireless device may assume that there are two scheduling units possible in a slot. The wireless device may interpret each TDRA entry based on the size of scheduling unit. For example, if a TDRA entry is {K0=1, starting OS=2, ending OS=7}, the wireless device may assume that the PDSCH is scheduled in the next slot where the starting symbol is $2^{nd}$ OS and the ending symbol is $7^{th}$ OS when the service is for eMBB or when it is based on a first RNTI (e.g., for eMBB service) or when it is scheduled by one or more CORESETs for eMBB. The wireless device may assume that the PDSCH is scheduled in the next scheduling unit where the starting symbol is $2^{nd}$ OS and the ending symbol is $7^{th}$ OS within a scheduling unit (e.g., every 7 OFDM symbols). For example, when the DCI arrives at the first OS of a slot, the wireless device may assume that PDSCH is scheduled at $8^{th}$ OFDM symbol to $14^{th}$ OFDM symbol of the slot as the next scheduling unit starts at $8^{th}$ OFDM symbol of the current slot. If the wireless device receives the DCI at the $8^{th}$ OS of a slot, it may assume that PDSCH is scheduled at $2^{nd}$ OFDM symbol to $7^{th}$ OFDM symbol of the next slot. Some TDRA entries may not be valid for different use cases when the TDRA entries schedule beyond a scheduling unit. For different services, RNTIs, a set of CORESETs, the DCI field size for TDRA may be different as some of TDRA entries are not valid for some services, RNTIs, a set of CORESETs. A wireless device may compute a DCI size for TDRA based on the valid TDRA entries for the services, RNTIs, the set of CORESETs.

Figure 25:
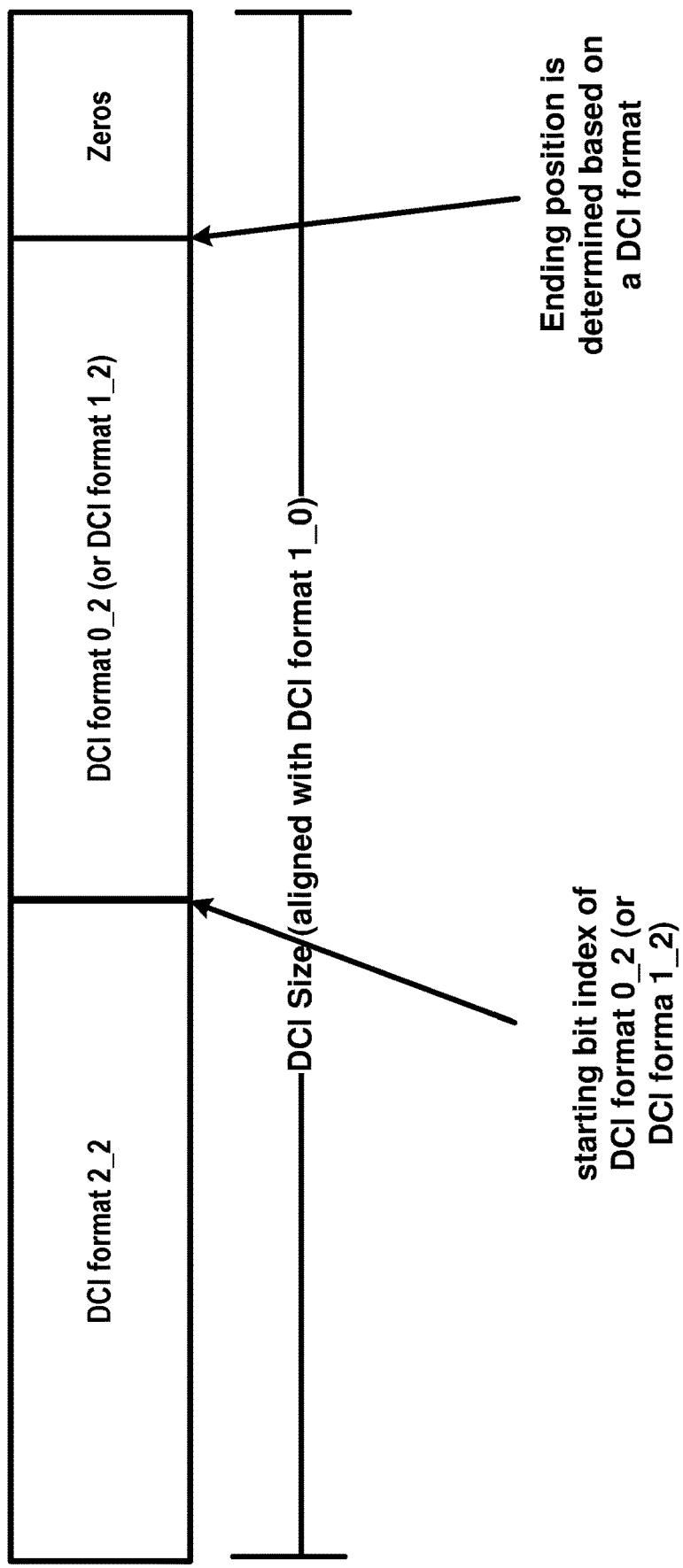
FIG. 25 is a diagram of an example of a PDCCH with one or more DCIs as per an embodiment of the present disclosure.

In an example, a wireless device may receive a DCI comprising a resource assignment for URLLC services in a PDCCH that may comprise one or more of DCIs. For example, the wireless device may use remaining bits from a PDCCH payload carrying one or more SFIs, one or more puncturing indications, or one or more TPC commands, where the remaining bits are present to align the size of the DCI format (e.g., DCI format 2_0, DCI format 2_1, DCI format 2_2) to DCI format 1_0 (e.g., a fallback DCI). The remaining bits may be used to carry one or more DCI fields comprising a resource assignment for URLLC services. A base station may append two (or more) DCIs into one PDCCH. FIG. 25 illustrates an example. The wireless device may receive one or more RRC messages indicating a starting bit position (e.g., starting bit index in FIG. 25) and a length (e.g., determined by ending position—starting bit index, or the length may determine the ending position in FIG. 25) where the first DCI for URLLC services is carried in the PDCCH. The base station may transmit a control, wherein the control comprises one or more first DCI fields of the DCI format 2_2 and one or more second DCI fields of the DCI format 0_2 (or DCI format 1_2) and additional zeros for a DCI size alignment (if needed). The wireless device may receive the control via a candidate of a search space. The control comprises a first DCI based on the DCI format 2_2 and a second DCI based on the DCI format 0_2 (or the DCI format 1_2). The base station may transmit the control via a PDCCH via a candidate of a search space. The wireless device may receive the PDCCH and may determine the first DCI and the second DCI. For example, the base station may configure a first RNTI for receiving the first DCI. The base station may configure a second RNTI for receiving the second DCI. A RNTI used for the appended PDCCH, a wireless device may assume the RNTI for the first DCI. The second DCI carrying a resource assignment for URLLC services may carry the second RNTI (e.g., for URLLC scheduling DCI) information in the second DCI.

Figure 26:
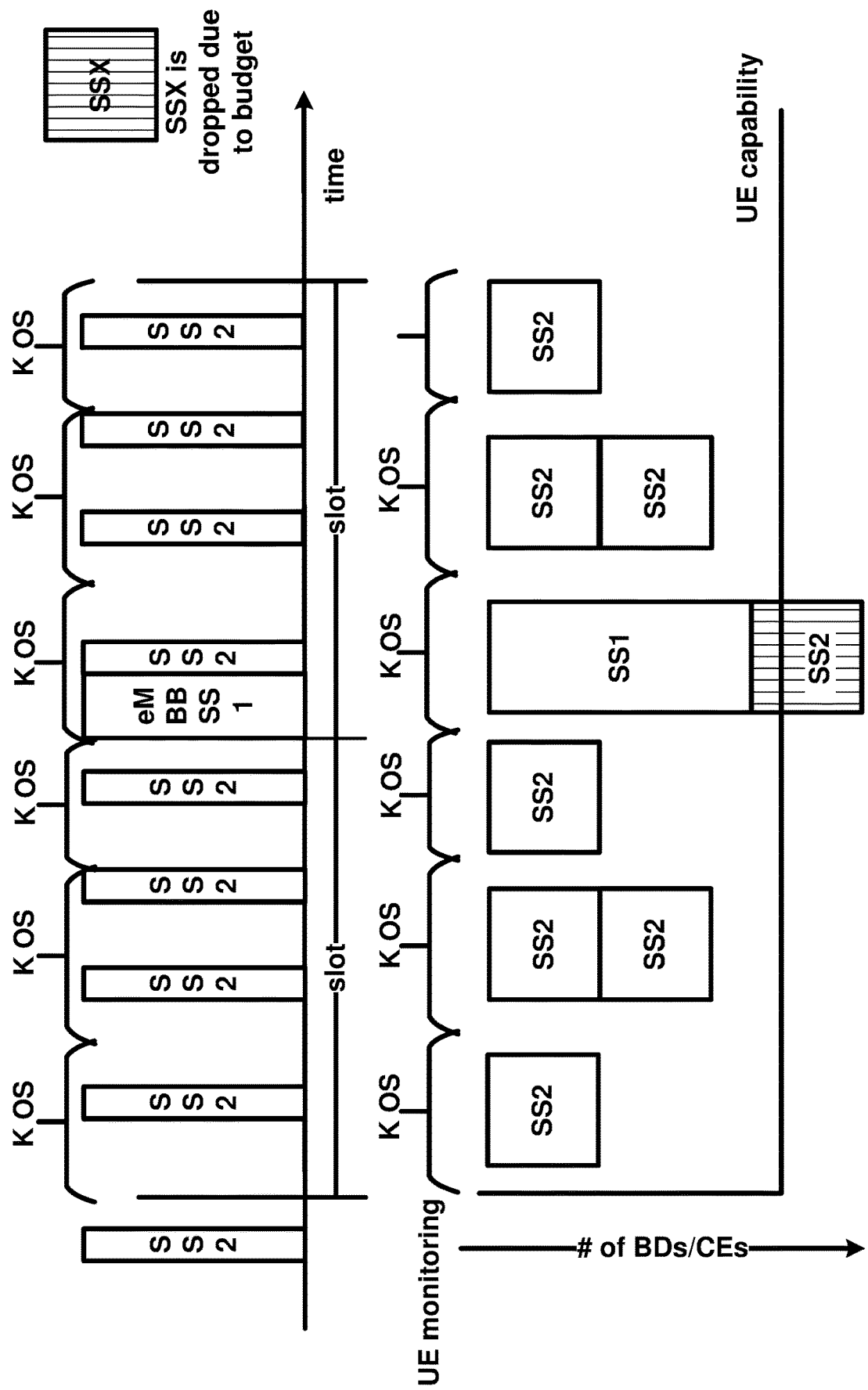
FIG. 26 is a diagram of an example of a span as per an embodiment of the present disclosure.

In an example, a wireless device may support a number of blind decoding and/or a number of channel estimations in a time unit (e.g., K OFDM symbols, or K times in a slot with a minimum gap between PDCCH spans. A PDCCH span may be defined as one or more OFDM consecutive symbols where a UE is configured to monitor one or more search spaces which are partially or fully overlapped. For example, a wireless device may support up to 2 spans in a slot with a minimum gap between two spans would be 7 (e.g., (2, 7) as (up to K spans per slot, minimum gap between spans)) or 4 spans in a slot with a minimum gap between two spans would be 3 (e.g., 4, 3)). FIG. 26 illustrates an example where K OFDM symbols are used as a time unit or a minimum gap between two spans would be K OFDM symbols where 3 spans are considered for a slot (e.g., (3, 4) as (3 spans per slot with minimum 4 OFDM symbols gap). In a span (e.g., $2^{nd}$ slot first span), a wireless device may encounter that the configured search spaces are beyond its capability to support (e.g., the number of allocated BDs may exceed its capability, or the channel estimation requirements may exceed its capability). The wireless device may drop one or more search spaces not to exceed its capability. In the example, the wireless device may drop SS2 based on search space set index. In an example, a number of DCI formats supported by a wireless device in a span may not exceed L for a unicast and P for a broadcast or group common DCI (e.g., L=3 and P=2).

In an example, a number of blind decodings and/or a number of channel estimations supported by a wireless device in a span may not exceed W and Z (e.g., W for the number of BDs, and Z for the number of channel estimations, W=44 and Z=66 with 15 kHz subcarrier spacing, and W and Z can be variable based on a numerology). FIG. 26 illustrates that the wireless device may skip monitoring SS2 wherein a sum of a first number of blind decoding of the first SS (SS1) and a second number of blind decoding of the second SS (SS2) exceeds the UE capability at 4-th span shown. The wireless device may drop the entire search space of the second search space. The wireless device may drop one or more candidates/blind decoding from the second search space not to exceed the UE capability. The wireless device may prioritize the first search space than the second search space based on a search space index. For example, a first search space index of the first search space may be lower than a second search space index of the second search space.

Figure 27:
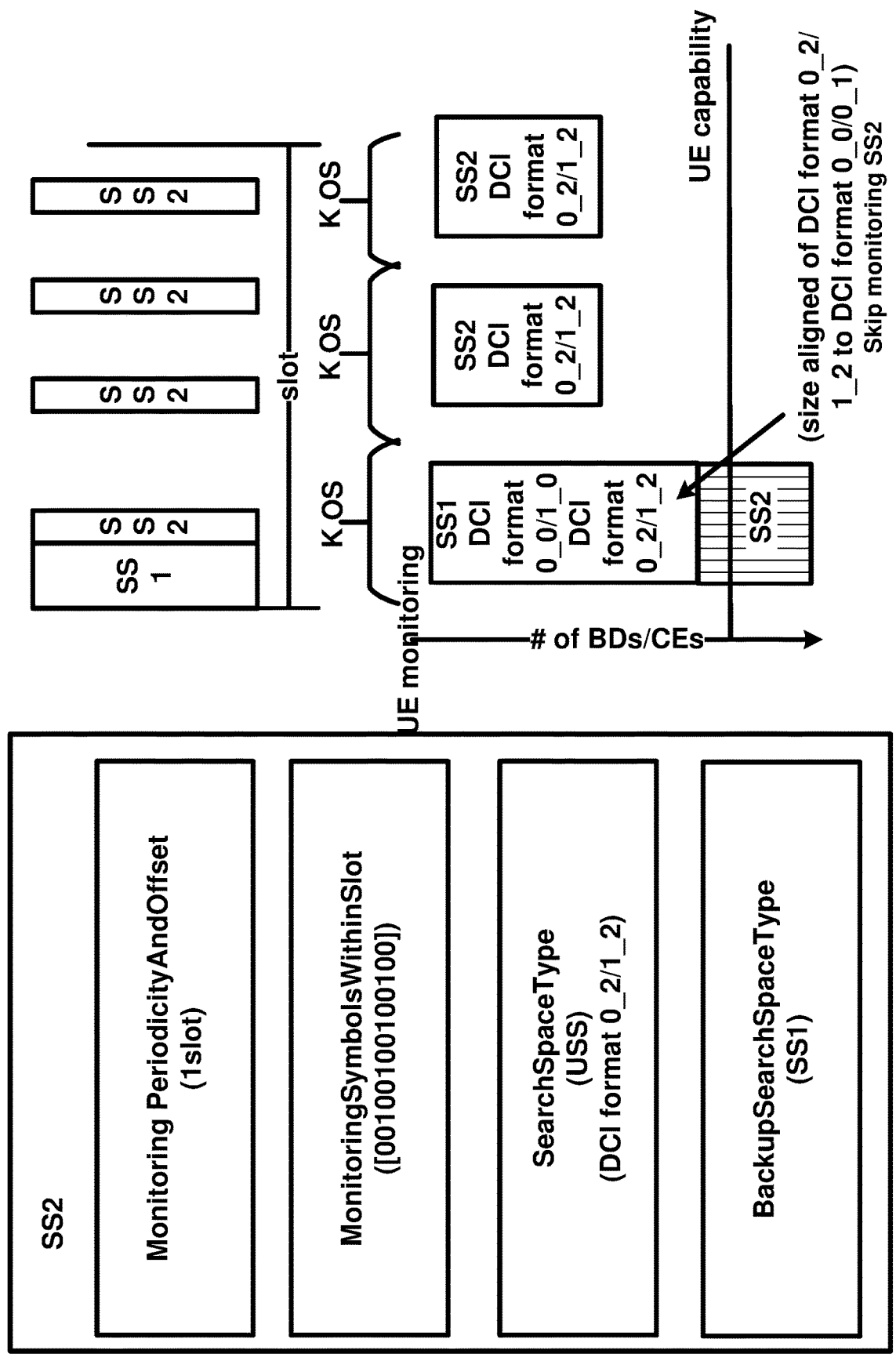
FIG. 27 is a diagram of an example of a backup search space or a backup search space set as per an embodiment of the present disclosure.

In an example, a wireless device may drop one or more search space where the wireless device may monitor a DCI comprising a resource assignment for URLLC services, when the SS index for URLLC is not low/prioritized, when the wireless device may drop one or more search spaces due to its capability. The wireless device may prioritize the one or more search space scheduling URLLC in the case. The wireless device may not be able to prioritize the one or more search space scheduling URLLC as other search spaces are CSS (where CSS is prioritized over USS). In an example, a wireless device may receive a backup SS for a SS. The wireless device may monitor one or more DCI formats configured to the SS in the backup SS in case the wireless device may need to drop the SS due to capability issue. For example, in FIG. 27, the wireless device may receive an RRC configuration indicating that SS1 is a backup SS for SS2. When the wireless device may skip monitoring on SS2 due to its capability at a first span (e.g., a first K OS), the wireless device may monitor the one or more configured DCI formats (e.g., DCI format 0_2/1_2) associated with SS2 in SS1 instead (e.g., DCI format 0_2, DCI format 1_2). Without increasing UE complexity, the wireless device assume that the one or more configured DCI formats configured for SS2 would be size-aligned with one of DCI formats monitored in SS1. For example, the wireless device aligns the size of DCI format 0_2 and DCI format 1_2 to DCI format 1_0 in SS1.

In an example, the wireless device may perform the operation when a backup SS is configured to a SS which may be dropped due to UE capability. For example, the base station may configure the backup search space (e.g., BackupSearchSpaceType as SS1) for the SS2. The wireless device may monitor one or more DCI formats configured for the SS2 (e.g., DCI format 0_2/1_2) via the SS1 in response to being configured with the backup search space in configuration parameters of the SS2. When the configuration is not present, the wireless device may not perform the operation.

Figure 28:
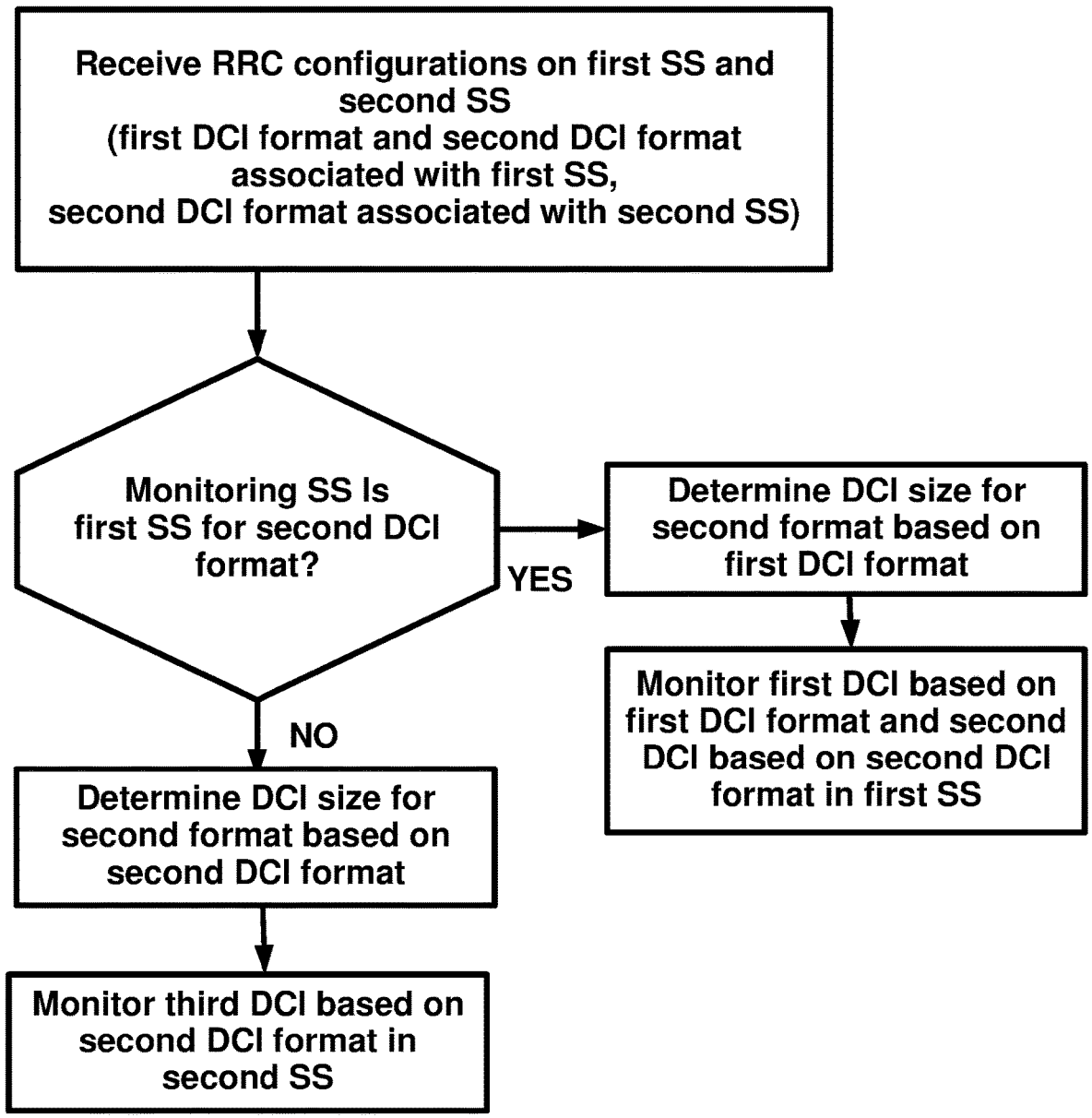
FIG. 28 is a flow diagram of an aspect of an example embodiment of the present disclosure.

An example flow chart of embodiments is illustrated in FIG. 28. The flow chart shows that a wireless device may determine a size of a second DCI format based on either the second DCI format or a first DCI format depending on the one or more configurations of a search space where the wireless device monitors a DCI based on the second DCI format. For example, the wireless device may receive one or more radio resource control (RRC) messages. The RRC messages may comprise/indicate one or more configuration parameters of a first search space and a second search space for a bandwidth part of a cell. The configuration parameters may indicate/comprise that a first DCI format and a second DCI format are monitored on the first search space. The configuration parameters may indicate/comprise that the second DCI format is monitored on the second search space. The wireless device may determine a first DCI size of the second DCI format or a second DCI size of the second DCI format based on a search space wherein the wireless device monitors one or more DCIs based on the second DCI format. For example, when the wireless device monitors the one or more DCIs based on the second DCI format in the first search space, the wireless device may determine the first DCI size of the second DCI format based on the first DCI format and the second DCI format. For example, the first DCI size is determined based on a size of the first DCI format. For example, the first DCI size is determined based on a larger size between the size of the first DCI format and a size of the second DCI format. Based on the determination, the wireless device may monitor a first DCI based on the first DCI format and a second DCI based on the second DCI format via the first search space.

In response to the case wherein the wireless device monitors the one or more DCIs based on the second DCI format in the second search space, the wireless device may determine the second DCI size of the second DCI format based on the second DCI format only. The wireless device may determine the second DCI size without a DCI size alignment process. The wireless device may monitor a third DCI based on the second DCI format in the second search space.

Figure 29:
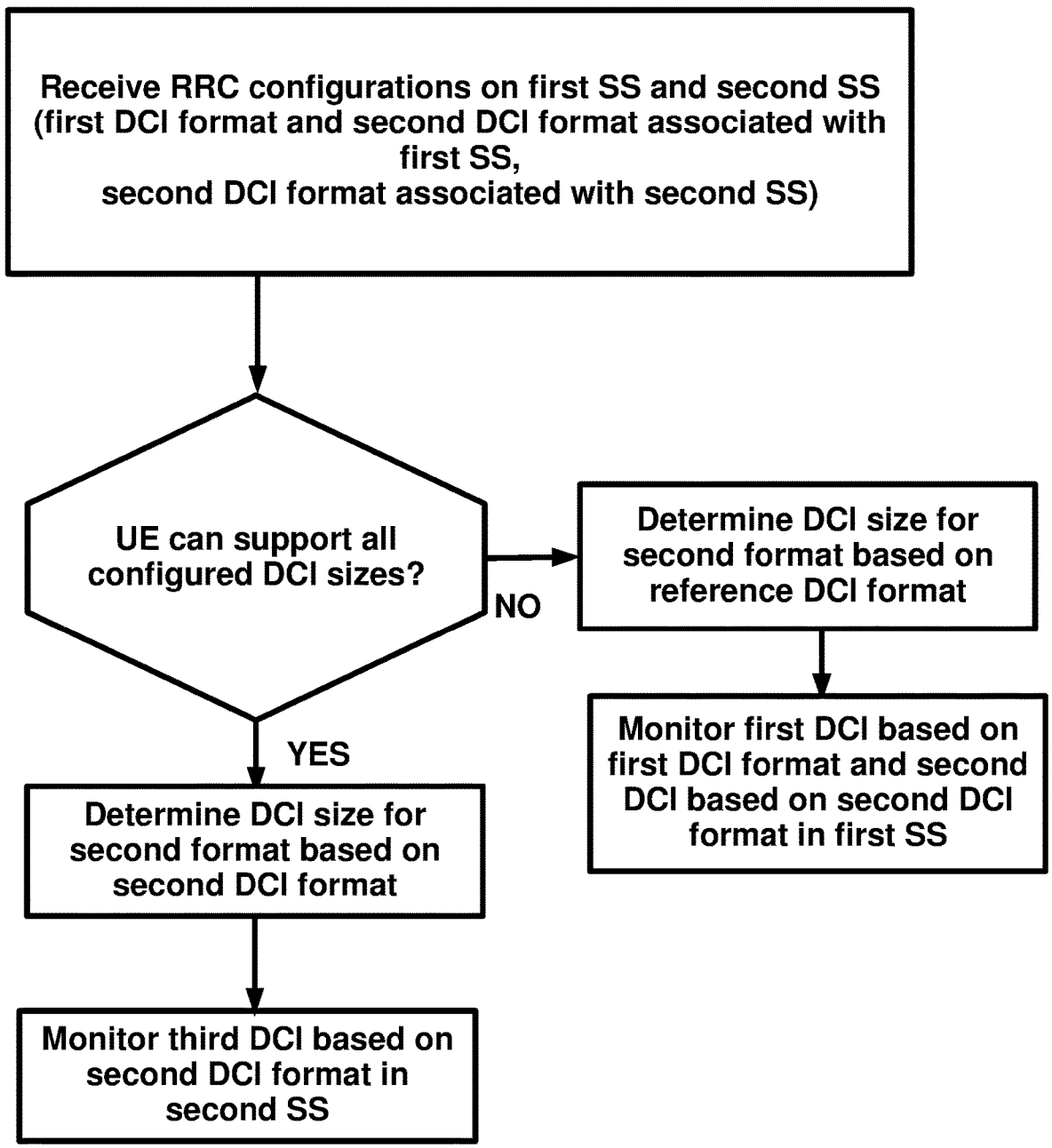
FIG. 29 is a flow diagram of an aspect of an example embodiment of the present disclosure.

In an example, a flow chart is illustrated in FIG. 29. The flow chart shows that a wireless device may determine a size of a second DCI format based on either the second DCI format or a reference DCI format depending on the one or more configurations of a search space and the UE capabilities (such as the supported number of DCI sizes, the supported number of blind decodings/channel estimations) where the wireless device monitors a DCI based on the second DCI format. For example, the wireless device may receive one or more radio resource control (RRC) messages. The RRC messages may comprise/indicate one or more configuration parameters of a first search space and a second search space for a bandwidth part of a cell. The configuration parameters may indicate/comprise that a first DCI format and a second DCI format are monitored on the first search space. The configuration parameters may indicate/comprise that the second DCI format is monitored on the second search space. The wireless device may determine a first DCI size of the second DCI format or a second DCI size of the second DCI format based on a UE capability. For example, when the wireless device may not be able to support DCI sizes, without a DCI size alignment, of configured DCI formats (e.g., the first DCI format and the second DCI format), the wireless device may determine the first DCI size of the second DCI format based on the first DCI format and the second DCI format. For example, the first DCI size is determined based on a size of the first DCI format. For example, the first DCI size is determined based on a larger size between the size of the first DCI format and a size of the second DCI format. Based on the determination, the wireless device may monitor a first DCI based on the first DCI format and a second DCI based on the second DCI format via the first search space.

In response to the case wherein the wireless device may be able to support DCI sizes, without a DCI size alignment, of configured DCI formats (e.g., the first DCI format and the second DCI format), the wireless device may determine the second DCI size of the second DCI format based on the second DCI format only. The wireless device may determine the second DCI size without a DCI size alignment process. The wireless device may monitor a third DCI based on the second DCI format in the second search space.

By restricting a single DCI size per each search space, a wireless device may have a limited capability requirement to support various use cases. A base station may have a configuration flexibility of multiple DCI formats aligned to a single size per search space without requiring increased UE capabilities.

Examples in the specification may apply to a DCI format which may convey one or more DCI fields or entries to indicate a command to a group of UEs for one or more cells (e.g., power saving signals, a group common DCI for SFI, TPC, etc.). Examples in the specification may apply to a DCI format which may carry a resource assignment for downlink or uplink scheduling for any services including eMBB, URLLC, mMTC, and/or the like.

A wireless device may receive from a base station one or more radio resource control (RRC) messages for a bandwidth part for a cell. The RRC messages may comprise one or more configuration parameters for at least a first search space and a second search space. The configuration of the first search space may comprise at least configuration parameters of first monitoring occasions, one or more first candidates, a first DCI format and a second DCI format. The configuration of the second search space may comprise at least configuration parameters of second monitoring occasions, one or more second candidates, and the second DCI format. The wireless device may determine a first DCI size, for the second DCI format for the first search space, based on the first DCI format. The wireless device determines a second DCI size, for the second DCI format for the second search space, based on the second DCI format. The wireless device may monitor one candidate from the first candidates based on the first DCI size for the first DCI format and the second DCI format. The wireless device may monitor one candidate from the second candidates based on the second DCI size for the second DCI format.

The wireless device may monitor a candidate from the first candidates for the first DCI format based on one or more first RNTIs and may monitor the candidate from the first candidates for the second DCI format based on one or more second RNTIs.

The one or more first RNTIs may comprise C-RNTI, CS-RNTI, MCS-C-RNTI, TPC-PUCCH-RNTI, TPC-PUSCH-RNTI, SI-RNTI, P-RNTI or SP-CSI-RNTI.

The one or more second RTNIs may comprise new-RNTI1, new-RNTI2 or new-RNTI3 where one or more new RNTIs (e.g., new-RNTI1, new-RNTI2 or new-RNTI3) may be used in a DCI comprising a resource assignment or one or more group-DCIs.

The first DCI format may include one or more DCI formats where the first DCI size may be determined based on the largest DCI format from the one or more DCI formats.

The first DCI format may include one or more DCI formats where the first DCI size may be determined based on DCI format 1_0 (e.g., a fallback DCI format for a downlink scheduling).

The second DCI format may include one or more DCI formats where the second DCI size may be determined based on the largest DCI format from the one or more DCI formats.

The wireless device may receive one or more second radio resource control messages comprising a reference DCI format for the second DCI format in the configuration parameters of the first search space. The wireless device may determine a third DCI size of the second DCI format based on the reference DCI format if configured. The wireless device may monitor one candidate from the first candidates based on the third DCI size for the second DCI format.

The reference DCI format may comprise a DCI format 1_0, DCI format 1_1, a DCI format 0_1, or DCI format 2_0.

A wireless device may receive from a base station one or more radio resource control (RRC) messages for a bandwidth part for a cell. The RRC messages may comprise one or more configuration parameters at least a first search space and a second search space. The configuration of the first search space may comprise at least configuration parameters of first monitoring occasions, one or more first candidates, a first DCI format, a second DCI format and a DCI size alignment indication for the second DCI format. The configuration of the second search space may comprise at least configuration parameters of second monitoring occasions, one or more second candidates, and the second DCI format. The wireless device may determine a first DCI size, for the second DCI format for the first search space, based on the first DCI format and the DCI size alignment indication. The wireless device may determine a second DCI size, for the second DCI format for the second search space, based on the second DCI format. The wireless device may monitor one candidate from the first candidates based on the first DCI size for the first DCI format and the second DCI format. The wireless device may monitor one candidate from the second candidates based on the second DCI size for the second DCI format.

The wireless device may determine the first DCI based on the first DCI format when the DCI size alignment indication is set to TRUE or 1.

The first DCI size and the second DCI size may be a same size.

A wireless device may receive from a base station one or more radio resource control (RRC) messages for a bandwidth part for a cell. The RRC messages may comprise one or more configuration parameters at least a first search space and a second search space. The configuration of the first search space may comprise at least configuration parameters of first monitoring occasions, one or more first candidates, a first DCI format, and a second DCI format. The configuration of the second search space may comprise at least configuration parameters of second monitoring occasions, one or more second candidates, and the second DCI format. The wireless device may determine a first DCI size, for the second DCI format for the first search space, based on the first DCI format and the number of DCI sizes that the wireless device may support. The wireless device may determine a second DCI size, for the second DCI format for the second search space, based on the second DCI format. The wireless device may monitor one candidate from the first candidates based on the first DCI size for the first DCI format and the second DCI format. The wireless device may monitor one candidate from the second candidates based on the second DCI size for the second DCI format.

The wireless device may determine the first DCI based on the first DCI format when the number of configured DCI sizes may be greater than the number of supported DCI sizes by the wireless device.

A wireless device may receive from a base station one or more radio resource control (RRC) messages for a bandwidth part for a cell. The RRC messages may comprise one or more configuration parameters at least a first search space and a second search space. The configuration of the first search space may comprise at least configuration parameters of first monitoring occasions, one or more first candidates, a first DCI format. The configuration of the second search space may comprise at least configuration parameters of second monitoring occasions, one or more second candidates, a second DCI format, and a backup search space (e.g., index of search space). The backup search space may indicate the first search space. The wireless device may monitor a first DCI on the one or more first candidates based on the second DCI format based on the UE capabilities. The wireless device may monitor a second DCI on the one or more second candidates based on the second DCI format based on UE capabilities.

The wireless device may monitor the second DCI when the wireless device may support the configured number of DCI sizes, the configured number of blind decodings, and the configured channel estimation requirements. The wireless device may monitor the first DCI otherwise.

According to various embodiments, a device such as, for example, a wireless device, off-network wireless device, a base station, and/or the like, may comprise one or more processors and memory. The memory may store instructions that, when executed by the one or more processors, cause the device to perform a series of actions. Embodiments of example actions are illustrated in the accompanying figures and specification. Features from various embodiments may be combined to create yet further embodiments.

Figure 30:
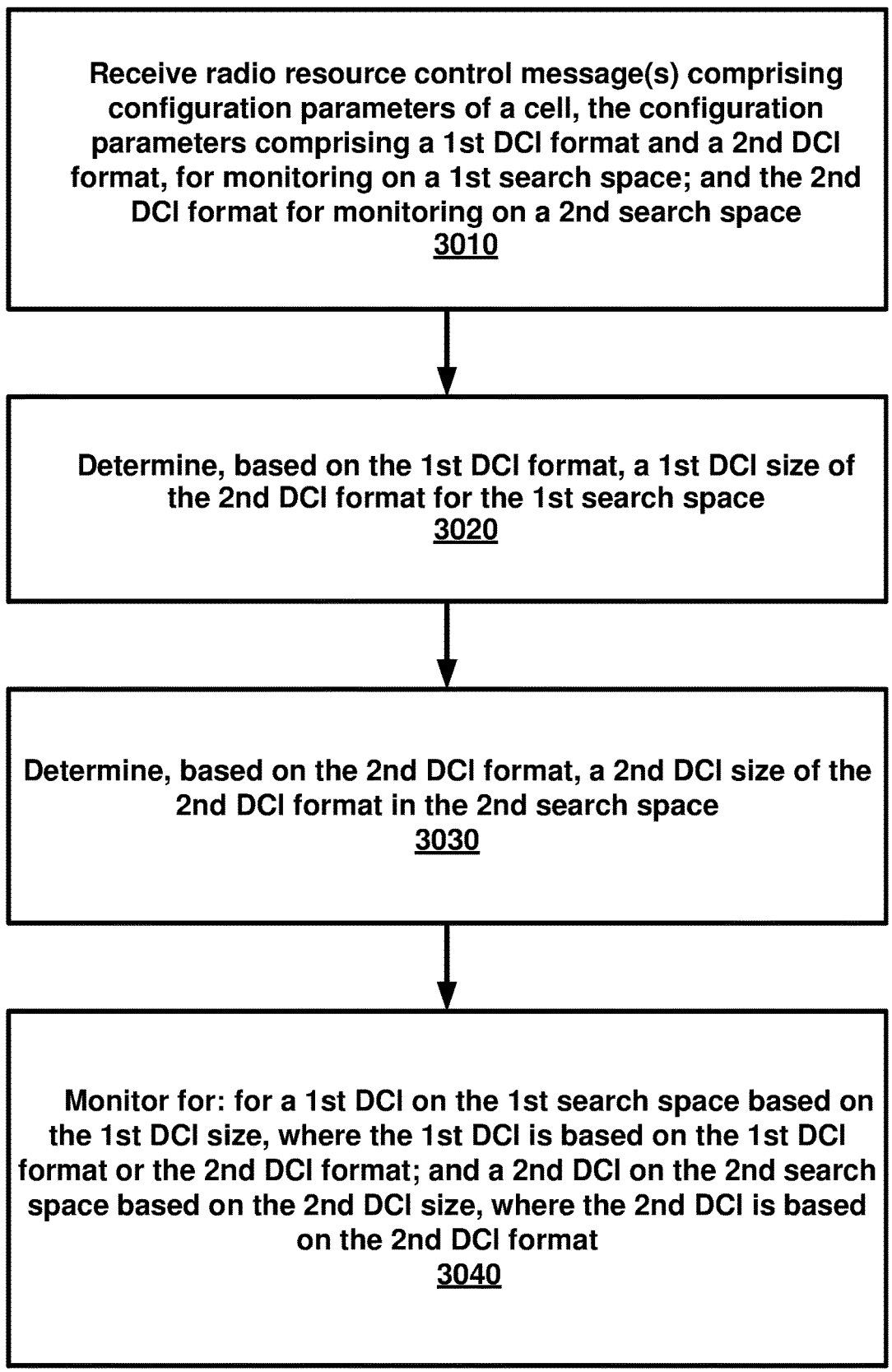
FIG. 30 is a flow diagram of an aspect of an example embodiment of the present disclosure.

FIG. 30 is a flow diagram as per an aspect of an example embodiment of the present disclosure. At 3010, a wireless device may receive one or more radio resource control (RRC) messages by a base station. The RRC messages may comprise configuration parameters of a cell. The configuration parameters may comprise a first downlink control information (DCI) format and a second DCI format. The first DCI format and the second DCI format may be configured for monitoring on a first search space. The configuration parameters may comprise the second DCI format configured for monitoring on a second search space. At 3020, the wireless device may determine, based on the first DCI format, a first DCI size of the second DCI format for the first search space. At 3030, the wireless device may determine, based on the second DCI format, a second DCI size of the second DCI format in the second search space. At 3040, the wireless device may monitor for a first DCI on the first search space based on the first DCI size. The first DCI may be based on the first DCI format or the second DCI format. The wireless device may monitor for a second DCI on the second search space based on the second DCI size. The second DCI may be based on the second DCI format.

According to an example embodiment, the configuration parameters may be configured for a bandwidth part of a cell. The first search space and the second search space may be configured for the bandwidth part of the cell.

According to an example embodiment, the first DCI format may be used for scheduling data for the cell or is used for scheduling a group common control. The first DCI may be scrambled with a first radio network temporary identifier (RNTI). The first RNTI may be a cell RNTI (C-RNTI). The first RNTI may be a configured scheduling RNTI (CS-RNTI). The first RNTI may be a modulation and coding scheme C-RNTI (MCS-C-RNTI). The first RNTI may be a transmission power control physical uplink control channel RNTI (TPC-PUCCH-RNTI). The first RNTI may be a transmission power control physical uplink shared channel RNTI (TPC-PUSCH-RNTI). The first RNTI may be a system information RNTI (SI-RNTI). The first RNTI may be a paging RNTI (P-RNTI) or a semi-persistent channel state information RNTI (SP-CSI-RNTI). The second DCI format may be configured for scheduling data for the cell. The second DCI may be scrambled with a second RNTI. The second RNTI may not comprise a C-RNT. The second RNTI may not comprise a CS-RNTI. The second RNTI may not comprise a MCS-C-RNTI. The second RNTI may not comprise a TPC-PUCCH-RNTI. The second RNTI may not comprise a TPC-PUSCH-RNTI). The second RNTI may not comprise a system information RNTI (SI-RNTI. The second RNTI may not comprise a P-RNTI. The second RNTI may not comprise a SP-CSI-RNTI.

According to an example embodiment, the wireless device may determine the first DCI size of the second DCI format as a DCI size of the first DCI format. The wireless device may add zeros to the second DCI format until the second DCI format has the first DCI size, in response to a size of the second DCI format being smaller than the first DCI size of the first DCI format. The wireless device may truncate bits to the second DCI format until the second DCI format has the first DCI size, in response to a size of the second DCI format being larger than the first DCI size of the first DCI format.

According to an example embodiment, the wireless device may determine the second DCI size of the second DCI format as a DCI size of the second DCI format. The wireless device may determine the first DCI based on the first DCI format. The wireless device may determine the second DCI based on the second DCI format.

According to an example embodiment, the configuration parameters may comprise a first time domain resource allocation (TDRA) list and a second TDRA list. The wireless device may receive a third DCI. The third DCI may be based on the first DCI format. The third DCI may comprise a first TDRA field. The wireless device may determine, in response to receiving the third DCI, a first scheduling offset based on the first TDRA field and the first TDRA list. The first scheduling offset may be a gap between the third DCI and a corresponding first scheduled data. The wireless device may receive a fourth DCI. The fourth DCI may be based on the second DCI format. The fourth DCI may comprise a second TDRA field. The wireless device may determine, in response to receiving the fourth DCI, a second scheduling offset based on the second TDRA field and the second TDRA list. The second scheduling offset may be a gap between the fourth DCI and a corresponding second scheduled data. The first DCI format may be DCI format 1_0. The first search space may be the CSS. The second search space may be a USS. The first DCI size may be determined based on a DCI size of the DCI format 1_0.

According to an example embodiment, the wireless device may determine the first DCI size based on the second DCI format and a wireless device capability and a third DCI size of the second DCI format. The wireless device capability may comprise a number of supporting DCI sizes. The wireless device may determine, based on the wireless device capability and the second DCI format, the third DCI size. The wireless device may determine, based on the wireless device capability and the first DCI format, the third DCI size.

According to an example embodiment, a wireless device may receive one or more radio resource control (RRC) messages comprising configuration parameters for a bandwidth part for a cell. The configuration parameters may comprise a first search space set. The first search space set may be configured with at least a first downlink control information (DCI) format and a first backup search space. The configuration parameters may comprise a second search space set. The second search space set may be configured with a second DCI format. The second search space may be configured as the first backup search space. The wireless device may determine monitoring search space for the first DCI format in the second search space or the first search space based on wireless device capability. The wireless device may monitor a first DCI on the first search space set if a required capability is satisfied by the wireless device capability. Otherwise, the wireless device may monitor the first DCI on the second search space set.

Embodiments may be configured to operate as needed. The disclosed mechanism may be performed when certain criteria are met, for example, in a wireless device, a base station, a radio environment, a network, a combination of the above, and/or the like. Example criteria may be based, at least in part, on for example, wireless device or network node configurations, traffic load, initial system set up, packet sizes, traffic characteristics, a combination of the above, and/or the like. When the one or more criteria are met, various example embodiments may be applied. Therefore, it may be possible to implement example embodiments that selectively implement disclosed protocols.

A base station may communicate with a mix of wireless devices. Wireless devices and/or base stations may support multiple technologies, and/or multiple releases of the same technology. Wireless devices may have some specific capability(ies) depending on wireless device category and/or capability(ies). A base station may comprise multiple sectors. When this disclosure refers to a base station communicating with a plurality of wireless devices, this disclosure may refer to a subset of the total wireless devices in a coverage area. This disclosure may refer to, for example, a plurality of wireless devices of a given LTE or 5G release with a given capability and in a given sector of the base station. The plurality of wireless devices in this disclosure may refer to a selected plurality of wireless devices, and/or a subset of total wireless devices in a coverage area which perform according to disclosed methods, and/or the like. There may be a plurality of base stations or a plurality of wireless devices in a coverage area that may not comply with the disclosed methods, for example, because those wireless devices or base stations perform based on older releases of LTE or 5G technology.

In this disclosure, "a" and "an" and similar phrases are to be interpreted as "at least one" and "one or more." Similarly, any term that ends with the suffix "(s)" is to be interpreted as "at least one" and "one or more." In this disclosure, the term "may" is to be interpreted as "may, for example." In other words, the term "may" is indicative that the phrase following the term "may" is an example of one of a multitude of suitable possibilities that may, or may not, be employed to one or more of the various embodiments.

If A and B are sets and every element of A is also an element of B, A is called a subset of B. In this specification, only non-empty sets and subsets are considered. For example, possible subsets of B={cell1, cell2} are: {cell1}, {cell2}, and {cell1, cell2}. The phrase "based on" (or equally "based at least on") is indicative that the phrase following the term "based on" is an example of one of a multitude of suitable possibilities that may, or may not, be employed to one or more of the various embodiments. The phrase "in response to" (or equally "in response at least to") is indicative that the phrase following the phrase "in response to" is an example of one of a multitude of suitable possibilities that may, or may not, be employed to one or more of the various embodiments. The phrase "depending on" (or equally "depending at least to") is indicative that the phrase following the phrase "depending on" is an example of one of a multitude of suitable possibilities that may, or may not, be employed to one or more of the various embodiments. The phrase "employing/using" (or equally "employing/using at least") is indicative that the phrase following the phrase "employing/using" is an example of one of a multitude of suitable possibilities that may, or may not, be employed to one or more of the various embodiments.

The term configured may relate to the capacity of a device whether the device is in an operational or non-operational state. Configured may also refer to specific settings in a device that effect the operational characteristics of the device whether the device is in an operational or non-operational state. In other words, the hardware, software, firmware, registers, memory values, and/or the like may be "configured" within a device, whether the device is in an operational or nonoperational state, to provide the device with specific characteristics. Terms such as "a control message to cause in a device" may mean that a control message has parameters that may be used to configure specific characteristics or may be used to implement certain actions in the device, whether the device is in an operational or non-operational state In this disclosure, various embodiments are disclosed. Limitations, features, and/or elements from the disclosed example embodiments may be combined to create further embodiments within the scope of the disclosure.

In this disclosure, parameters (or equally called, fields, or Information elements: IEs) may comprise one or more information objects, and an information object may comprise one or more other objects. For example, if parameter (IE) N comprises parameter (IE) M, and parameter (IE) M comprises parameter (IE) K, and parameter (IE) K comprises parameter (information element) J. Then, for example, N comprises K, and N comprises J. In an example embodiment, when one or more (or at least one) message(s) comprise a plurality of parameters, it implies that a parameter in the plurality of parameters is in at least one of the one or more messages, but does not have to be in each of the one or more messages. In an example embodiment, when one or more (or at least one) message(s) indicate a value, event and/or condition, it implies that the value, event and/or condition is indicated by at least one of the one or more messages, but does not have to be indicated by each of the one or more messages.

Furthermore, many features presented above are described as being optional through the use of "may" or the use of parentheses. For the sake of brevity and legibility, the present disclosure does not explicitly recite each and every permutation that may be obtained by choosing from the set of optional features. However, the present disclosure is to be interpreted as explicitly disclosing all such permutations. For example, a system described as having three optional features may be embodied in seven different ways, namely with just one of the three possible features, with any two of the three possible features or with all three of the three possible features.

Many of the elements described in the disclosed embodiments may be implemented as modules. A module is defined here as an element that performs a defined function and has a defined interface to other elements. The modules described in this disclosure may be implemented in hardware, software in combination with hardware, firmware, wetware (i.e. hardware with a biological element) or a combination thereof, all of which may be behaviorally equivalent. For example, modules may be implemented as a software routine written in a computer language configured to be executed by a hardware machine (such as C, C++, Fortran, Java, Basic, Matlab or the like) or a modeling/simulation program such as Simulink, Stateflow, GNU Octave, or LabVIEWMathScript. Additionally, it may be possible to implement modules using physical hardware that incorporates discrete or programmable analog, digital and/or quantum hardware. Examples of programmable hardware comprise: computers, microcontrollers, microprocessors, application-specific integrated circuits (ASICs); field programmable gate arrays (FPGAs); and complex programmable logic devices (CPLDs). Computers, microcontrollers and microprocessors are programmed using languages such as assembly, C, C++ or the like. FPGAs, ASICs and CPLDs are often programmed using hardware description languages (HDL) such as VHSIC hardware description language (VHDL) or Verilog that configure connections between internal hardware modules with lesser functionality on a programmable device. The above mentioned technologies are often used in combination to achieve the result of a functional module.

The disclosure of this patent document incorporates material which is subject to copyright protection. The copyright owner has no objection to the facsimile reproduction by anyone of the patent document or the patent disclosure, as it appears in the Patent and Trademark Office patent file or records, for the limited purposes required by law, but otherwise reserves all copyright rights whatsoever.

While various embodiments have been described above, it should be understood that they have been presented by way of example, and not limitation. It will be apparent to persons skilled in the relevant art(s) that various changes in form and detail can be made therein without departing from the scope. In fact, after reading the above description, it will be apparent to one skilled in the relevant art(s) how to implement alternative embodiments. Thus, the present embodiments should not be limited by any of the above described exemplary embodiments.

In addition, it should be understood that any figures which highlight the functionality and advantages, are presented for example purposes only. The disclosed architecture is sufficiently flexible and configurable, such that it may be utilized in ways other than that shown. For example, the actions listed in any flowchart may be re-ordered or only optionally used in some embodiments.

Further, the purpose of the Abstract of the Disclosure is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The Abstract of the Disclosure is not intended to be limiting as to the scope in any way.

Finally, it is the applicant's intent that only claims that include the express language "means for" or "step for" be interpreted under 35 U.S.C. 112. Claims that do not expressly include the phrase "means for" or "step for" are not to be interpreted under 35 U.S.C. 112.

The invention claimed is:

1. A method comprising:
    receiving, by a wireless device, one or more radio resource control messages comprising configuration parameters of a cell, the configuration parameters comprising:
        a first downlink control information (DCI) format and a second DCI format, for monitoring on a first search space; and
        the second DCI format for monitoring on a second search space;

determining, based on the first DCI format, a first DCI size of the second DCI format for the first search space;

determining, based on the second DCI format, a second DCI size of the second DCI format in the second search space;

monitoring, based on the first DCI size, the first search space for a first DCI, wherein the first DCI is based on the first DCI format or the second DCI format; and monitoring, based on the second DCI size, the second search space for a second DCI, wherein the second DCI is based on the second DCI format.

2. The method of claim 1, wherein the configuration parameters are configured for a bandwidth part of a cell, and wherein the first search space and the second search space are configured for the bandwidth part of the cell.

3. The method of claim 2, wherein the first DCI format is used for scheduling data for the cell or is used for scheduling a group common control, and wherein the first DCI is scrambled with a first radio network temporary identifier (RNTI).

4. The method of claim 3, wherein the first RNTI is at least one of:
a cell RNTI (C-RNTI);
a configured scheduling RNTI (CS-RNTI);
a modulation and coding scheme C-RNTI (MCS-C-RNTI);
a transmission power control physical uplink control channel RNTI (TPC-PUCCH-RNTI);
a transmission power control physical uplink shared channel RNTI (TPC-PUSCH-RNTI);
a system information RNTI (SI-RNTI);
a paging RNTI (P-RNTI); or
a semi-persistent channel state information RNTI (SP-CSI-RNTI).

5. The method of claim 2, wherein the second DCI format is configured for scheduling data for the cell, and wherein the second DCI is scrambled with a second RNTI.

6. The method of claim 5, wherein the second RNTI does not comprise at least one of:
a C-RNTI;
a CS-RNTI;
a MCS-C-RNTI;
a TPC-PUCCH-RNTI;
a TPC-PUSCH-RNTI;
a SI-RNTI;
a P-RNTI; or
a SP-CSI-RNTI.

7. The method of claim 1, further comprising determining the first DCI size of the second DCI format as a DCI size of the first DCI format.

8. The method of claim 7, further comprising adding zeros to the second DCI format until the second DCI format has the first DCI size, in response to a size of the second DCI format being smaller than the DCI size of the first DCI format.

9. The method of claim 7, further comprising truncating bits of the second DCI format until the second DCI format has the first DCI size, in response to a size of the second DCI format being larger than the DCI size of the first DCI format.

10. The method of claim 1, further comprising determining the second DCI size of the second DCI format as a DCI size of the second DCI format.

11. A wireless device comprising:
one or more processors; and
memory storing instructions that, when executed by the one or more processors, cause the wireless device to:

receive, from a base station, one or more radio resource control messages comprising configuration parameters of a cell, the configuration parameters comprising:
a first downlink control information (DCI) format and a second DCI format, for monitoring on a first search space; and
the second DCI format for monitoring on a second search space;
determine, based on the first DCI format, a first DCI size of the second DCI format for the first search space;
determine, based on the second DCI format, a second DCI size of the second DCI format in the second search space;
monitor, based on the first DCI size, the first search space for a first DCI, wherein the first DCI is based on the first DCI format or the second DCI format; and
monitor, based on the second DCI size, the second search space for a second DCI, wherein the second DCI is based on the second DCI format.

12. The method of claim 11, wherein the configuration parameters are configured for a bandwidth part of a cell, and wherein the first search space and the second search space are configured for the bandwidth part of the cell.

13. The method of claim 12, wherein the first DCI format is used for scheduling data for the cell or is used for scheduling a group common control, and wherein the first DCI is scrambled with a first radio network temporary identifier (RNTI).

14. The method of claim 13, wherein the first RNTI is at least one of:
a C-RNTI;
a CS-RNTI;
a MCS-C-RNTI;
a TPC-PUCCH-RNTI;
a TPC-PUSCH-RNTI;
a SI-RNTI;
a P-RNTI; or
a SP-CSI-RNTI.

15. The method of claim 12, wherein the second DCI format is configured for scheduling data for the cell, and wherein the second DCI is scrambled with a second RNTI.

16. The method of claim 15, wherein the second RNTI does not comprise at least one of:
a C-RNTI;
a CS-RNTI;
a MCS-C-RNTI;
a TPC-PUCCH-RNTI;
a TPC-PUSCH-RNTI;
a SI-RNTI;
a P-RNTI; or
a SP-CSI-RNTI.

17. The method of claim 11, wherein the instructions, when executed by the one or more processors, further cause the wireless device to determine the first DCI size of the second DCI format as a DCI size of the first DCI format.

18. The method of claim 17, wherein the instructions, when executed by the one or more processors, further cause the wireless device to add zeros to the second DCI format until the second DCI format has the first DCI size, in response to a size of the second DCI format being smaller than the DCI size of the first DCI format.

19. The method of claim 17, wherein the instructions, when executed by the one or more processors, further cause the wireless device to truncate bits of the second DCI format until the second DCI format has the first DCI size, in response to a size of the second DCI format being larger than the DCI size of the first DCI format.

20. A system comprising:
   a base station; and
   a wireless device comprising:
      one or more processors; and
      memory storing instructions that, when executed by the one or more processors, cause the wireless device to:
         receive, from the base station, one or more radio resource control messages comprising configuration parameters of a cell, the configuration parameters comprising:
            a first downlink control information (DCI) format and a second DCI format, for monitoring on a first search space; and
            the second DCI format for monitoring on a second search space;
         determine, based on the first DCI format, a first DCI size of the second DCI format for the first search space;
         determine, based on the second DCI format, a second DCI size of the second DCI format in the second search space;
         monitor, based on the first DCI size, the first search space for a first DCI, wherein the first DCI is based on the first DCI format or the second DCI format; and
      monitor, based on the second DCI size, the second search space for a second DCI, wherein the second DCI is based on the second DCI format.

* * * * *

UNITED STATES PATENT AND TRADEMARK OFFICE
CERTIFICATE OF CORRECTION

| | | |
|---|---|---|
| PATENT NO. | : 11,191,071 B2 | Page 1 of 1 |
| APPLICATION NO. | : 16/849319 | |
| DATED | : November 30, 2021 | |
| INVENTOR(S) | : Yi et al. | |

It is certified that error appears in the above-identified patent and that said Letters Patent is hereby corrected as shown below:

In the Claims

In Column 64, Line 23, replace "The method of" with "The wireless device of"
In Column 64, Line 27, replace "The method of" with "The wireless device of"
In Column 64, Line 32, replace "The method of" with "The wireless device of"
In Column 64, Line 42, replace "The method of" with "The wireless device of"
In Column 64, Line 45, replace "The method of" with "The wireless device of"
In Column 64, Line 55, replace "The method of" with "The wireless device of"
In Column 64, Line 59, replace "The method of" with "The wireless device of"
In Column 64, Line 65, replace "The method of" with "The wireless device of"

Signed and Sealed this
Twenty-ninth Day of March, 2022

Drew Hirshfeld
*Performing the Functions and Duties of the*
*Under Secretary of Commerce for Intellectual Property and*
*Director of the United States Patent and Trademark Office*